(12) United States Patent
Wendt et al.

(10) Patent No.: US 7,539,331 B2
(45) Date of Patent: May 26, 2009

(54) IMAGE IDENTIFICATION SYSTEM

(75) Inventors: Barry Wendt, Las Vegas, NV (US); Ben Wittig, Bloomington, MN (US)

(73) Assignee: BIO-key International Inc., Eagan, MN (US)

( * ) Notice: Subject to any disclaimer, the term of this patent is extended or adjusted under 35 U.S.C. 154(b) by 399 days.

(21) Appl. No.: 11/120,791

(22) Filed: May 3, 2005

(65) Prior Publication Data

US 2005/0201597 A1    Sep. 15, 2005

Related U.S. Application Data

(62) Division of application No. 09/788,148, filed on Feb. 16, 2001, now Pat. No. 7,359,553.

(51) Int. Cl.
G06K 9/00 (2006.01)
G06K 9/46 (2006.01)
G06K 9/66 (2006.01)
G06K 15/00 (2006.01)
H04N 1/40 (2006.01)

(52) U.S. Cl. ........................ 382/124; 382/170; 382/190; 382/224; 382/258; 382/266; 358/2.99; 358/448; 358/464

(58) Field of Classification Search ......... 382/115–119, 382/124–127, 170, 190, 192, 197, 199, 224, 382/258, 259, 266, 275, 267, 298; 358/2.99, 358/448, 464–466
See application file for complete search history.

(56) References Cited

U.S. PATENT DOCUMENTS

| | | | |
|---|---|---|---|
| 3,292,149 A | 12/1966 | Bourne | 382/126 |
| 3,959,884 A | 6/1976 | Jordan et al. | 283/69 |
| 3,968,475 A | 7/1976 | McMahon | 382/124 |
| 4,015,240 A | 3/1977 | Swonger et al. | 382/125 |
| 4,151,512 A | 4/1979 | Riganati et al. | 382/125 |
| 4,185,270 A | 1/1980 | Fischer II et al. | 382/125 |
| 4,322,163 A * | 3/1982 | Schiller | 356/71 |

(Continued)

OTHER PUBLICATIONS

Ratha et al., Feb. 12, 1995, "Adaptive flow orientation based feature extraction in fingerprint images"(pp. 1-32).*

(Continued)

*Primary Examiner*—Matthew C Bella
*Assistant Examiner*—Manav Seth
(74) *Attorney, Agent, or Firm*—Westman, Champlin & Kelly, P.A.

(57) ABSTRACT

Methods and procedures for improving the performance and reliability of image analysis within an image identification system include a series of image qualification functions designed to quickly process a fraction of available image data and to provide feedback to a system user pertaining to image quality and authenticity. Functions designed to produce image models based on original image data and to catalogue such image models into a searchable database are included in the present invention. The present invention also includes functions for comparing one image model to another. Finally, the present invention provides functions for making a quick determination as to which, if any, of a potential thousands (or more, i.e., millions) of image models within a searchable database exhibit a desired level of similarity, as compared to a target image model.

12 Claims, 40 Drawing Sheets
(27 of 40 Drawing Sheet(s) Filed in Color)

U.S. PATENT DOCUMENTS

| | | | |
|---|---|---|---|
| 4,607,384 A | 8/1986 | Brooks | 382/124 |
| 4,685,145 A | 8/1987 | Schiller | 382/272 |
| 4,790,564 A | 12/1988 | Larcher et al. | 283/69 |
| 4,947,442 A | 8/1990 | Tanaka et al. | 382/125 |
| 4,986,363 A | 1/1991 | Taylor et al. | 382/125 |
| 5,040,223 A | 8/1991 | Kamiya et al. | 382/127 |
| 5,105,467 A | 4/1992 | Kim et al. | 382/125 |
| 5,109,428 A | 4/1992 | Igaki et al. | 382/125 |
| 5,140,642 A | 8/1992 | Hsu et al. | 382/124 |
| 5,187,747 A | 2/1993 | Capello et al. | 382/124 |
| 5,261,008 A | 11/1993 | Yamamoto | 382/127 |
| 5,363,590 A | 11/1994 | Yamamoto | 382/125 |
| 5,420,937 A | 5/1995 | Davis | 382/125 |
| 5,497,429 A | 3/1996 | Shibuya | 382/125 |
| 5,572,597 A | 11/1996 | Chang et al. | 382/125 |
| 5,631,971 A | 5/1997 | Sparrow | 382/125 |
| 5,659,626 A | 8/1997 | Ort et al. | 382/125 |
| 5,664,027 A | 9/1997 | Ittner | 382/170 |
| 5,748,765 A | 5/1998 | Takhar | 382/124 |
| 5,841,888 A | 11/1998 | Setlak et al. | 382/124 |
| 5,883,971 A * | 3/1999 | Bolle et al. | 382/124 |
| 5,901,239 A | 5/1999 | Kamei | 382/125 |
| 5,995,640 A * | 11/1999 | Bolle et al. | 382/124 |
| 6,002,787 A | 12/1999 | Takhar et al. | 382/125 |
| 6,049,621 A | 4/2000 | Jain et al. | 382/125 |
| 6,072,895 A | 6/2000 | Bolle et al. | 382/125 |
| 6,181,807 B1 | 1/2001 | Setlak et al. | 382/124 |
| 6,226,391 B1 | 5/2001 | Dydyk et al. | 382/125 |
| 6,233,348 B1 | 5/2001 | Fujii et al. | 382/125 |
| 6,241,288 B1 | 6/2001 | Bergenek et al. | 283/67 |
| 6,282,302 B1 | 8/2001 | Hara | 382/116 |
| 6,289,111 B1 | 9/2001 | Takhar | 382/115 |
| 6,289,112 B1 | 9/2001 | Jain et al. | 382/116 |
| 2002/0030359 A1 | 3/2002 | Bergenek et al. | 283/68 |
| 2002/0031245 A1 | 3/2002 | Rozenberg et al. | 382/125 |
| 2002/0041700 A1 | 4/2002 | Therbaud | 382/124 |

OTHER PUBLICATIONS

Practical Image Processing In C. By Craig A. Lindley Published by John Wiley & Sons, Inc. ©1991.

* cited by examiner

IMAGE IDENTIFICATION SYSTEM

CROSS-REFERENCE TO RELATED APPLICATION

The present application is a divisional of and claims priority of U.S. patent application Ser. No. 09/788,148, filed Feb. 16, 2001, now U.S. Pat. No. 7,359,553 the content of which is hereby incorporated by reference in its entirety.

BACKGROUND OF THE INVENTION

The present invention relates generally to image identification systems. More specifically, the present invention relates to methods and procedures for improving the performance and reliability of image identification systems.

Image identification systems have been used in the past, one application being biometric image identification systems. One type of biometric image identification system is a fingerprint identification system. In a fingerprint identification system, a user places the tip of a finger on a scanning surface of a fingerprint image reader device. Each ridge of the epidermis (outer skin) is dotted with sweat glands that produce moisture that, in combination with oily secretions and other substances naturally present on the tip of a finger, enable an image of a fingerprint to be scanned. (The present invention can also be successfully applied to images generated from readers that do not rely on the moisture content of the skin to capture an image.). The fingerprint image reader device creates an image scan by capturing a picture of fingerprint ridge characteristics present on the tip of a finger. In many systems, the image is then compared to a database of other stored fingerprint images or fingerprint image models for verification, authentication, or some other form of analysis.

Security systems that implement fingerprint identification technology have the potential of being reliable and easy to use. These benefits arise from the fact that the technology does not require a system user to retain any piece of knowledge, such as a password, personal identification number, combination or any other code. Neither must a user possess a card, key or any other physical device to gain access to a secured environment. A fingerprint security authentication key, as opposed to a knowledge or possession based security authentication key is nearly impossible to lose, steal, or be forgotten.

Development of practical security system applications that incorporate fingerprint image identification technology has been hindered by a general non-repeatability of data from one image scan to another. In particular, physical variations present in the environment of a fingerprint reader device can cause substantial incongruities from one image scan of a fingerprint as compared to a subsequently taken image scan of the same fingerprint. Differences in the temperature, amount of pressure applied to the scanning surface, moisture content of the finger, as well as the effects of medications and differences in blood pressure can all contribute to substantial incongruities from one image scan to another. These incongruous results hinder the development of most fingerprint identification technology applications because inconsistent data leads to an unacceptably high number of false acceptances (multiple identifications, which include matching to wrong people) and false rejections (not recognizing an enrolled user) for applications that might require instantaneous and unsupervised comparisons to be made between a scanned fingerprint image and a database of fingerprint images or fingerprint models. Another problem associated with many image identification systems is the small amount of data gleaned by the typical system from each image. For instance, most fingerprint identification systems are minutiae-based, typically meaning that only rods, islands, and bifurcations are cataloged and made available for analysis. An ideal image scan performed by a minutiae-based system will typically glean a maximum of approximately 50 useful data points, and this count may be further compromised by data points that might not appear in the scanned image due to previously discussed interference in the image reader environment. The discrimination capability of the typical minutiae-based identification system is not adequate for applications that require instantaneous and accurate comparisons to be made between a real-time scanned image and a database of potential matching images or models. In addition, systems that glean only a small number of useful data points are susceptible to fraudulently produced fingerprint forgeries.

Yet another problem associated with the average image identification system is that they prove to be an inefficient model for making comparisons between a real-time scanned image and a database of potential matching images or models. Most systems compare the real-time scanned image or model derived from that scan with each of the images or models contained within a database of images or models on a one-to-one basis until a matching pair is located. Depending on the size of the database, the time required to locate a matching pair can be substantial.

Due to these classical limitations on image identification technology, image identification applications have typically been limited to use in low security and/or supervised environments within which quick processing is not a priority. For instance, many law enforcement agencies that currently utilize fingerprint identification systems operate within the confines of minutiae-based matching. A minutiae-based system may be adequate in such an environment where a fingerprint expert may be available to take the time necessary to supervise the system and act as the arbiter in cases of multiple matches to an online database.

Minutiae-based systems, and other traditional fingerprint identification systems, are not adequate for unsupervised mass market applications, such as an automatic teller machine (ATM) that incorporates a fingerprint identification system and requires the user to submit a valid fingerprint scan when using an ATM card to make a money transaction. Neither are traditional systems appropriate for authentication systems designed to selectively and instantaneously provide access to places and devices such as computers, computer networks, facilities, automobiles and appliances based on the receipt of an authorized image. Efficient and effective functionality of these types of applications depend on a level of rapid and accurate analysis that cannot be consistently achieved by the traditional fingerprint image identification system.

Another benefit associated with an authentication system that incorporates image identification is that such a system is tunable, meaning the discrimination level or the match requirements during image comparison can be adjusted based on the nature of the environment to be secured and the desired level of security associated therewith. Due to burdens of non-repeatability of data, false match acceptances, and false match rejections, the range and number of levels within which a traditional image identification system can be tuned is narrowly limited. Such a system may not be tunable at all. Even the highest level of discrimination in a traditional system provides a substantially limited amount of discrimination.

SUMMARY OF THE INVENTION

Methods and procedures for improving the performance and reliability of image analysis within an image identification system include a series of image qualification functions designed to quickly process a fraction of available scanned image data and to provide feedback to a system user pertaining to image quality and authenticity. In one embodiment, if image qualification leads to the conclusion that the scanned image is fraudulent or of insufficient quality, then processing of the image is interrupted.

Also included in the present invention are functions designed to produce image models based on original image data and to catalogue such image models into a searchable database. In accordance with one embodiment, the creation of an image model involves analyzing and manipulating image data received from an image reader, and new data sets originating therefrom. Image models enrolled within a searchable database, in accordance with one embodiment of the present invention, can be derived either from a single scan of an object or from two or more scans of the same object.

The present invention also includes functions for comparing one image model to another. In accordance with one embodiment, a series of shift and rotate algorithms are applied to at least one of the image models until a position at which the two models best compare is identified. A score that represents a percentage of data elements that are common between the two image models is computed. In accordance with one embodiment, the level of similarity required in order for two image models to be considered matching is tunable.

Finally, the present invention provides functions for making a quick determination as to which, if any, of a potential thousands (or more, i.e., millions) of image models within a searchable database exhibit a desired level of similarity, as compared to a target image model. In accordance with one embodiment, rather than comparing image models specifically, a set of database index keys that describe different image model characteristics are defined and enable general, rather than specific comparisons to be made. In accordance with one embodiment, discrimination levels can be tuned.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF ILLUSTRATIVE EMBODIMENTS

The present invention relates to methods and procedures for improving the performance and reliability of image identification systems generally. The inventive concepts could be applied within systems designed to operate in conjunction with a broad range of image types, including but not limited to license plate images, graphic images and text based images. In addition, the present invention provides methods and procedures that are particularly suitable for improving the performance and reliability of fingerprint image identification systems specifically. While the remainder of the detailed description will discuss the present invention in relation to fingerprint image identification systems, it is to be understood that the concepts of the present invention could just as easily be applied within other types of image identification systems.

Figure 1:
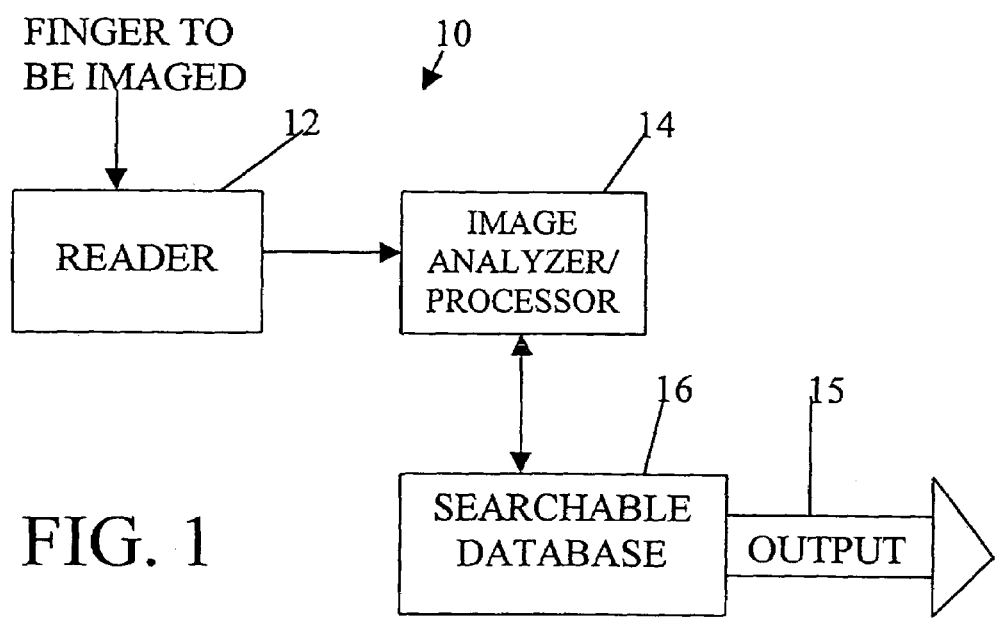
FIG. 1 is a block diagram of a fingerprint imaging system.

FIG. 1 is a block diagram of a fingerprint imaging system 10 within which the methods and procedures of the present invention could be applied. Imaging system 10 includes a reader portion 12, image analyzer/processor 14 and searchable database 16, which further includes an output 15. Reader portion 12 could be any of a number of known systems capable of scanning an image of a fingerprint and transferring data pertaining to the image to an image analyzer, such as image analyzer/processor 14.

In many cases, reader portion 12 will include an optical device that includes a reflecting face designed to receive the finger to be imaged. Light is input into the optical device by a light emitter and an optical image of the finger is reflected out of the optical device to an imager which receives the image and produces an analog image signal indicative of the optical signal received. In many systems, the analog signal is then transferred to a conventional analog/digital converter, which produces a digital representation of the analog signal. The digital signal is reformatted into a digitized image which can be stored and, in accordance with an embodiment of the present invention, manipulated. Finally, the digitized image is transferred out of the reader portion to an image analyzer/processor 14. Image analyzer/processor 14 varies with application, but generally analyzes the image data received for a wide variety of purposes and applications.

In an embodiment of the present invention, as will be discussed in more detail below, image analyzer/processor 14 creates an image model based on the particular features and characteristics of each image received from reader portion 12. These image models are more than facsimiles of their associated fingerprint images and include a unique range of data elements that provide analytical opportunities that are a part of the present invention.

In one embodiment of the present invention, image analyzer/processor 14 compares data elements of one image model to data elements of at least one other image model stored within searchable database 16. The image models contained in database 16 correspond to previously obtained scanned images, while the image model being compared typically corresponds to a contemporaneously scanned image. Fingerprint imaging system 10, through the incorporation of this process, is able to quickly and efficiently make a determination as to whether the image model corresponding to the contemporaneously scanned fingerprint is substantially similar to any of the image models included within the searchable database 16. As will be discussed more fully below, system 10 requires a particular level of similarity for a match to be indicated. In accordance with one embodiment, the level of required similarity is adjustable and can be tuned based on the nature of the environment for which system 10 is designed to provide security. In this manner, fingerprint imaging system 10 provides an efficient and accurate fingerprint image identification system that can be used, for instance, as a security measure to determine whether the person who places a finger on the reader portion 12 should be authorized to enter a room, to access a bank account or to take any other variety of actions.

As is shown in FIG. 1, searchable database 16 includes an output 15. The precise nature of output 15 depends on the context within which imaging system 10 is to be applied. For instance, output 15 could be an identification indicator of an image contained in searchable database 16 that substantially matches the image scanned by reader portion 12. This is but one example of the many potential forms of output 15.

Figure 2:
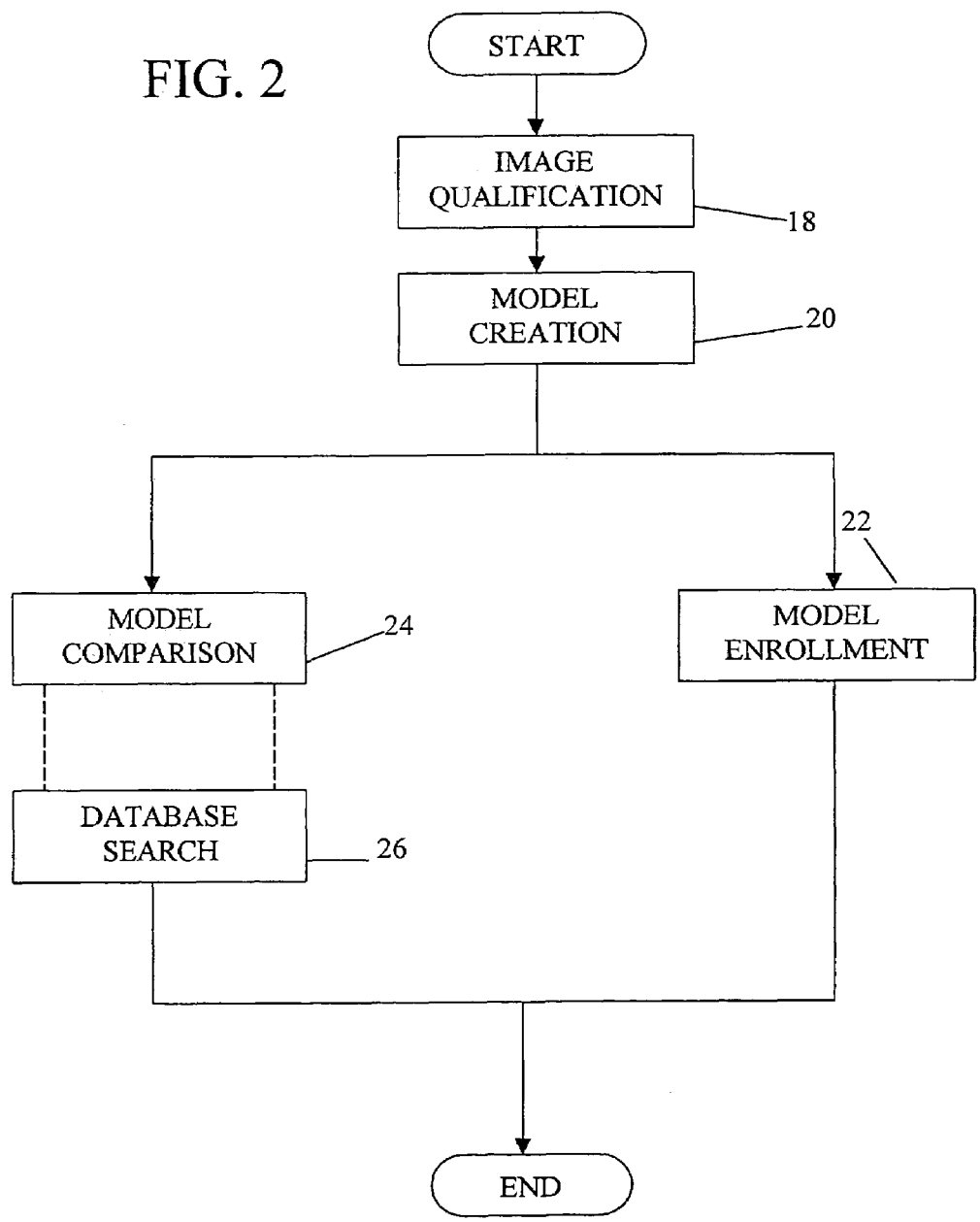
FIG. 2 is a flow diagram illustrating operations to be carried out within the fingerprint imaging system according to the present invention.

FIG. 2 is a flow diagram illustrating operations to be carried out within system 10, specifically within analyzer/processor 14, in accordance with an embodiment of the present invention. The process begins when image analyzer/processor 14 receives image data from reader portion 12. After receiving image data, image analyzer/processor 14 first performs, as is indicated by block 18 in FIG. 2, a series of image qualification functions.

Details pertaining to image qualification 18 will be discussed in greater detail with respect to FIG. 4. Briefly, image qualification 18 involves quickly processing a fraction of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected. Only a fraction of available image data is processed during image qualification 18 in order to expedite processing and to enable feedback to be provided to a system user on a substantially real time basis.

Once the image has been qualified, the next step, as is indicated by block 20 in FIG. 2, is the creation of an image model. Model creation 20 will be described in greater detail with respect to FIG. 15. Briefly, model creation 20 involves analyzing and manipulating image data received from reader portion 12, and new data sets originating therefrom, until an image model is produced. Due to an increased need for accuracy, the image data processed during model creation 20 is a complete set of image data, as opposed to the fractional set processed during image qualification 18. While the procedure for creating and the composition of an image model will be described in greater detail below, it should be emphasized that an image model is a collection of data based on the original print image and is not a facsimile of the original print image.

After an image model has been created, in accordance with an embodiment of the present invention, the image model is utilized for one of two purposes. First, as is indicated in FIG. 2, is model enrollment 22. Model enrollment 22 is the process with which image models are entered into and catalogued within searchable database 16. Image models enrolled within database 16, in accordance with one embodiment of the present invention, can be derived either from a single scan of a fingerprint image or from two or more scans of the same fingerprint image. When two or more scans are used to create an image model, consistent model elements that show up from scan to scan are noted in the image model. Inconsistent model elements, for example, discrepancies in the image data that are the result of previously mentioned variations in the reader environment, are eliminated.

In one embodiment of the present invention, when two or more scans are being utilized during model enrollment 22, the finger is removed from the reader portion 12 after each scan and then is subsequently replaced before the next scan is taken. In accordance with another embodiment, a significant amount of time may pass between scans. Because environmental factors such as finger pressure, finger moisture and finger positioning can vary from scan to scan, removing the finger from reader portion 12 between scans increases the likelihood that environmental inconsistencies will be eliminated when they do not show up in each individual scan.

As is indicated by block 24 in FIG. 2, and in accordance with another embodiment of the present invention, the other purpose for which an image model can be utilized is model comparison 24. Model comparison 24 will be described in greater detail below. Briefly, model comparison 24 is a process that can be utilized to compare one image model to another. Model comparison 24 is accomplished by applying a series of shift and rotate algorithms to at least one of the image models until a position at which the two models best compare is identified. Then, a score that represents a percentage of data elements that are common between the two image models is computed.

As is indicated by block 26 in FIG. 2, and in accordance with an illustrative embodiment of the present invention, database search 26 could be performed in place of or in combination with model comparison 24. Database search 26 will be described in greater detail below. Briefly, database search 26 involves a quick and efficient determination as to which, if any, of a potential thousands, or even millions, of image models within database 16 exhibit a desired level of similarity, as compared to a target image model. In accordance with one embodiment, the target image model is an image model associated with a contemporaneously scanned image. Rather than comparing image models specifically, a set of database keys that describe different image model characteristics are defined and enable general, rather than specific comparisons to be made during the database search 26 process. The desired level of similarity is adjustable and could be selected based on a desired processing speed, a desired level of security, and other characteristics indicative of the environment for which system 10 is designed to provide security.

It should be emphasized that nearly all, with an anti-spoofing procedure to be discussed later in this application being a primary exception, of the methods and procedures of the present invention are not dependent upon the inclusion of a particular reader portion 12 and can be retrofitted to work with any reader technology. For the purpose of illustrating embodiments of the present invention, however, an example set of image scan parameters that correspond to an example reader portion 12 will be adopted. In particular, the example parameters will correspond to a SACMAN™ fingerprint reader device offered and marketed by Secured Access Control Technologies, Inc, of Eagan, Minn.

Figure 3:
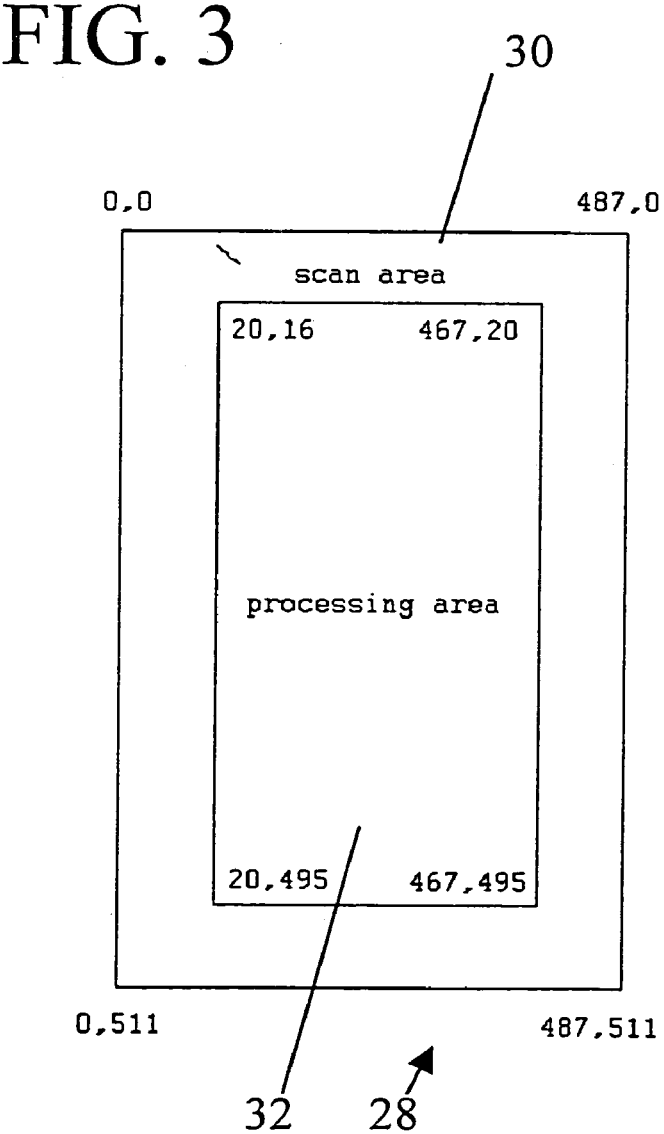
FIG. 3 is a pictorial representation of an example set of image scan parameters.

FIG. 3 is a pictorial representation of details pertaining to the example set of image scan parameters. The example parameters are generally indicated by reference numeral 28 and are not critical to the present invention. The example reader portion 12, which produces the example parameters 28, illustratively includes a camera that has an aspect ratio of 4 to 3 and provides 64 levels of gray-scale, where neither value is critical to the present invention. As is illustrated by FIG. 3, image scan parameters 28 include a scan area 30 which is larger than a processing area 32. Processing area 32 is part of scan area 30 and is the only portion of scan area 30 that provides data that is actually captured for analysis. Within scan area 30, there are 510 lines and 488 pixels per line. For the purpose of simplifying explanation of the present invention, it is to be assumed that the reader portion 12 produces no linear distortion due to optics (a flat image is assumed).

Figure 4:
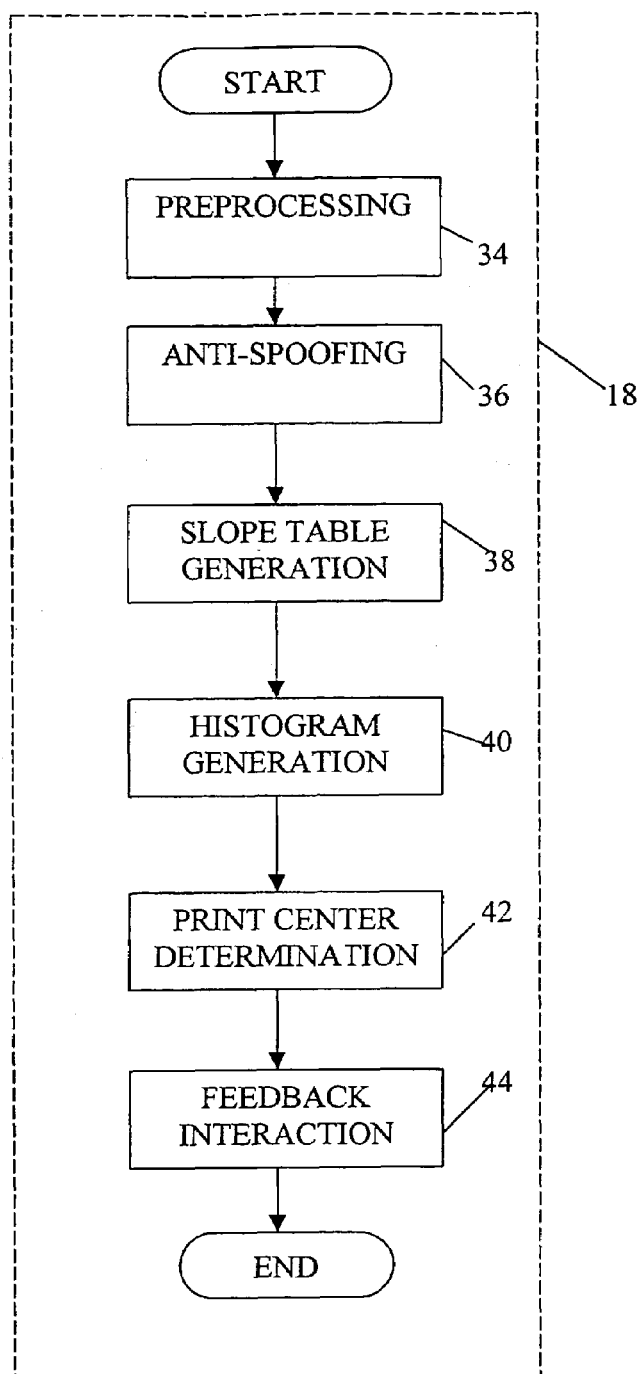
FIG. 4 is a block diagram illustrating a set of procedural components corresponding to an image qualification portion of the operations shown in FIG. 2.

FIG. 4 is a block diagram illustrating a set of procedural components corresponding to the image qualification 18 portion of the operations illustrated in FIG. 2. It should be emphasized that the primary purpose of image qualification 18 is to ensure that the image data received by image analyzer/processor 14 from reader portion 12 is a scan of a non-fraudulent fingerprint and of suitable quality for subsequent image processing.

In accordance with an embodiment of the present invention, as was previously alluded to, all of the functions within image qualification 18 are carried out utilizing a fraction of the image data potentially available for analysis. In one embodiment, analyzer/processor 14 receives a complete set of image data from reader portion 12 but utilizes only every other line and every other pixel of information for analysis during image qualification 18. In other words, only one quarter of the data within processing area 32 is analyzed during image qualification 18. The purpose of processing only a fraction of available data is to expedite processing, thereby enabling feedback pertaining to image quality and authenticity to be provided to a system user in a substantially real time manner. Upon receiving real time feedback, a system user is then allowed to adjust variables (change pressure applied to scanning surface, produce a non-fraudulent image source, wipe excessive moisture from finger, etc.) until all negative feedback is remedied and the image scan is of sufficient quality to continue with the processing of the image.

Figure 5:
FIG. 5 is an illustration of a raw scan image.
Figure 6:
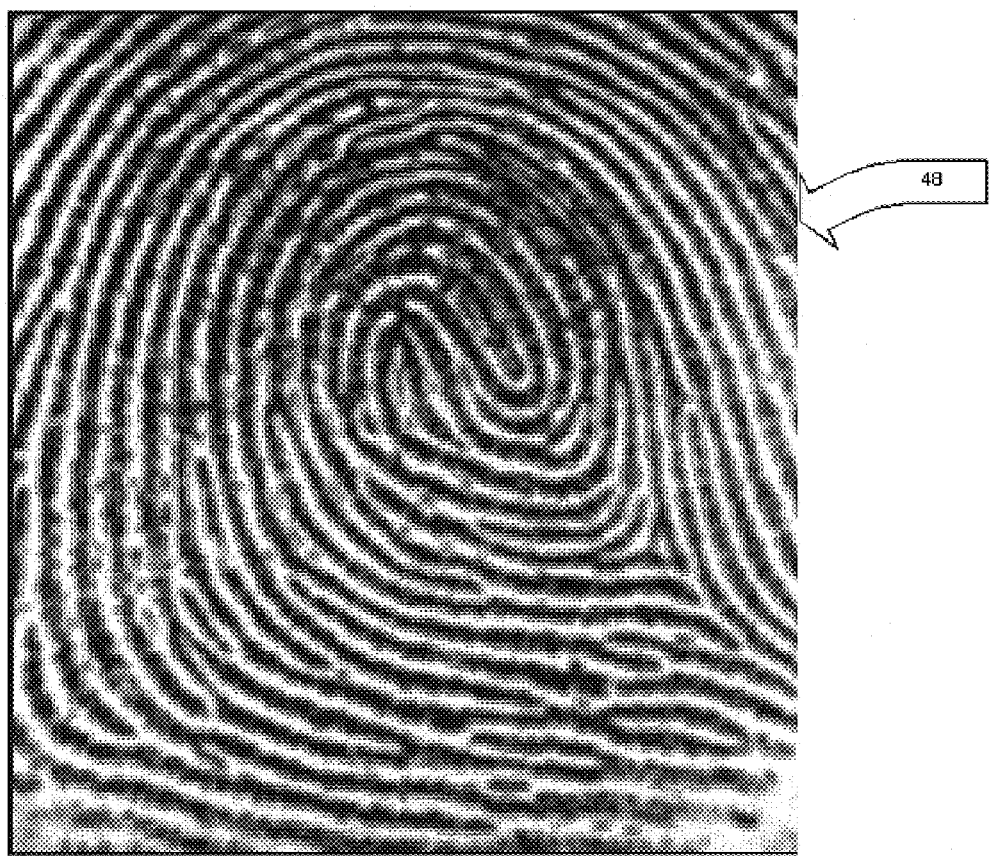
FIG. 6 is an illustration of an intermediate image produced in accordance with a preprocessing portion of the operations shown in FIG. 4.

In more detail, image qualification 18 begins with preprocessing 34 (see FIG. 4). When analyzer/processor 14 receives image data from reader portion 12, it is in a raw scan, also known as gray-scale, format. The purpose of preprocessing 34 is to convert the raw scan image into a monochrome image, which is desirable for subsequent image qualification 18 processing. During preprocessing 34, a raw scan image, similar to raw scan image 46 in FIG. 5, is received from reader portion 12 and first transformed into an intermediate image similar to intermediate image 48 in FIG. 6. As the Figures illustrate, intermediate image 48 is similar to raw scan image 46 but includes enhancements of primary features. To accomplish the image transformation, in accordance with an embodiment of the present invention, each pixel in intermediate image 48 is created by averaging an n×n pixel (where n is greater than 1) array taken from the raw scan image 46. In accordance with one embodiment, 3×3 pixel arrays are utilized. The pixel (new pixel value) at row y and column x in intermediate image 48 is given by:

Equation 1
  Set new pixel value to zero.
  For x1 values of x−1 to x+1 do
  For y1 values of y−1 to y+1 do
  Add to new pixel value the value of the pixel in Raw Scan at x1 and y1
  Divide new pixel value by 9.

Store new pixel value in an intermediate image buffer at row y and column x.

Figure 7:
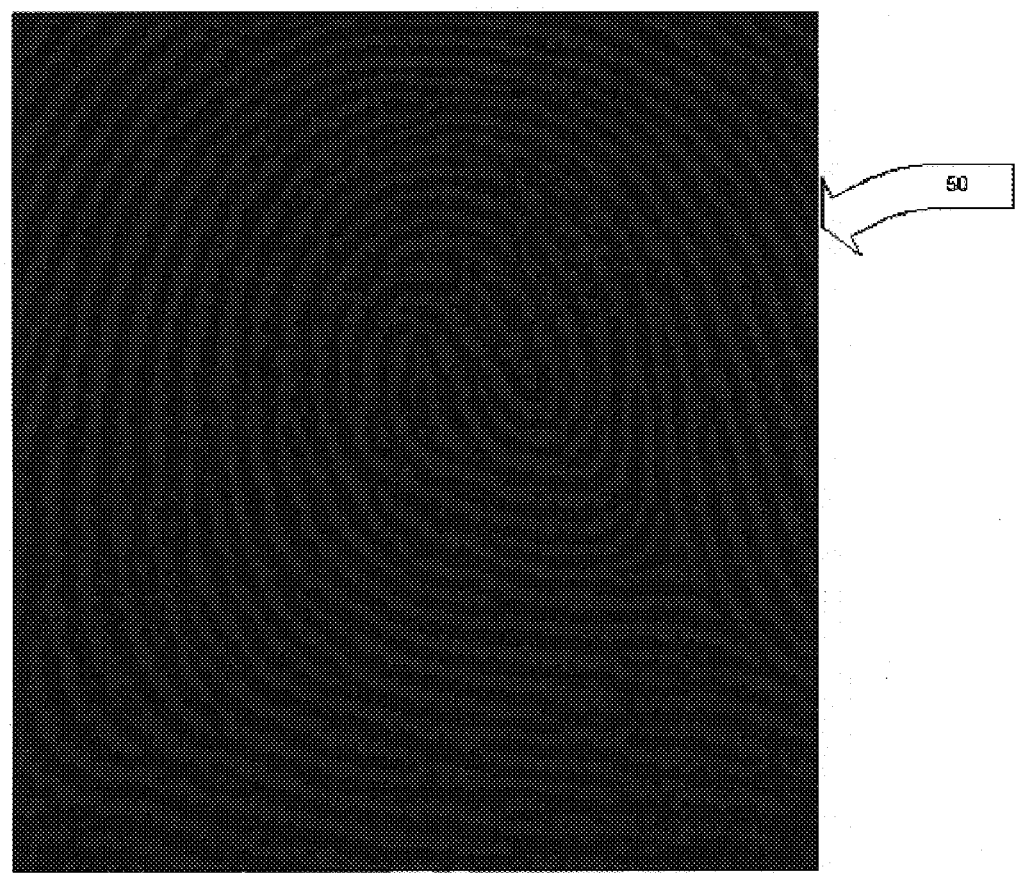
FIG. 7 is an illustration of a monochrome image produced in accordance with the preprocessing portion of the operations shown in FIG. 4.

The next step in preprocessing 34, in accordance with one embodiment, is to convert intermediate image 48 (FIG. 6) into a monochrome image similar to monochrome image 50 in FIG. 7. In accordance with an embodiment of the present invention, the transformation from intermediate image 48 (FIG. 6) to monochrome image 50 (FIG. 7) is accomplished as follows: Each pixel in the monochrome image is created by comparing the 5×5 average value of a pixel taken from intermediate image 48 with a 3×3 average for the same pixel location. It should be pointed out that different sizes of pixel arrays could be utilized without departing from the scope of the present invention. The pixel (new pixel value) at row y and column x in the monochrome image is given by:

Equation 2.
  Set average__1 value to zero.
  For x1 values of x−2 to x+2 do
  For y1 values of y−2 to y+2 do
  Add to average__1 value the value of the pixel in enhanced image at x1 and y1
  Divide average__1 value by 25 (5 multiplied by 5).
  Set average__2 value to zero.
  For x1 values of x−1 to x+1 do
  For y1 values of y−1 to y+1 do
  Add to average__2 value the value of the pixel in enhanced image at x1 and y1
  Divide average__2 value by 9 (3 multiplied by 3).
  If average__2 value is greater than average__1 value
    Then set pixel value to zero
    Else, set pixel value to 255.
  Store pixel value in monochrome image at row y and column x.

With reference to FIG. 4, another process incorporated within image qualification 18 is anti-spoofing 36. In order for fingerprint imaging system 10 to incorporate anti-spoofing techniques as described herein, a reader portion 12 that includes both an infrared light source and an LED light source for shining light into an optical device must be incorporated in the system. Of course, with other readers, other anti-spoofing technologies can be implemented. Anti-spoofing 36 is a method for detecting a non-live finger, such as a fake finger, a drawing on paper or a photo-plot on Mylar film. Anti-spoofing also provides protection against the prerecorded/playback of live scans. Anti-spoofing, in accordance with one embodiment of the present invention, involves the capture and comparison of two consecutive images, where the first image is side-lit by an infra-red light source and the second image is back-lit by a visible LED light source.

Figure 9:
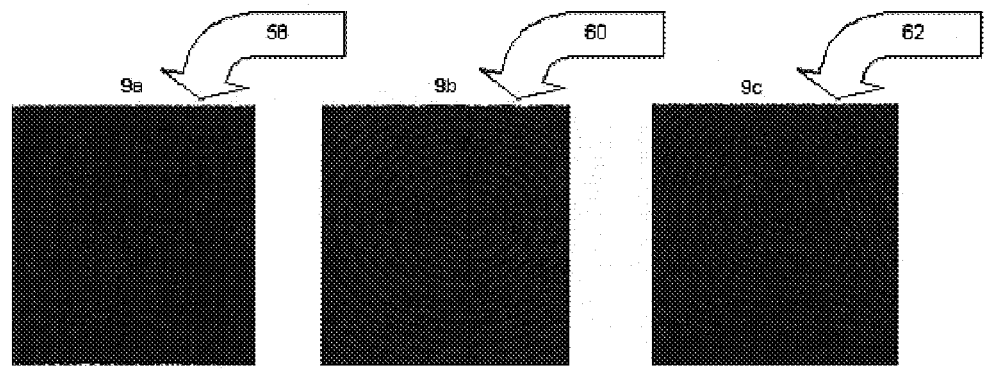
FIG. 9A is an illustration of a monochrome image derived from a Mylar film source using an infrared light source within an image reader.
FIG. 9B is an illustration of a monochrome image derived from a paper source using an infrared light source within an image reader.
FIG. 9C is an illustration of a monochrome image derived from a live finger source using an infrared light source within an image reader.

The anti-spoofing process starts by insuring that the back-lit LED light source is turned off. Next, the side-lit infra-red light source is turned on. In accordance with one embodiment, this switching of light sources is performed on a random basis to defeat prerecorded/playback spoofing attack scenarios. The infra-red lit image is captured and, in one embodiment, is preprocessed in accordance with previously described preprocessing 34 to produce a first monochrome image. Monochrome images 58, 59, and 60, respectively depicted in FIGS. 9A, 9B and 9C, illustrate images derived using an infra-red light source to scan images contained on a Mylar film source, a paper source and a live finger source, also respectively.

Figure 8:
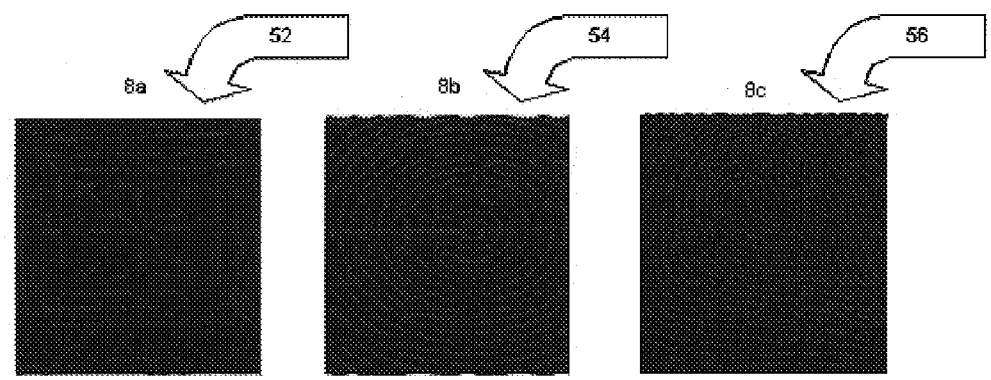
FIG. 8A is an illustration of a monochrome image derived from a Mylar film source using an LED light source within an image reader.
FIG. 8B is an illustration of a monochrome image derived from a paper source using an LED light source within an image reader.
FIG. 8C is an illustration of a monochrome image derived from a live finger source using an LED light source within an image reader.

The next step in the anti-spoofing process is to turn off the infra-red light source and to turn on the back-lit LED light source in order to capture a second image, which in accordance with one embodiment, is preprocessed and transformed into a second monochrome image. Monochrome images 52, 54, and 56, respectively depicted in FIGS. 8A, 8B and 8C, illustrate images derived using a back-lit LED light source to scan images from a Mylar film source, a paper source and a live finger source, also respectively.

In the final step of anti-spoofing, the infra-red originated monochrome images are compared to the LED originated monochrome images and matching pixel values are noted. Generally, live finger image scans will produce a very high correlation of like values as compared to images based on fraudulent image sources. Illustratively, images 56 and 62 are substantially the same, whereas the primary features in images 52 and 58, and images 54 and 60 include pixels having values substantially opposite to one another (i.e. a feature that is black in one image is not black in the corresponding comparison image). In one embodiment of the present invention, fingerprint imaging system 10, when confronted with results that indicate a non-live image has been presented, will terminate further processing until a live finger is presented for scanning.

It should be noted that while the anti-spoofing method has been described in relation to the comparison of monochrome scan images, the anti-spoofing process could just as easily be applied to raw scan or other image configurations. Because monochrome images, however, are comprised of a limited range of pixel values, they provide a smooth comparative model that typically produces a clear and accurate result.

Referring to FIG. 4, another component within the image qualification 18 process is slope table generation 38. The purpose of the slope table, once it is generated, is not to create information directly used to provide feedback to the system user, but to create a statistical tool that is used as an aid in subsequent image qualification 18 processing. Specifically, the slope table could be used to supplement histogram generation 40 and could be used during print center determination 42.

To begin slope table generation 38, the monochrome image created during preprocessing 34, illustratively monochrome image 50 (FIG. 7), is first divided into an array of n×n pixel grids (where n is greater than 1). In one embodiment, an array of 8×8 pixel grids is utilized. In accordance with this embodiment, and in accordance with example image scan parameters 28 (FIG. 3), an array of 8×8 pixel grids yields 27 grids in the x direction and 29 grids in the y direction.

To aid in the creation of the slope table, a raw slope table is first created. The raw slope data table is illustratively, in accordance with example parameters 28, a two dimensional array 27×29 where each entry in the table contains three entries:

1. A count of the changes in the x coordinate.
2. A count of the changes in the y coordinate.
3. A count of the pixels tested.

The raw slope data table is created by doing a contour trace of the features within each pixel grid of the array of pixel grids into which monochrome image 50 has been divided. As the trace migrates through the pixel grids, the three elements included in the raw slope data table are incremented. Below is a diagram showing the values to be added to the raw slope data table for the eight possible next pixel combinations (P is the current pixel, N is the next pixel, * represents an ordinary pixel and serves as a filler for display purposes):

Equation 3

| *** | N** | *N* | **N |
|-----|-----|-----|-----|
| NP* | *P* | *P* | *P* |
| *** | *** | *** | *** |
| x = +1 | x = +1 | x = 0 | x = -1 |
| y = 0 | y = +1 | y = +1 | y = +1 |
| *** | N** | *N* | **N |
| NP* | *P* | *P* | *P* |
| *** | *** | *** | *** |
| x = -1 | x = -1 | x = 0 | x = +1 |
| y = 0 | y = -1 | y = -1 | y = -1 |

Figure 10:
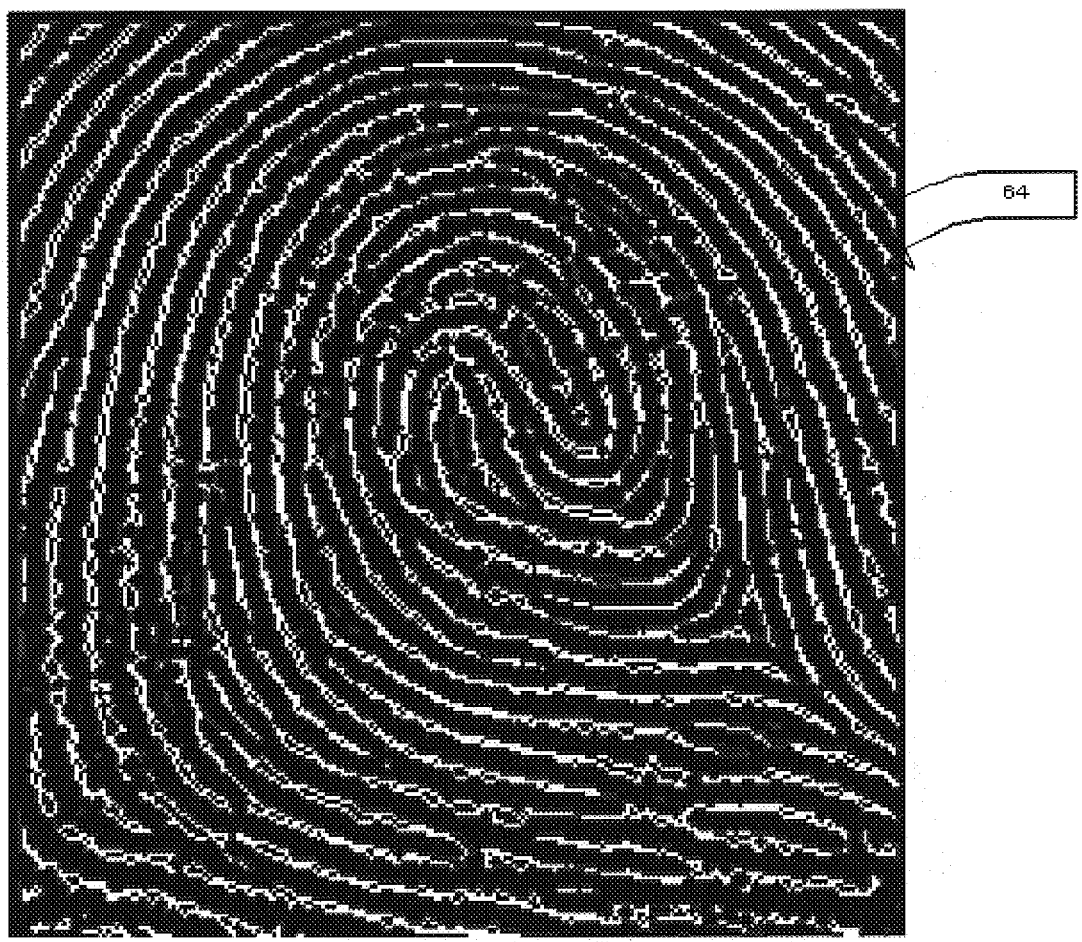
FIG. 10 is an illustration of a monochrome image after a contour trace has been completed in accordance with a slope table generation portion of the operations shown in FIG. 4.

Image 64 in FIG. 10 is an illustration of a monochrome image after the contour trace has been completed.

When the contour trace has been completed throughout every pixel grid and the raw slope data table is complete, the slope table is ready to be generated. The slope table is a two-dimensional array and, in accordance with example parameters 28 (FIG. 3), is 27×29. Each entry in the slope table consists of a single entry, namely the slope of a ridge or ridges flowing through each particular pixel grid. Initially, all entries in the slope table are set to a –one (invalid slope). The slope for each pixel grid is calculated utilizing information from the raw slope data table and is specifically computed as follows:

Equation 4
Set x coordinate count to zero.
Set y coordinate count to zero.
Set pixel count value to zero.
For x1 values of x−1 to x+1 do
For y1 values of y−1 to y+1 do
from raw slope table at coordinates x1 and y1 do
Add to pixel count the count of pixels tested.
Add to x coordinate count the changes in the x coordinate.
Add to y coordinate count the changes in the y coordinate.
from raw slope table at coordinates x and y do
Add to pixel count the count of pixels tested then divide by 2.
Add to x coordinate count the changes in the x coordinate then divide by 2.
Add to y coordinate count the changes in the y coordinate then divide by 2.
If the pixel count is greater than 10
Then compute the slope using the trig function arcsine.
Find angle function
Input: delta y and delta x (computed previously above)
Set quadrant to 0
If delta y is less than 0
Then add 2 to quadrant
If delta x is less than 0
Then add 1 to quadrant
Hypotenuse=square root of ((delta x times delta x)+ (delta y times delta y))
Angle=arcsine (delta y divided by hypotenuse) times degrees per radian.
If quadrant is 1
Then angle=180−angle
Else if quadrant is 2
Then angle=360−angle
Else if quadrant is 3
Then angle=180+angle
Since slopes have values between 0 and 180, the angle is converted to a slope as follows:
If angle is equal to or greater than 180
Then slope is angle minus 180
Else slope is the angle
Increment number of pixels processed by one.

Figure 11:
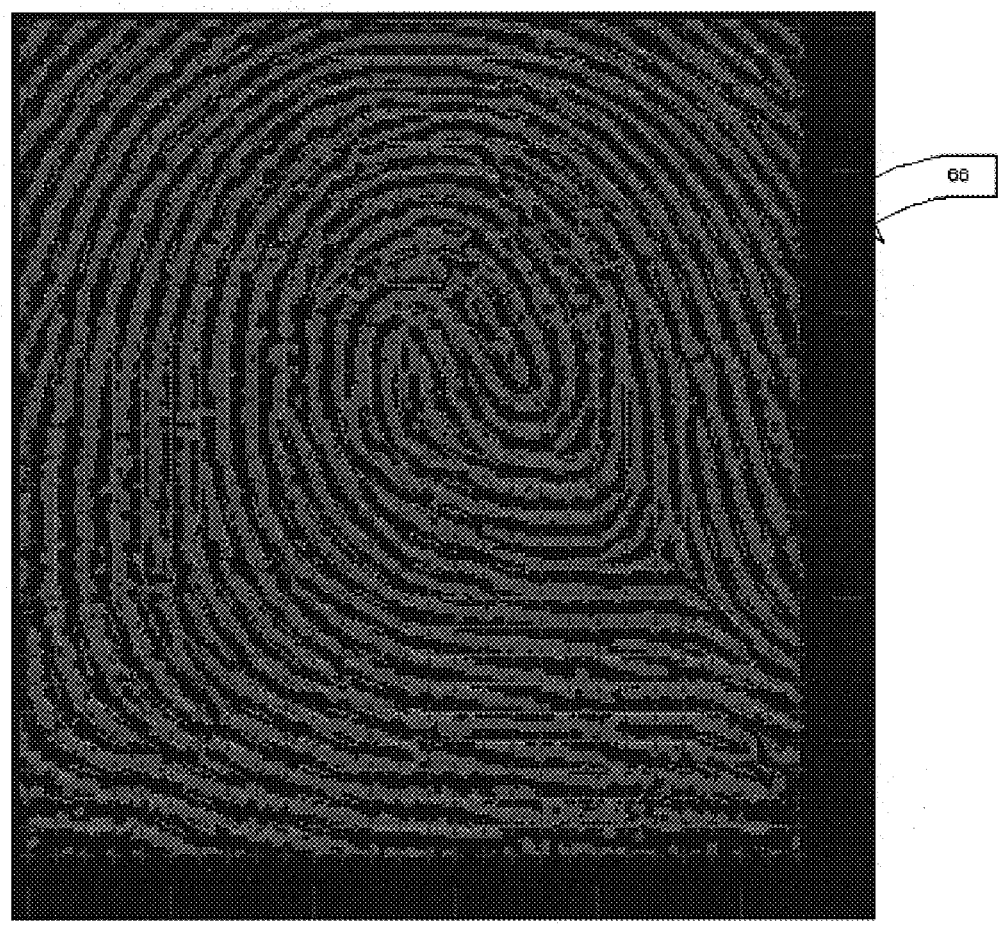
FIG. 11 is an illustration of a monochrome image with a slope overlay based on a slope table completed in accordance with the slope table generation portion of the operations shown in FIG. 4.

Image 66 in FIG. 11 is an illustration of a monochrome image with a slope overlay based on a completed slope table.

Referring to FIG. 4, another component of image qualification 18 is histogram generation 40. A completed histogram is used within imaging system 10 to determine the quality of scanned fingerprint image data and the adequacy of the image data for subsequent processing.

Figure 12:
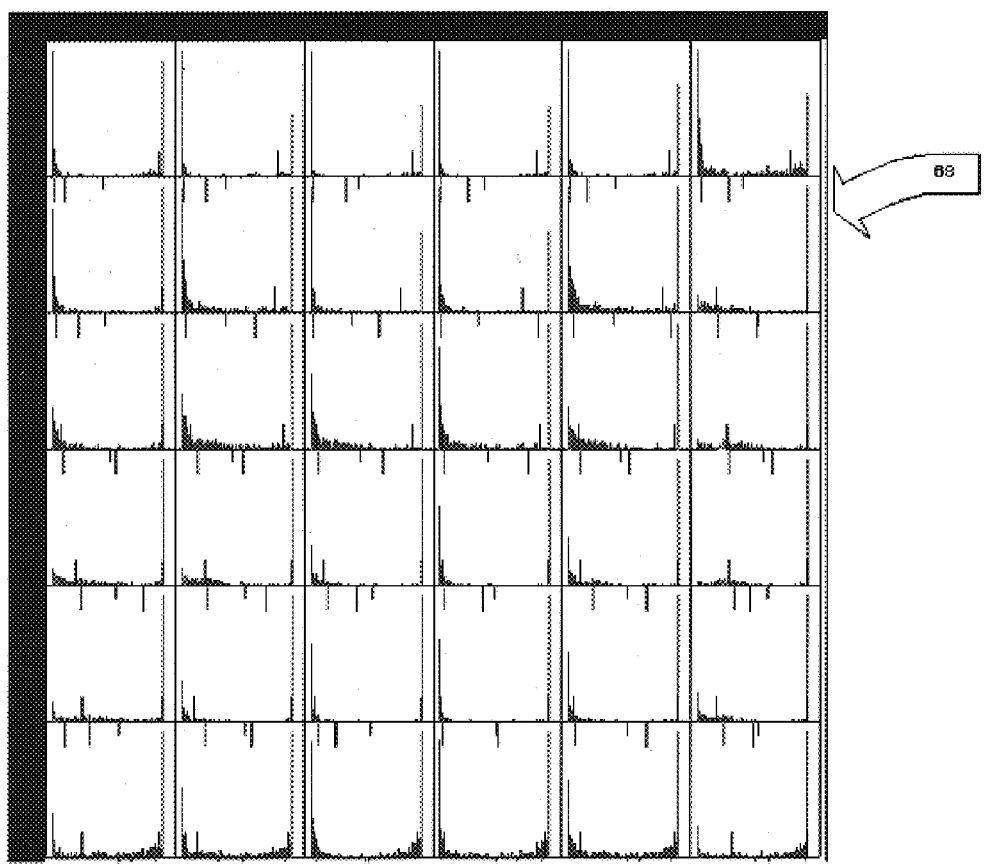
FIG. 12 is an illustration of a histogram completed in accordance with a histogram generation portion of the operations shown in FIG. 4.
Figure 13:
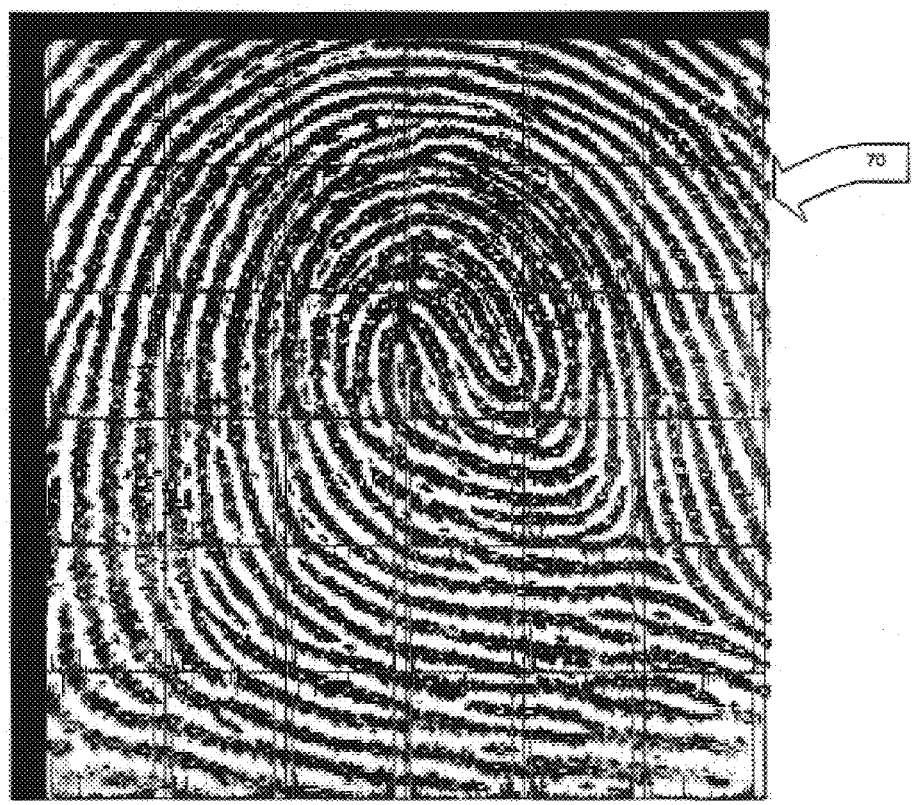
FIG. 13 is an illustration of the histogram overlaying a raw scan image from which the histogram was derived.

A completed histogram is a multiple dimensioned n×n array (where n is greater than 1), illustratively two dimensional, and in accordance with example parameters 28 (FIG. 3), a 6×6 array. Each cell within the array corresponds to a portion of the image data under analysis. Image 68 in FIG. 12 is an illustration of a completed histogram that includes cell 67, in addition to other unlabeled cells. Image 70 in FIG. 13 is an illustration of the same completed histogram overlaying the raw scan image from which the histogram was illustratively derived. Assigning different portions of an image to different cells of the histogram array enables multiple individual quality determinations to be made for limited quantities of image data corresponding to each of the different histogram cells, rather than a single quality determination being made for the entire set of image data. In one embodiment of the present invention, these multiple quality determinations can be utilized to selectively exclude portions of the image data corresponding to cells that demonstrate low quality characteristics. After low quality cells have been excluded, a positive or negative system determination can be made as to whether enough data cells of acceptable quality are available for subsequent processing.

In accordance with an embodiment of the present invention, each cell of a histogram includes a histogram list. The histogram list, in accordance with the above described example reader portion 12, is an array of 64 entries (zero to 63). Each entry is assigned a pixel value (example reader portion 12 has 64 potential pixel values) and includes a count of the number of image data pixels having the assigned pixel value. Each histogram cell also illustratively includes a count of the number of pixels within the cell that are processed and classified in the histogram list.

It is to be understood that some reader portion technologies may require histograms with different configurations in order for accurate quality determinations to be made. For instance, some reader portion 12 technologies my include a broader or narrower range of pixel values. It is to be understood that histograms tailored to accommodate other reader portion 12 technologies are still within the scope of the present invention.

A more detailed description of the functions performed during the generation of an illustrative two dimensional, 6×6 histogram array during the histogram generation 40 portion of image qualification 18 is as follows:

Equation 5
Box width is defined as the number of pixels per line divided by 6 (every other pixel included).
Box height is defined as the number of lines divided by 6 (every other line included).
For x values of zero to line length do
  For y values of zero to number of lines do
    Pixel value is contents of raw scan image at coordinates x and y.
    Slope table x coordinate is at x divided by 8 (illustrative slope table grid size).
    Slope table y coordinate is at y divided by 8 (illustrative slope table grid size).
    If the contents of the slope table is not −1
      (Recall −1 represents an area that the slope could not be computed).
    Then
      Histogram table x coordinate is at x divided by Box width.
      Histogram table y coordinate is at y divided by Box height.
Increment histogram list, at index pixel value, by one.

In one embodiment of histogram generation 40, image quality is divided into four classifications:
1. Excellent.
2. Good.
3. Fair.
4. Poor.

In addition, those areas that are considered to have fair or poor quality may have two additional attributes: too dark or too light.

The precise details as to the types of data elements recorded in a completed histogram, and how those data elements are interpreted to make image quality classifications differ depending on the type of data desired and the reader portion 12 that is being used within fingerprint imaging system 10. In other words, quality classification can be tuned in accordance with the type of image quality data desired and in accordance with a particular reader portion 12.

Figure 14:
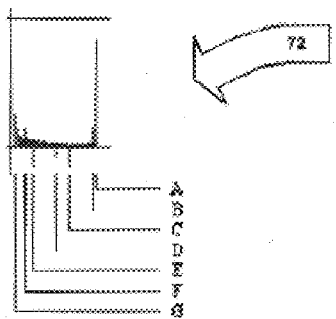
FIG. 14 is an illustration of a histogram cell.

In one embodiment of quality classification, the data recorded in each histogram cell includes seven particular data elements. In the interest of simplifying description, the seven data elements shall be given labels A-G. Histogram cell 72 in FIG. 14 includes data elements A-G, which illustratively correspond to the following information:

Equation 6
A. Represents the number of pixels in the histogram list corresponding to the most white 25% of the listed pixel values.
B. Represents the number of pixels in the histogram list corresponding to the most white 35% of the listed pixel values.
C. Maximum height between points B and F. (not used in quality determination)
D. Average pixel value. (not used in quality determination)
E. Minimum height between points B and F. (not used in quality determination)
F. Represents the number of pixels in the histogram list corresponding to the most black 35% of the listed pixel values.
G. Represents the number of pixels in the histogram list corresponding to the most black 25% of the listed pixel values.

In accordance with one embodiment of quality determination, image data quality is determined by comparing the columns associated with points A, B, F and G. Specifically, image data quality is illustratively determined as follows:

| Equation 7 | | |
|---|---|---|
| Excellent: | A − B <= 2 | and |
|  | B > 59 | and |
|  | F − G <= 2 | and |
|  | F < 5 |  |
| Good: | A − B <= 2 | and |
|  | B > 55 | and |
|  | F − G <= 2 | and |
|  | F < 9 |  |
| Fair light: | B > 59 | and |
|  | F > 10 |  |
| Fair dark: | B < 59 | and |
|  | G < 10 |  |
| Poor light: | B > 59 | and |
|  | F > 30 |  |
| Poor dark: | B < 59 | and |
|  | G < 30 |  |

As will be discussed in more detail below, feedback relating to the ascertained image quality is provided to a system user in accordance with feedback interaction 44.

Referring again to FIG. 4, print center determination 42 is another component that could be included within image qualification 18. Print center determination 42 is performed by analyzing image data in order to find the center of the associated print image. One way that print center determination 42 could be accomplished is through the application of a set of filter rules to data contained in the slope table generated during slope table generation 38. After the print center has been determined, a further determination is made as to whether a new scan should be taken with the system user's finger repositioned on an imaging surface of reader portion 12. Feedback relating to this further determination is provided to a system user in accordance with feedback interaction 44.

Referring once again to FIG. 4, feedback interaction 44 is another potential component of image qualification 18. As was previously mentioned, reader portion 12 of fingerprint imaging 10 (FIG. 1) is capable of capturing a live scan of a fingerprint. In accordance with feedback interaction 44, as image analyzer/processor 14 receives fingerprint image data from reader portion 12 and performs the functions of image qualification 18 on a fraction of that data, substantially real time feedback and instructions are provided to the user of system 10 as to inadequate characteristics of the scanned image data that might be improved. Feedback and instructions for the correction of inadequacies of image data might pertain to the proper positioning of the user's finger on reader portion 12 (print center determination 42). Alternatively, they may pertain to the detection of a live finger (anti-spoofing 36) or to image data quality characteristics (histogram generation 40). In one embodiment of the present invention, feedback pertaining to the moisture content of the system user's finger may also be provided.

Figure 15:
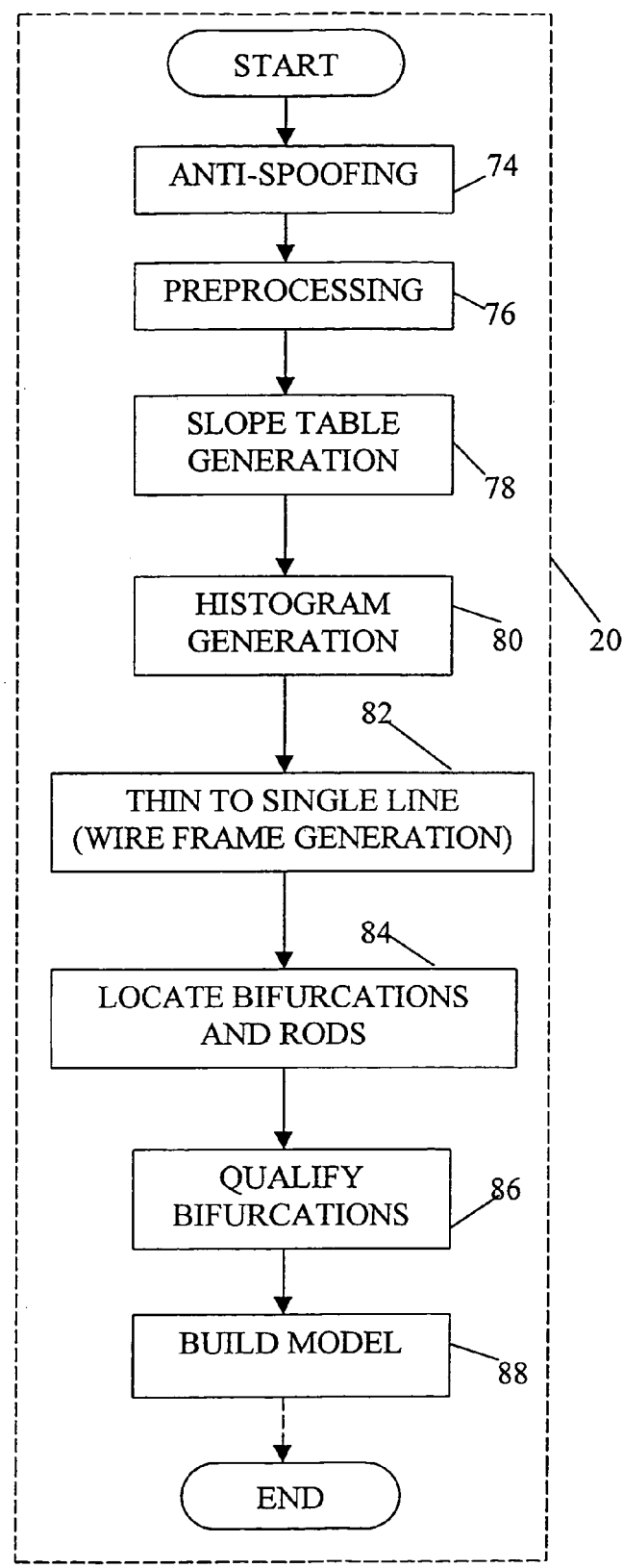
FIG. 15 is a block diagram illustrating a set of procedural components corresponding to a model creation portion of the operations shown in FIG. 2.

Once image qualification 18 has been completed, the next step, as is indicated by block 20 in FIG. 2 is the creation of an image model. FIG. 15 is a block diagram illustrating a set of procedural components that, in accordance with an embodiment of the present invention, make up model creation 20. To enhance the accuracy of model creation 20, substantially all available image data, in one embodiment, all the image data included within example processing area 32 (FIG. 3), is made available to image analyzer/processor 14 for model creation 20 processing. This stands in contrast to the fraction of data processed during image qualification 18 for speed and efficiency purposes. While some of the components of model creation 20 are similar to components of imaging qualification 18, none of the data sets generated during image qualification 18 are utilized during model creation 20. Model creation 20, like image qualification 18, starts with a set of raw scan image data and proceeds from that point.

Model creation 20, in accordance with FIG. 15, begins with anti-spoofing 74. Anti-spoofing 74 is an optional step and is performed in substantially the same manner and for the same reasons described above in relation to anti-spoofing 36, a procedural component of image qualification 18. One key difference between anti-spoofing 74 and anti-spoofing 36, however, is that anti-spoofing 74 is performed utilizing a complete data set, whereas anti-spoofing 36 is performed utilizing only a fraction of available data. The purpose of anti-spoofing 74 is to provide further insurance that the source of raw scan image data is not a fraudulent one. In accordance with one embodiment of the present invention, when anti-spoofing 74 leads to the indication that the source of raw scan data is fraudulent, then subsequent processing is terminated until a valid image source is submitted to system 10.

Anti-spoofing 74 could be performed utilizing raw scan image data or an alternate image data format produced during model creation 20. For instance, anti-spoofing 74 could be preformed utilizing monochrome images that, as will be discussed below, are the product of preprocessing 76. In other words, while anti-spoofing 74 has been illustrated in FIG. 15 as the first step in model creation 20, it could be performed later in the model creation 20 process, or, because anti-spoofing 74 is optional, the step could be eliminated altogether.

An early step in the model creation 20 process, as is indicated by block 76 in FIG. 15, is preprocessing 76. The purpose of preprocessing 76 is to produce a monochrome image with an adjusted aspect ratio and with smooth and distinct features suitable for subsequent processing. Preprocessing 76 is different than the preprocessing step described above in relation to image qualification 18. In particular, preprocessing 76 is performed utilizing a complete, rather than fractional, set of available image data. In addition, preprocessing 76 includes some additional steps intended to eliminate irregularities and inconsistencies in the resulting monochrome image. These steps, while unnecessary for image qualification 18, prove to be beneficial to subsequent processing during model creation 20 processing.

Figure 16:
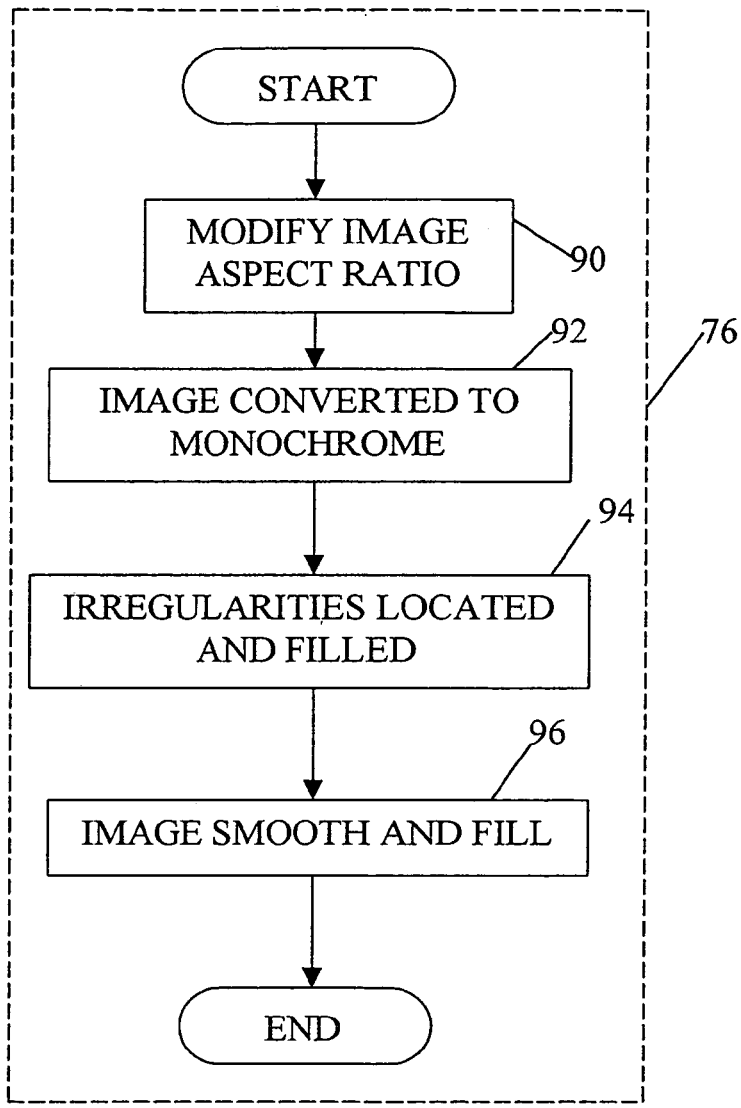
FIG. 16 is a block diagram illustrating a set of procedural components corresponding to a preprocessing portion of the operations shown in FIG. 15.

FIG. 16 is a block diagram illustrating the primary procedural components of preprocessing 76, in accordance with an embodiment of the present invention. As is illustrated by block 90, an early step in the process is to generate a set of image data similar to the raw scan image data but with a modified aspect ratio. In accordance with one embodiment, the aspect ratio is adjusted to a 1 to 1 configuration. The correction of the aspect ratio is necessary for subsequent processing that involves rotation of the image and its corresponding data. Conceivably, model creation 20 could be carried out without adjusting the image aspect ratio, but the adjustment is beneficial to procedures carried out after model creation 20, such as model comparison 24.

Figure 17:
FIG. 17 is an illustration of a corrected raw scan image.

In accordance with an embodiment of the present invention, the aspect ratio of a raw scan image is modified by copying the raw scan image line by line and replicating lines at appropriate times and places so as to produce a corrected raw scan image with the desired aspect ratio scale. Image 98 in FIG. 17 is an illustration of a corrected raw scan image, wherein the aspect ratio of a raw scan image has been adjusted to 1 to 1.

Another component of preprocessing 76, in accordance with block 92 in FIG. 16, is the conversion of a corrected raw scan (image 98 in FIG. 16) into a monochrome image. Because a monochrome image produced accordingly will be based on all available image data associated with an image having a modified aspect ratio, it is unlikely that this monochrome image will be identical to the one generated during image qualification 18. In addition, characteristics within the model creation 20 monochrome image, as will be described below, are eventually modified and manipulated to emphasize particular image characteristics. This emphasizing of image characteristics is beneficial to model creation 20 but is unnecessary for image qualification 18.

In accordance with an embodiment of the present invention, the first step in the conversion of a corrected raw scanned image to a monochrome image is the creation of an intermediate image. The purpose of creating an intermediate image is to average features within the corrected raw scan image that are predominantly too light or too dark, possibly due to the moisture content of a system user's finger or lighting characteristics. Averaging of these features creates a resultant image that provides for more complete and consistent wire frame generation which follows in subsequent processing steps. In accordance with one embodiment, to create the intermediate image, each pixel is selected by averaging a 5×5 pixel array taken from a corrected raw scan of an image (corrected meaning that the image aspect ratio has been adjusted). The pixel (new pixel value) at row y in column x in the intermediate image is given by:

Equation 8

Set new pixel value to zero.
    For x1 values of x−2 to x+2 do
        For y1 values of y−2 to y+2 do
            Add to new pixel value the value of the pixel in Corrected Raw Scan at x1 and y1
Divide new pixel value by 25 and round to the nearest integer value.

Store new pixel value in intermediate image at row y and column x.

Figure 18:
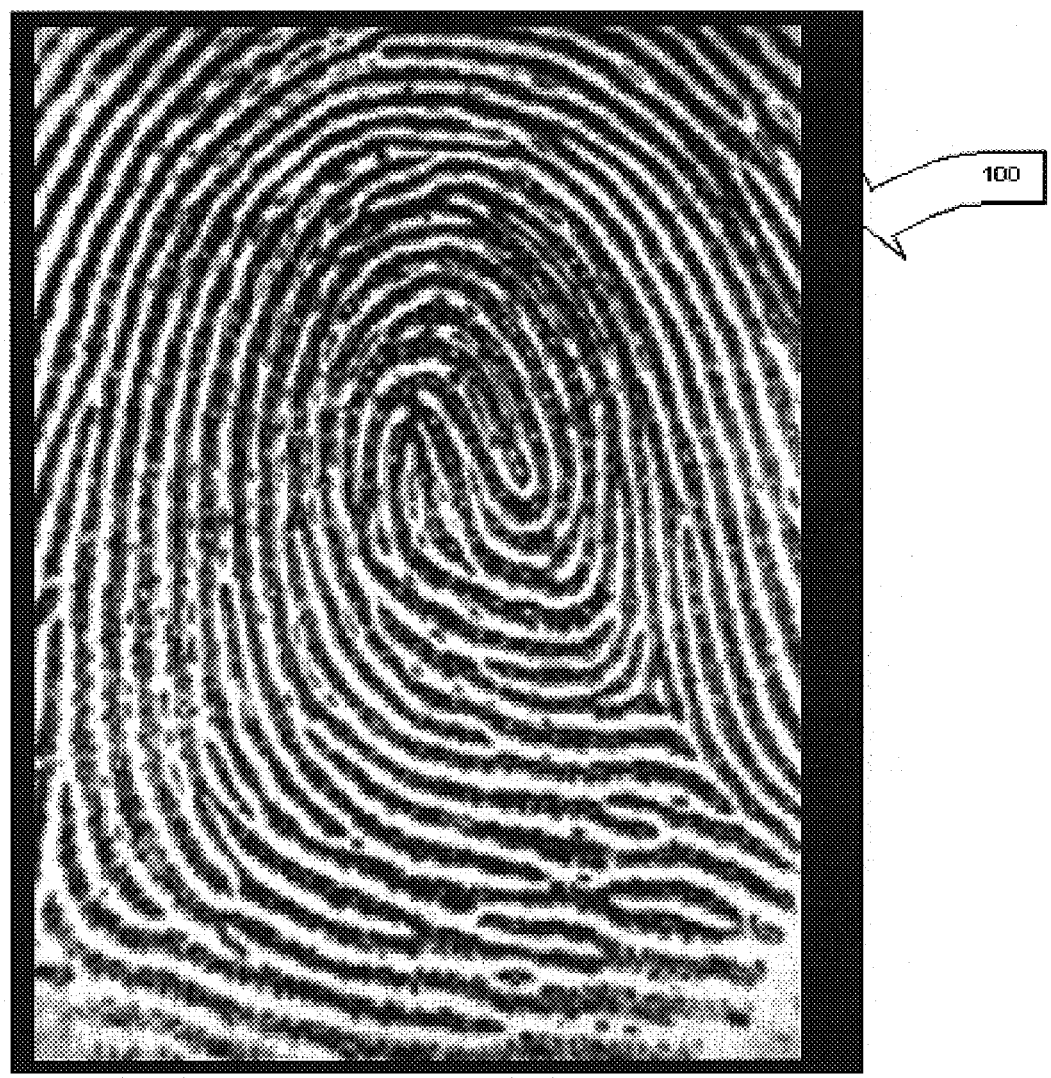
FIG. 18 is an illustration of an intermediate image produced in accordance with a preprocessing portion of the operations shown in FIG. 15.

Image 100 in FIG. 18 is an illustration of an intermediate image. It is to be understood that, without departing from the spirit of the present invention, other sized pixel arrays could be utilized during the transformation to intermediate image format.

In accordance with one embodiment of the transformation from a corrected raw scan image format to a monochrome image format, after an intermediate image has been obtained, an edge detect algorithm is applied to the intermediate image in order to produce an enhanced image. In accordance with one embodiment, the edge detect algorithm is applied as follows:

Equation 9

Set new pixel value to six times the value of the pixel in intermediate image at row y and column x.
    Subtract from new pixel value the value of the pixel in intermediate image at row y−1 and column x−1.
    Subtract from new pixel value the value of the pixel in intermediate image at row y−1 and column x+1.
    Subtract from new pixel value the value of the pixel in intermediate image at row y+1 and column x−1.
    Subtract from new pixel value the value of the pixel in intermediate image at row y+1 and column x+1.
    If new pixel value is less than zero, set new pixel value to zero.
    Store new pixel value in enhanced image at row y and column x.

Figure 19:
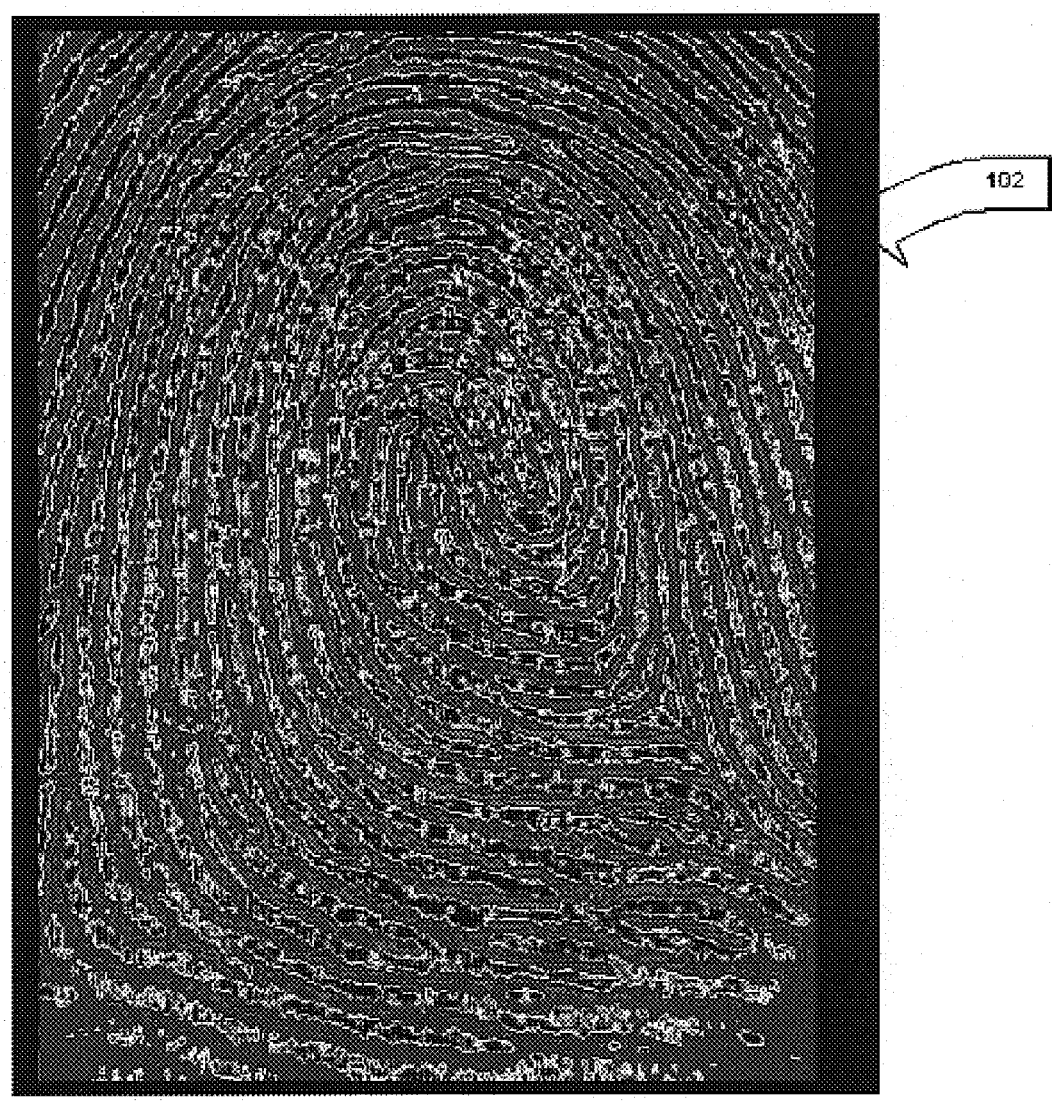
FIG. 19 is an illustration of an enhanced image.

Image 102 in FIG. 19 is an illustration of an enhanced image after the edged detect algorithm has been applied.

The final step of the block 92 portion of preprocessing 76 (FIG. 16) is to transform the enhanced image into a monochrome image format. In one illustrative embodiment, each pixel in the monochrome image is created by determining an average pixel value of a large grid area and comparing this average to the average pixel value of a smaller grid area for the same pixel location. A threshold separation variance between the average pixel values of the large and small pixel grids is utilized for the determination of setting the corresponding pixel at that location to a white or black level (i.e., monochrome image result). Pixel grid sizes and threshold values can be chosen to accommodate the characteristics of the image reader being utilized. In accordance with one embodiment, the pixel (new pixel value) at row y in column x in the monochrome image is given by:

Equation 10

Set average_1 value to zero.
    For x1 values of x−6 to x+6 do
        For y1 values of y−6 to y+6 do
            Add to average_1 value the value of the pixel in edge detect image at x1 and y1
    Divide average_1 value by 169 (13 multiplied by 13).
Set average_2 value to zero.
    For x1 values of x−1 to x+1 do
        For y1 values of y−1 to y+1 do
            Add to average_2 value the value of the pixel in edge detect image at x1 and y1
    Divide average_2 value by 9 (3 multiplied by 3).
If average_2 value is greater than average_1 value plus 4
    Then set pixel value to zero
    Else, set pixel value to 255.
Store pixel value in monochrome image at row y and column x.

Figure 20:
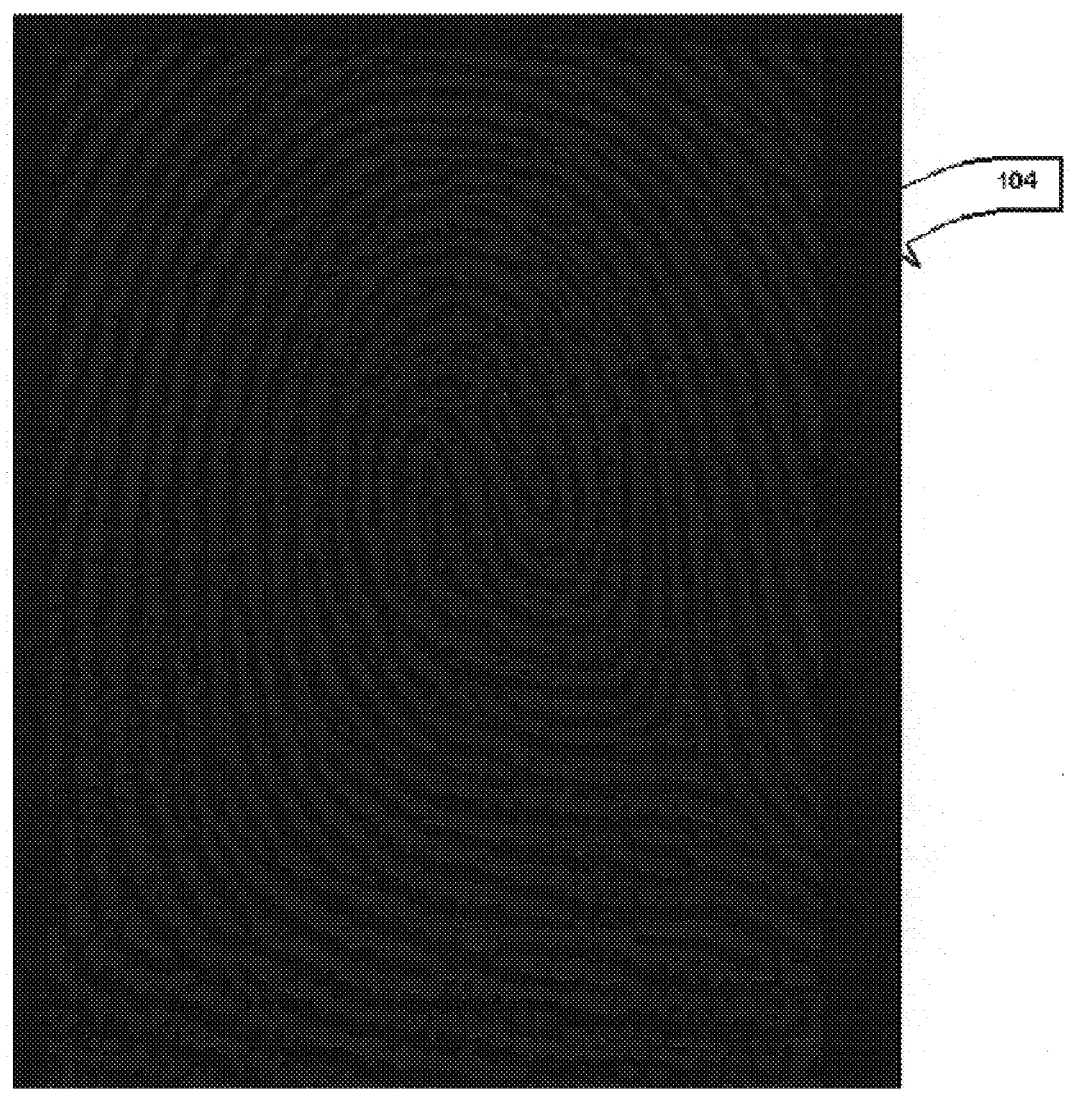
FIG. 20 is an illustration of a monochrome image produced in accordance with a preprocessing portion of the operations shown in FIG. 15.

Image 104 in FIG. 20 is an illustration of a monochrome image produced accordingly.

Another component of preprocessing 76, as is indicated by block 94 in FIG. 16, is to locate and fill irregularities, in particular small holes, within the monochrome image. Locating and filling small holes in the monochrome image is necessary so that a wire-frame image that is subsequently derived from the monochrome image during model creation 20 will not have bubbles in it. The irregularity location process is performed by scanning a monochrome image, such as image 104 in FIG. 20, until an unprocessed pixel value of zero is detected. At that point, the detected pixel is marked as being processed and a recursive descent routine is called. Each zero value pixel is marked as processed and corresponding x and y coordinates stored in a table. When no further zero value pixels can be located, the size of zero value pixel areas is calculated (number of x and y coordinate entries in the table). Illustratively, if the area size is 35 pixels or less, the 35 pixel value being selected based on the image characteristics outlined in relation to FIG. 3, and provided the shape of the area is roughly a circle, the area is filled using a pixel value of 255. The number of pixels required in order for an area to be considered for filling can be adjusted to accommodate a particular reader portion 12 without departing from the spirit of the present invention. When the entire monochrome image has been checked, the block 94 process is complete.

Figure 21:
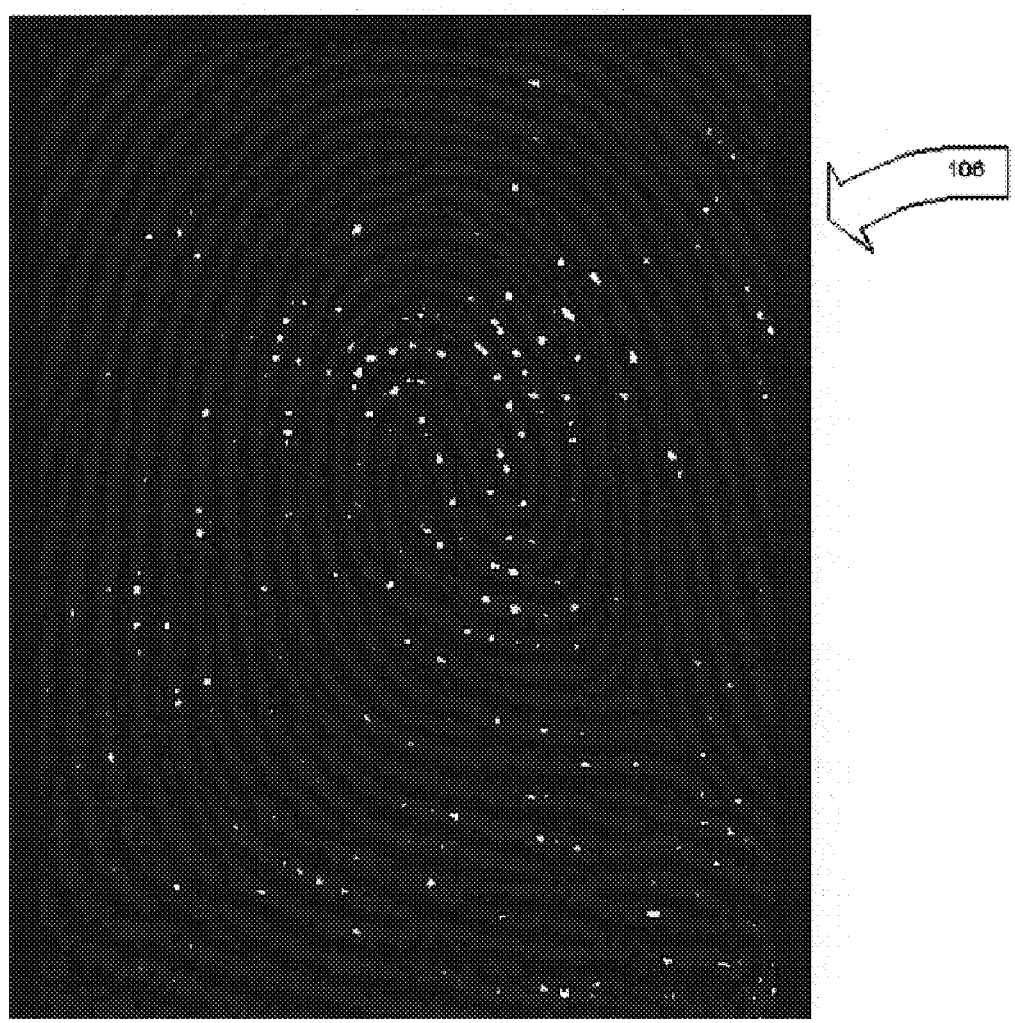
FIG. 21 is an illustration of a monochrome image after irregularities in the image have been located and filled.

Image 106 in FIG. 21 is an illustration of a monochrome image, such as image 104 in FIG. 20, after irregularities have been located and, for illustrative purposes, filled with pixels having a substantially white value. In accordance with one embodiment of the present invention, the center coordinates of the white filled areas within image 106 in FIG. 21, and the size of these areas are stored in a table and classified as data element points. These data element points, illustratively called micro-minutia, classified by their location and associated slope value of the ridge they reside on, are image data points that are unique to a particular system user and, in combination with other data element points, can be catalogued and utilized in the comparison of one set of image scan data to another. The micro-minutia points are small, (as small as one thousandth of an inch in diameter), and likely represent the locations of a system user's sweat glands. It should be noted that the number of micro-minutiae points identified in an image scan is substantially dependent upon the resolution capabilities of a particular reader portion 12. The higher the resolution capability of the reader portion 12, the more micro-minutiae points available for identification.

The final component of preprocessing 76, in accordance with block 96 in FIG. 16, is to smooth and fill image elements within the monochrome image. In the case of fingerprint image data, the image elements within the monochrome image are typically fingerprint ridge elements. The smooth and fill process is designed to add and remove pixels on the border of fingerprint ridge elements. Smoothing the boundaries along the ridge elements optimizes the quality of subsequently produced wire-frame images, which are derived from the completed monochrome image later in the model creation 20 process.

Figure 22:
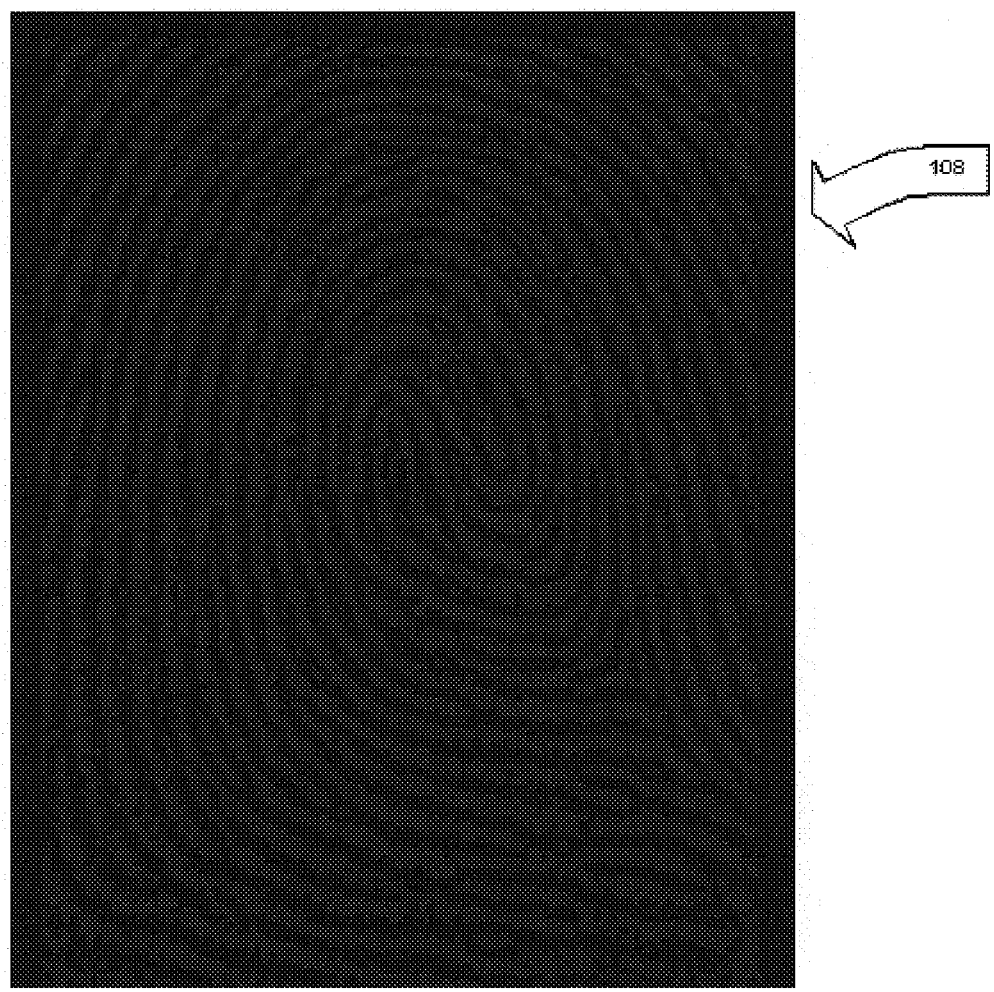
FIG. 22 is an illustration of a filled monochrome image.
Figure 23:
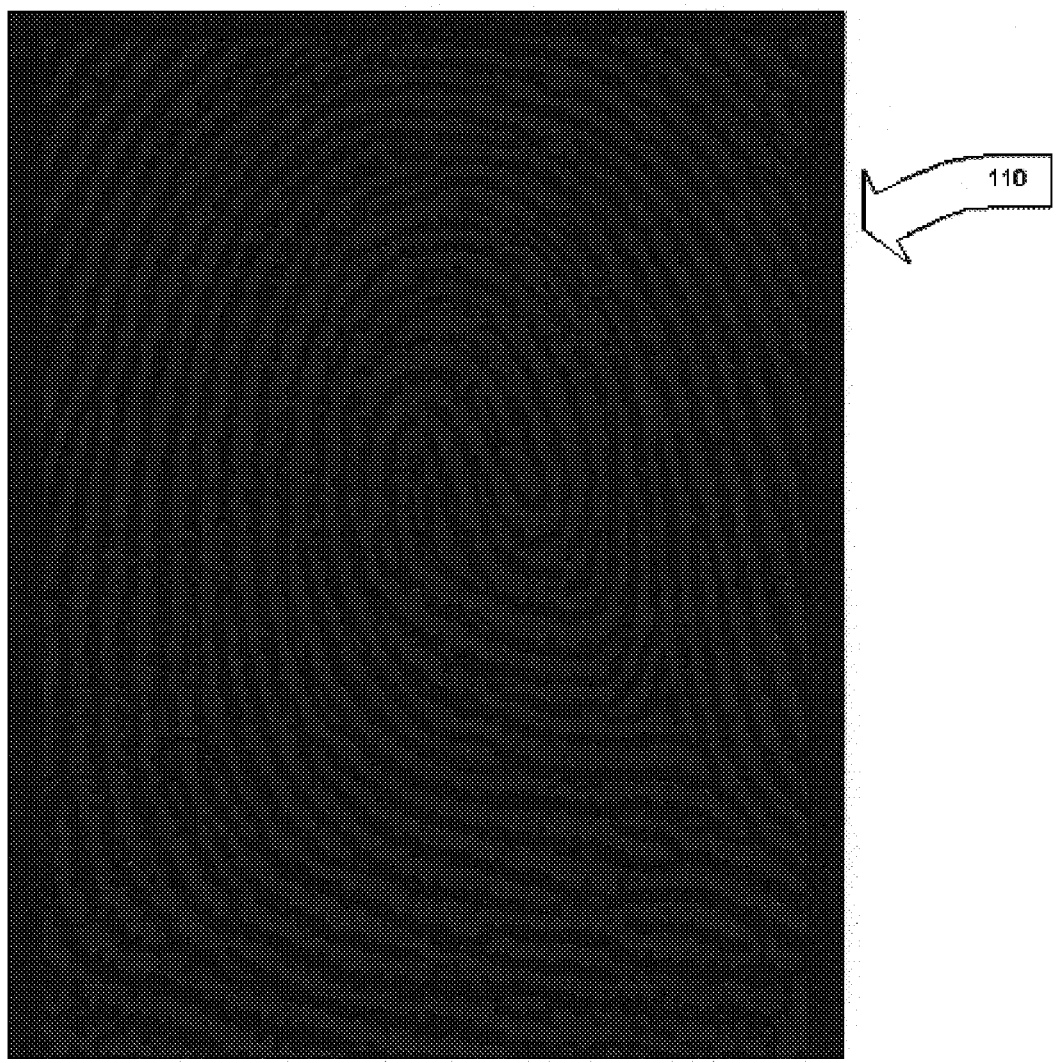
FIG. 23 is an illustration of a smoothed and filled monochrome image.

The input to the smooth and fill 96 process, in one embodiment, is the monochrome image after it has been filled in accordance with block 94. Image 108 in FIG. 22 is an illustration of a filled monochrome image, wherein filled pixels no longer includes a substantially white value, as was the case in FIG. 21. The output from the smooth and fill 96 process is a smooth monochrome image similar to image 110 in FIG. 23. To make the transformation, each pixel in the filled monochrome image is used as the center of a 3×3 array. Each of the surrounding eight pixels are used to form an index into a table. The content of each table entry contains two flags:

1. Do nothing
2. Set the center pixel

Below are the indexes into the table for those values that contain the set flag. All other table entries contain the do nothing flag.

Another procedural component of model creation 20, in accordance with block 78 in FIG. 15, is slope table generation 78. Slope table generation 78 is substantially similar to slope table generation 38 described above in relation to FIG. 4 and image qualification 18. The primary difference between slope table generation 78 and slope table generation 38 is that during slope table generation 78, all available image data is processed rather than a fraction of available image data. In addition, slope table generation 78 involves the processing of a unique monochrome image formed in accordance with the procedures of preprocessing 76, rather than the limited monochrome image formed in accordance with the procedures of preprocessing 34.

Figure 24:
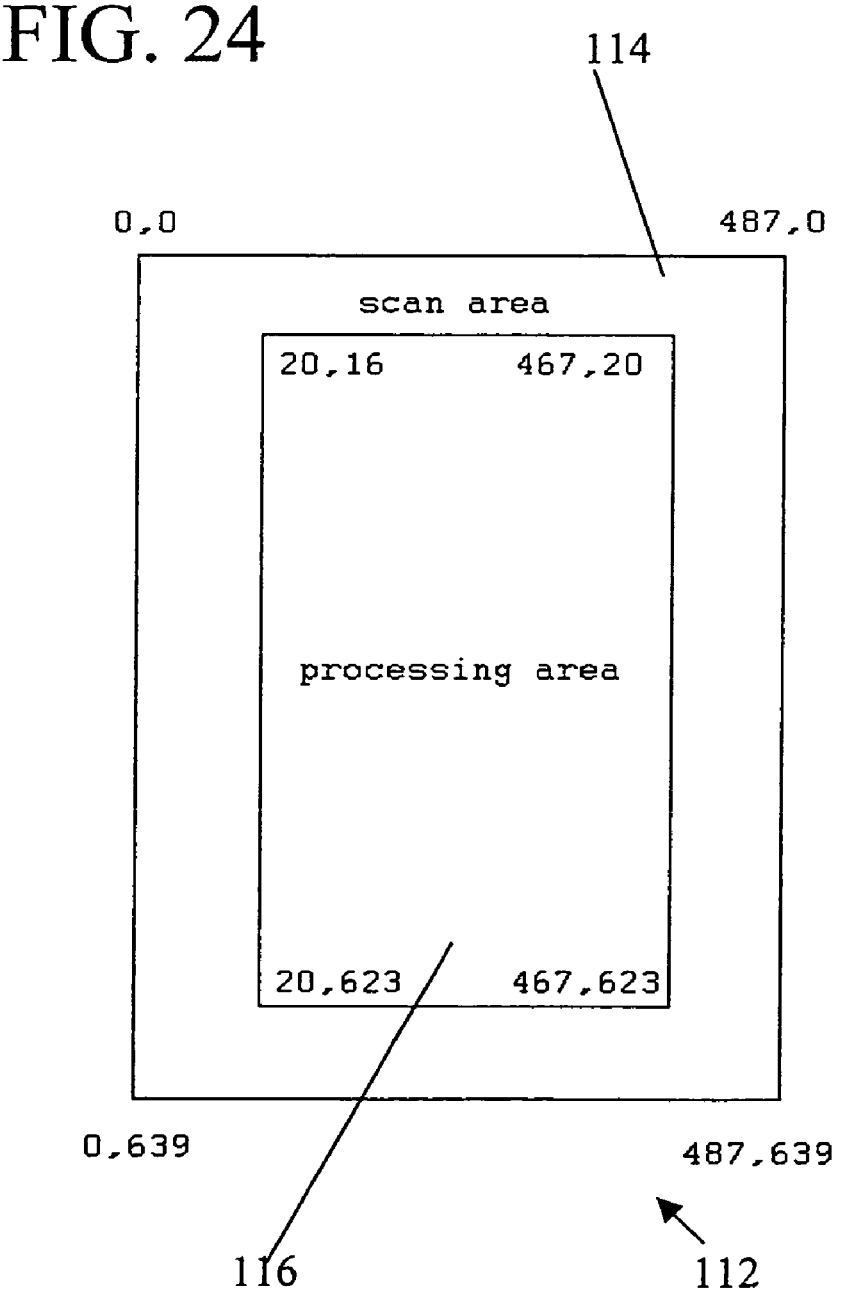
FIG. 24 is a pictorial representation of an alternate set of example image scan parameters.

While slope table generation 38, in accordance with example image scan parameters 28, defined in relation to FIG. 3, involved the processing of an illustrative array of 8×8 pixel grids with 27 grids in the x direction and 29 grids in the y direction, slope table generation 78 involves the processing of a more complete data set and a correspondingly different grid configuration. In addition, during model creation 20, example parameters 28 may vary in accordance with aspect ratio adjustments made during preprocessing 76. For example, FIG. 24 is an illustration of an alternate set of example image scan parameters 112 that include a scan area 114 and a processing area 116. Alternate example image scan parameters 112 are similar to example scan parameters 28, but processing area 116 reflects an example change in size configuration that may occur when the aspect ratio of the image scan is adjusted during preprocessing 76.

Therefore, illustratively, in accordance with example image scan parameters 112, slope table generation 78 is accomplished by dividing the image corresponding to processing area 116 into an illustrative array of 10×10 pixel grids. Considering that every pixel and every line is to be analyzed, this yields 44 grids in the x direction and 60 grids in the y direction. It should be emphasized that the precise values incorporated into the slope table generation process depend on the characteristics of the particular reader portion 12 being utilized. Analysis can be tailored to accommodate any reader portion 12.

As was explained above in relation to slope table generation 38, there are two tables created during the slope table generation process: the raw slope data table and the slope table. In accordance with example scan parameters 112, the raw slope data table is a two dimensional array consisting of 44×60 cells, where each cell in the raw slope data table consists of three individual entries:

1. A count of the changes in the x coordinate.
2. A count of the changes in the y coordinate.
3. A count of the pixels tested.

The raw slope data table is created by doing a contour trace of the monochrome image produced during preprocessing 76. As the trace migrates through the pixel grids, the three elements included in the raw slope data table are incremented. Below is a diagram showing the values to be added for the eight next pixel combinations (P is the current pixel, N is the next pixel, * represents an ordinary pixel and is a filler for display purposes):

Equation 11

| 5 | 6 | 7 |
|---|---|---|
| 4 | P | 0 |
| 3 | 2 | 1 |

[where the index value is equal to the binary sum of pixel locations that are present and is represented as a hexadecimal value (i.e.; pixel location 4 if present = $2^{4th}$ which equals decimal value 16); and where Count equals the number of pixels present in a 3x3 array surrounding the center "P" pixel location.]

| | | | | |
|---|---|---|---|---|
| index value 0x1F: | FILL – Count = 5 | | | |
| index value 0x7C: | *** | ** | | ** |
| index value 0xF1: | *x* | *x | *x* | x* |
| index value 0xC7: | | ** | *** | ** |
| index value 0x3F: | FILL – Count = 6 | | | |
| index value 0xFC: | *** | ** | * | *** |
| index value 0xF3: | *x* | *x | *x* | x* |
| index value 0xCF: | * | *** | *** | ** |
| index value 0x3E: | FILL – Count = 5 | | | |
| index value 0xF8: | *** | * | * | *** |
| index value 0xF3: | *x | *x | x* | x* |
| index value 0x8F: | * | *** | *** | * |
| index value 0xBF: | FILL – Count = 7 | | | |
| index value 0xFE: | *** | *** | * * | *** |
| index value 0xFB: | *x* | *x | *x* | x* |
| index value 0xEF: | * * | *** | *** | *** |
| index value 0x7E: | FILL – Count = 6 | | | |
| index value 0xF9: | *** | * | ** | *** |
| index value 0xE7: | *x | *x* | x* | *x* |
| index value 0x9F: | ** | *** | *** | * |
| index value 0x3D: | FILL – Count = 5 | | | |
| index value 0xF4: | ** | * | * | *** |
| index value 0xD3: | *x* | *x | *x* | x* |
| index value 0x4F: | * | *** | ** | * |
| index value 0x1D: | FILL – Count = 4 | | | |
| index value 0x74: | ** | * | | ** |
| index value 0xD1: | *x* | *x | *x* | x* |
| index value 0x47: | | ** | ** | * |
| index value 0x7B: | FILL – Count = 6 | | | |
| index value 0xED: | * * | ** | ** | *** |
| index value 0xB7: | *x* | x* | *x* | *x |
| index value 0xDE: | ** | *** | * * | ** |
| index value 0x37: | FILL – Count = 5 | | | |
| index value 0xDC: | ** | ** | * | ** |
| index value 0x73: | *x* | *x | *x* | x* |
| index value 0xCD: | * | ** | ** | ** |
| index value 0x5E: | FILL – Count = 5 | | | |
| index value 0x79: | *** | * | * | ** |
| index value 0xE5: | *x | *x* | x* | *x* |
| index value 0x97: | * | ** | *** | * |
| index value 0x16: | FILL – Count = 3 | | | |
| index value 0x58: | ** | * | | * |
| index value 0x61: | *x | *x | x* | x* |
| index value 0x85: | | * | ** | * |
| index value 0x67: | FILL – Count = 5 | | | |
| index value 0x9D: | ** | ** | ** | * |
| index value 0x76: | x* | *x* | *x | *x* |
| index value 0xD9: | ** | * | ** | ** |
| index value 0x6F: | FILL – Count + 6 | | | |
| index value 0xBD: | *** | ** | ** | * * |
| index value 0xF6: | x* | *x* | *x | *x* |
| index value 0xDB: | ** | * * | *** | ** |
| index value 0x17: | FILL – Count = 4 | | | |
| index value 0x5C: | ** | ** | | * |
| index value 0x71: | *x* | *x | *x* | x* |
| index value 0xC5: | | * | ** | ** |
| index value 0xFF: | FILL – Count = 8 | | | |
| | *** | *** | *** | *** |
| | *x* | *x* | *x* | *x* |
| | *** | *** | *** | *** |

Referring to FIG. 16, after image smooth and fill 96 has been completed, preprocessing 76, in accordance with an embodiment of the present invention, is also completed.

Equation 12

| | | | |
|---|---|---|---|
| *** | *** | *** | *** |
| *PN | *P* | *P* | *P* |
| *** | **N | *N* | N** |
| x = +1 | x = +1 | x = 0 | x = −1 |

-continued

Equation 12

| y + 0 | y = +1 | y = +1 | y = +1 |
|---|---|---|---|
| *** | N** | *N* | **N |
| NP* | *P* | *P* | *P* |
| *** | *** | *** | *** |
| x = +1 | x = +1 | x = 0 | x = −1 |
| y = 0 | y = +1 | y = +1 | y = +1 |
| *** | N** | *N* | **N |
| NP* | *P* | *P* | *P* |
| *** | *** | *** | *** |
| x = −1 | x = −1 | x = 0 | x = +1 |
| y = 0 | y = −1 | y = −1 | y = −1 |

Figure 25:
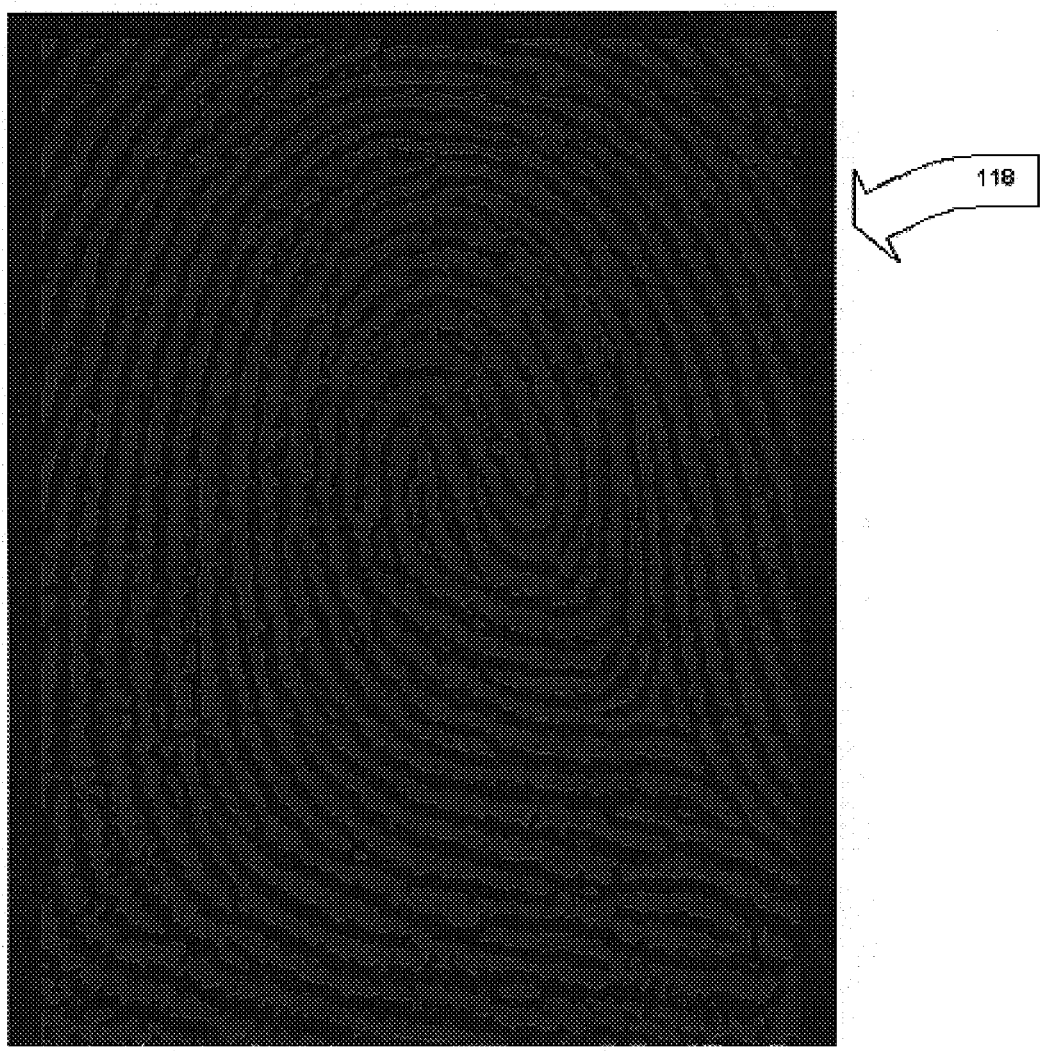
FIG. 25 is an illustration of a monochrome image after a contour trace has been completed in accordance with a slope table generation portion of the operations shown in FIG. 15.

Image 118 in FIG. 25 is an illustration of the monochrome image, produced in accordance with preprocessing 76, after a contour trace has been completed. When the entire image has been traced and the raw slope data table has been completed, the slope table is generated. Illustratively, the slope table is also a two-dimensional array, consisting of 44×60 cells. Each entry in the slope table consists of a single entry, namely, the slope of the ridge or ridges going through the corresponding grid. Initially, all entries in the slope table are set to a −1 (invalid slope). The slope for each pixel grid is calculated utilizing information from the raw slope data table and is computed as follows:

Equation 13

Set x coordinate count to zero.
   Set y coordinate count to zero.
   Set pixel count value to zero.
   For x1 values of x−1 to x+1 do
     For y1 values of y−1 to y+1 do
       from raw slope table at coordinates x1 and y1 do
       Add to pixel count the count of pixels tested.
       Add to x coordinate count the changes in the x coordinate.
       Add to y coordinate count the changes in the y coordinate.
   from raw slope table at coordinates x and y do
   Add to pixel count the count of pixels tested then divide by 2.
   Add to x coordinate count the changes in the x coordinate then divide by 2.
   Add to y coordinate count the changes in the y coordinate then divide by 2.
   If the pixel count is greater than 20
     Then compute the slope using the trig function arcsine.
   Find angle function
     Input: delta y and delta x (computed previously above)
     Set quadrant to 0
     If delta y is less than 0
       Then add 2 to quadrant
     If delta x is less than 0
       Then add 1 to quadrant
     Hypotenuse=square root of ((delta x times delta x)+ (delta y times delta y))
   Angle=arcsine (delta y divided by hypotenuse) times degrees per radian.
   If quadrant is 1
     Then angle=180−angle
   Else if quadrant is 2
     Then angle=360−angle
   Else if quadrant is 3
     Then angle=180+angle Since slopes have values between 0 and 180, the angle is converted to a slope as follows:
   If angle is equal to or greater than 180
     Then slope is angle minus 180
     Else slope is the angle Increment number of pixels processed by one.

Figure 26:
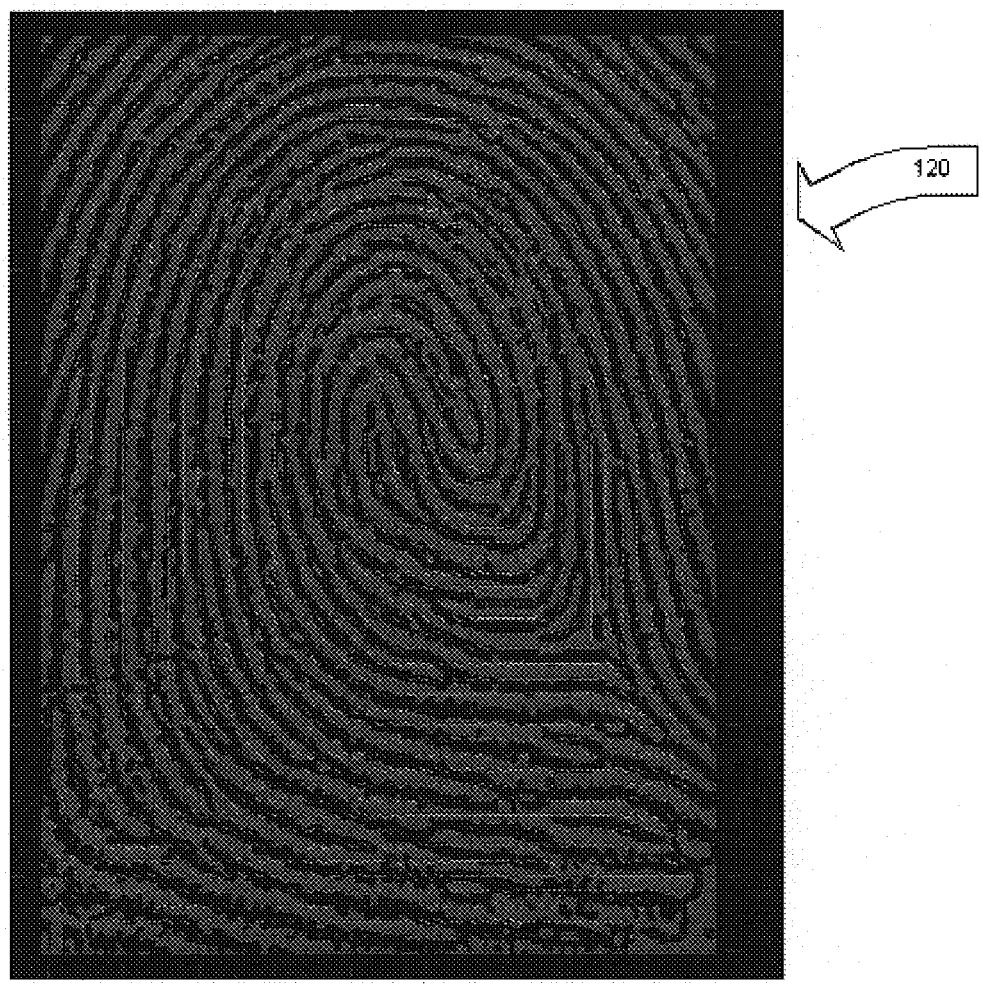
FIG. 26 is an illustration of a monochrome image with a slope overlay based on a slope table completed in accordance with the slope table generation portion of the operations shown in FIG. 15.

Image 120 in FIG. 26 is an illustration of a monochrome image produced in accordance with preprocessing 76 and with a slope overlay consistent with a completed slope table. The completed slope table is used in subsequent processing. Specifically, it is used as an aid during wire-frame generation 82 in the extension of wire-frame lines and in the removal of unwanted wire-frame lines.

In accordance with block 80 in FIG. 15, and in accordance with an embodiment of the present invention, a histogram could be generated during model creation 20. A histogram resulting from histogram generation 80 could be utilized to make a determination as to image quality within different portions of the image data under analysis. If a determination is made that a portion of the grid is of insufficient quality to proceed with subsequent processing, then that portion of the grid could be independently excluded from the remainder of the model creation 20 process. It should be noted that, in accordance with the present invention, histogram generation 80 could be performed at any point in the model creation 20 process.

Histogram generation 80 is accomplished in substantially the same manner as histogram generation 40, described above in relation to FIG. 4 and image qualification 18. The primary differences between histogram generation 80 and histogram generation 40 are that all, as opposed to a fraction of, available image data is processed during histogram generation 80 and that slope table values utilized during histogram generation 80 are the values generated during slope table generation 78 and not during slope table generation 38.

Figure 27:
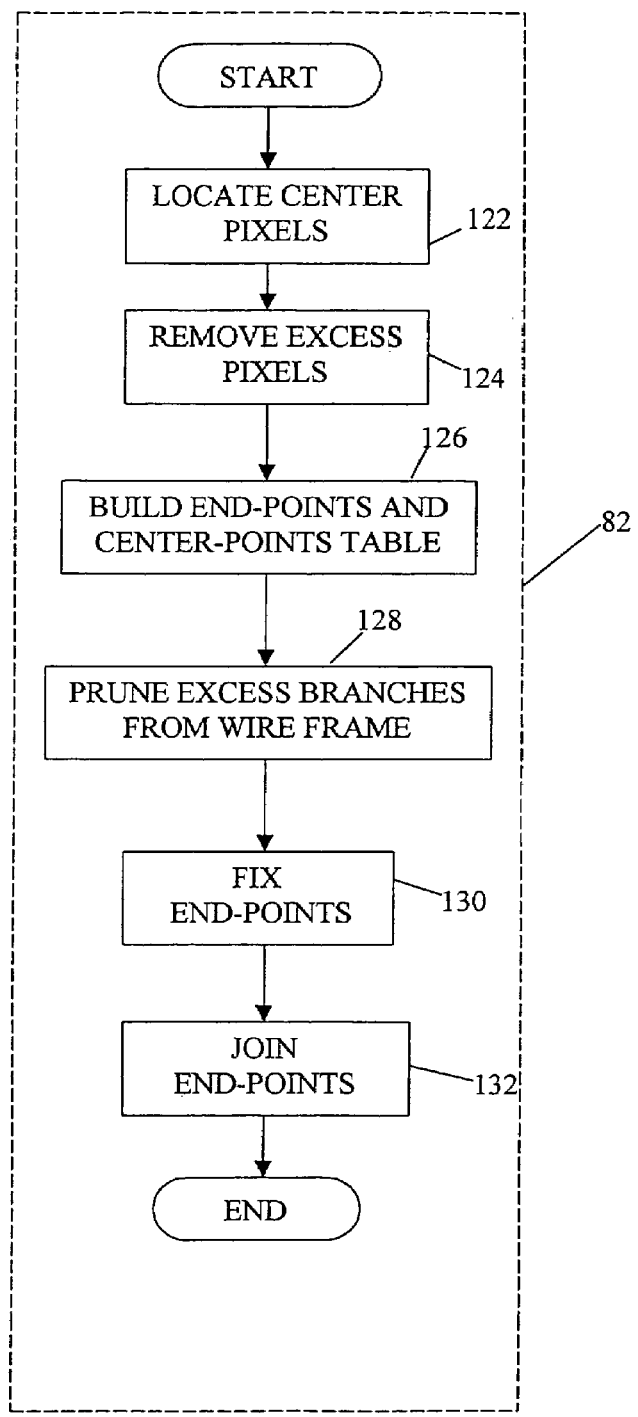
FIG. 27 is a block diagram illustrating a set of procedural components corresponding to a wire-frame generation portion of the operations shown in FIG. 15.

An important component to model creation 20 is indicated by block 82 in FIG. 15, namely wire-frame generation 82. Wire-frame generation 82 is the process of thinning to a special set of thin lines, illustratively referred to as wire-frame lines, the features, specifically, the fingerprint ridge line features, included within the monochrome image produced in accordance with preprocessing 76. FIG. 27 is a block diagram providing a detailed illustration of the procedural components of wire-frame generation 82 in accordance with an embodiment of the present invention.

One of the components of wire-frame generation 82, as is indicated by block 122 in FIG. 27, is the location of pixels within the monochrome image that are the approximate center of a plurality of edges, in the current case, the approximate center of fingerprint ridge lines. Once the center pixels have been located, a thinned version of the monochrome image is created by thinning the ridge lines to the center pixels, so as to create a set of wire-frame lines. An effective method to locate pixels that are the approximate center of ridge lines and, at the same time, to thin the monochrome image to a set of wire-frame lines is as follows (of course, other methods could be used as well):

Equation 14

Set test pixel value 255.

Set replace pixel value to 254.
Repeat until no pixels are replaced
   COMMENT process the image in the horizontal
   For y coordinate values of zero to number of lines do.
     For x coordinate values of zero to number of pixels per lines do.

If pixel at image coordinates x and y is test pixel value
    If pixel at image coordinates x+1 and y is 255
        Set pixel at image coordinates x+1 and y to replace pixel value.
For x coordinate values of number of pixels per lines down to zero do.
    If pixel at image coordinates x and y is test pixel value
        If pixel at image coordinates x−1 and y is 255
            Set pixel at image coordinates x−1 and y to replace pixel value.
COMMENT process the image in the vertical
For x coordinate values of zero to number of pixels per lines do.
    For y coordinate values of zero to number of lines do.
        If pixel at image coordinates x and y is test pixel value
            If pixel at image coordinates x and y+1 is 255
                Set pixel at image coordinates x and y+1 to replace pixel value.
    For y coordinate values of number of lines down to zero do.
        If pixel at image coordinates x and y is test pixel value
            If pixel at image coordinates x and y−1 is 255
                Set pixel at image coordinates x and y−1 to replace pixel value.
Decrement test pixel value by one.
Decrement replace pixel value by one
At this point, the center pixels will have the lowest values. The process described below locates these pixels.

Clear wire-frame image.
COMMENT process the image in the horizontal
For y coordinate values of zero to number of lines do.
    For x coordinate values of zero to number of pixels per lines do.
        Set test pixel to value in image at x and y
        If test pixel is not zero
            While pixel at image at x+1 and y is less than test pixel
                Set test pixel to value in image at x+1 and y
                Increment x by one.
            Set pixel in wire-frame image at x−1 and y to 255.
If pixel at x and y in image equals test pixel
    Set pixel in wire-frame image at x−1 and y to 255.

Figure 28:
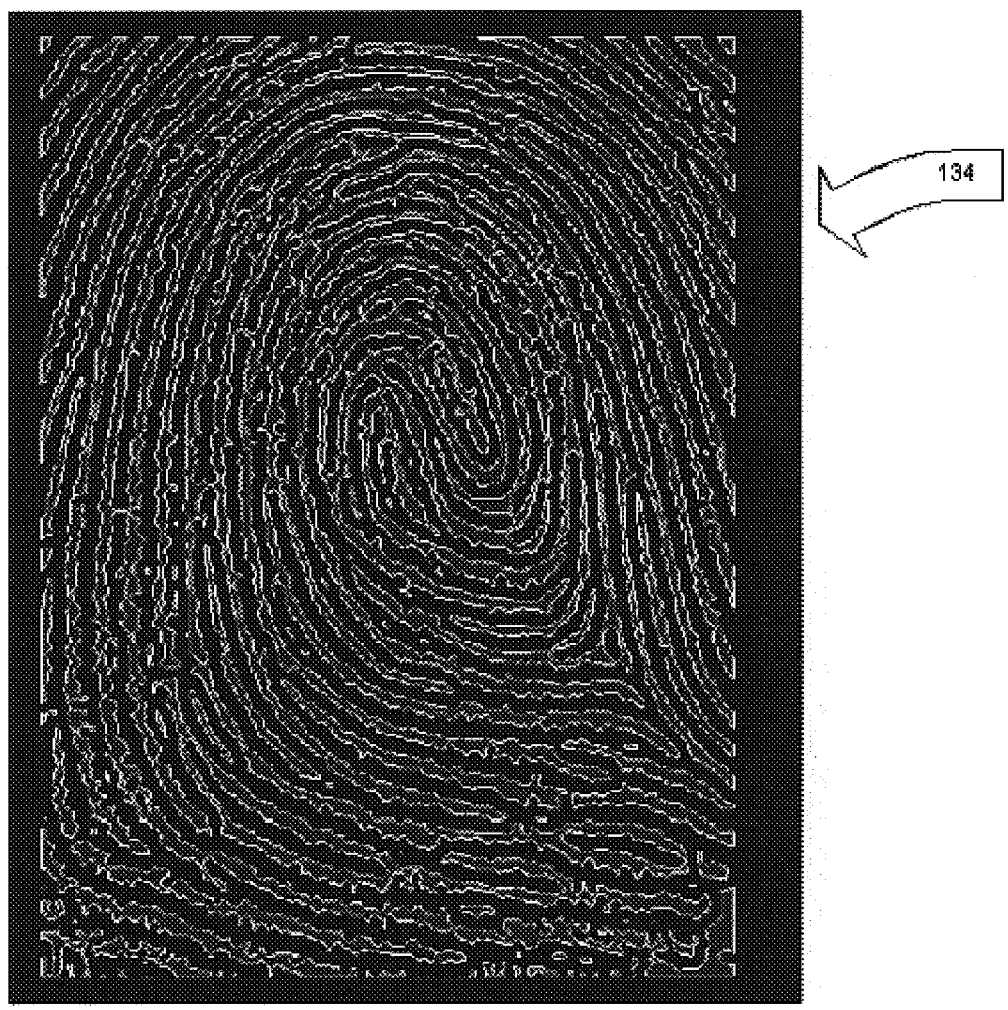
FIG. 28 is an illustration of a monochrome image after a first removal of pixels from image ridge lines.
Figure 29:
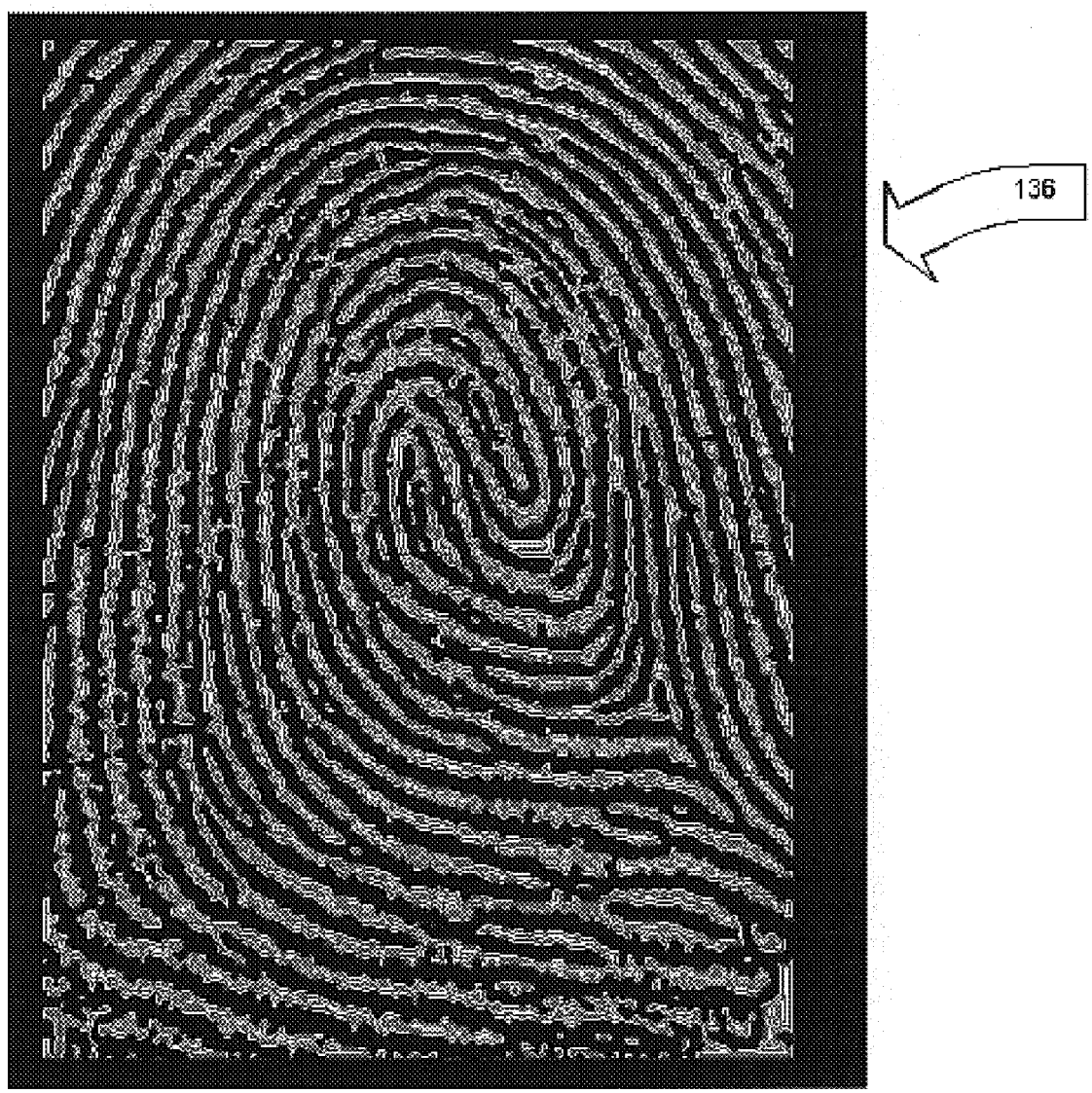
FIG. 29 is an illustration of a monochrome image with a comprehensive representation of pixel removal passes made during the thinning of the monochrome image to the centermost ridge line pixels.
Figure 30:
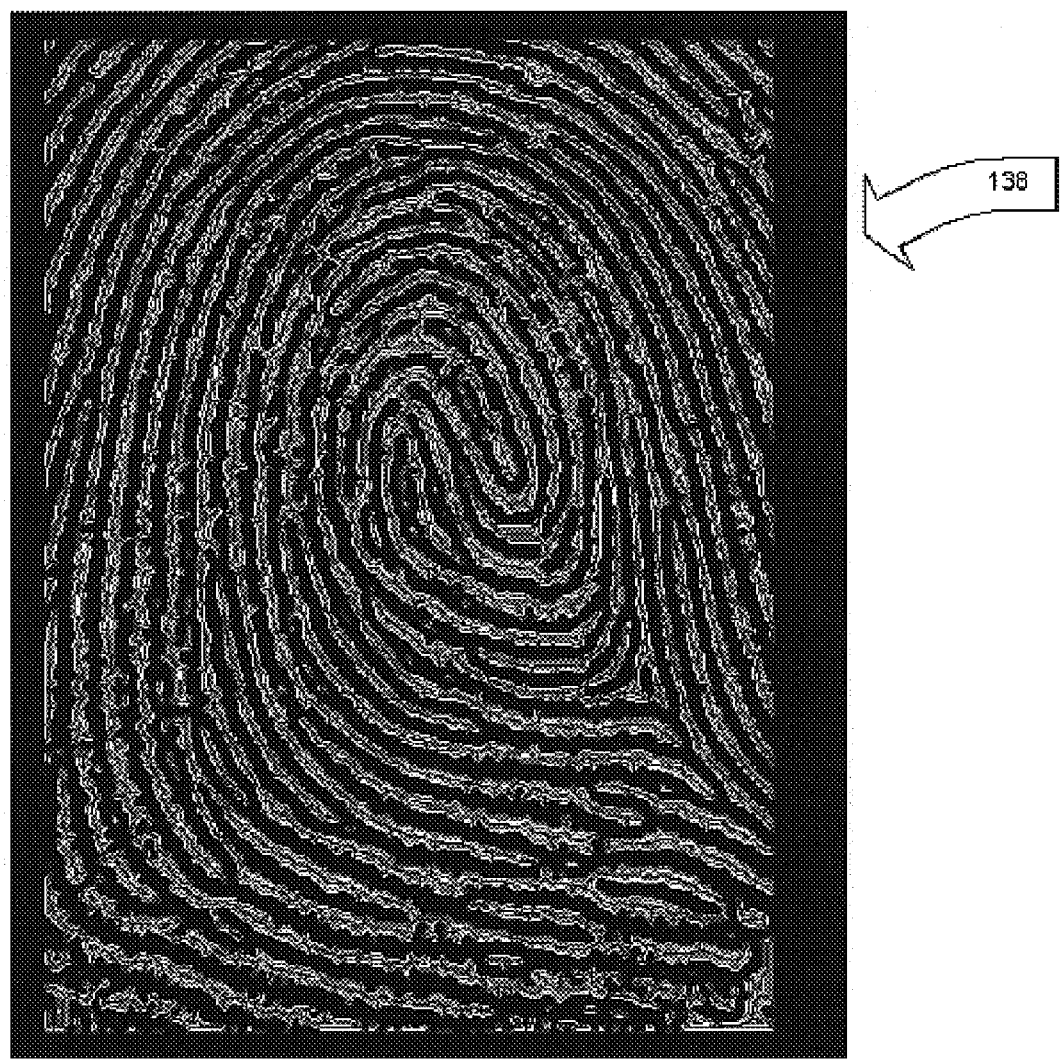
FIG. 30 is an illustration of FIG. 29 further including an overlay of a thinned monochrome image having raw wire-frame lines.
Figure 31:
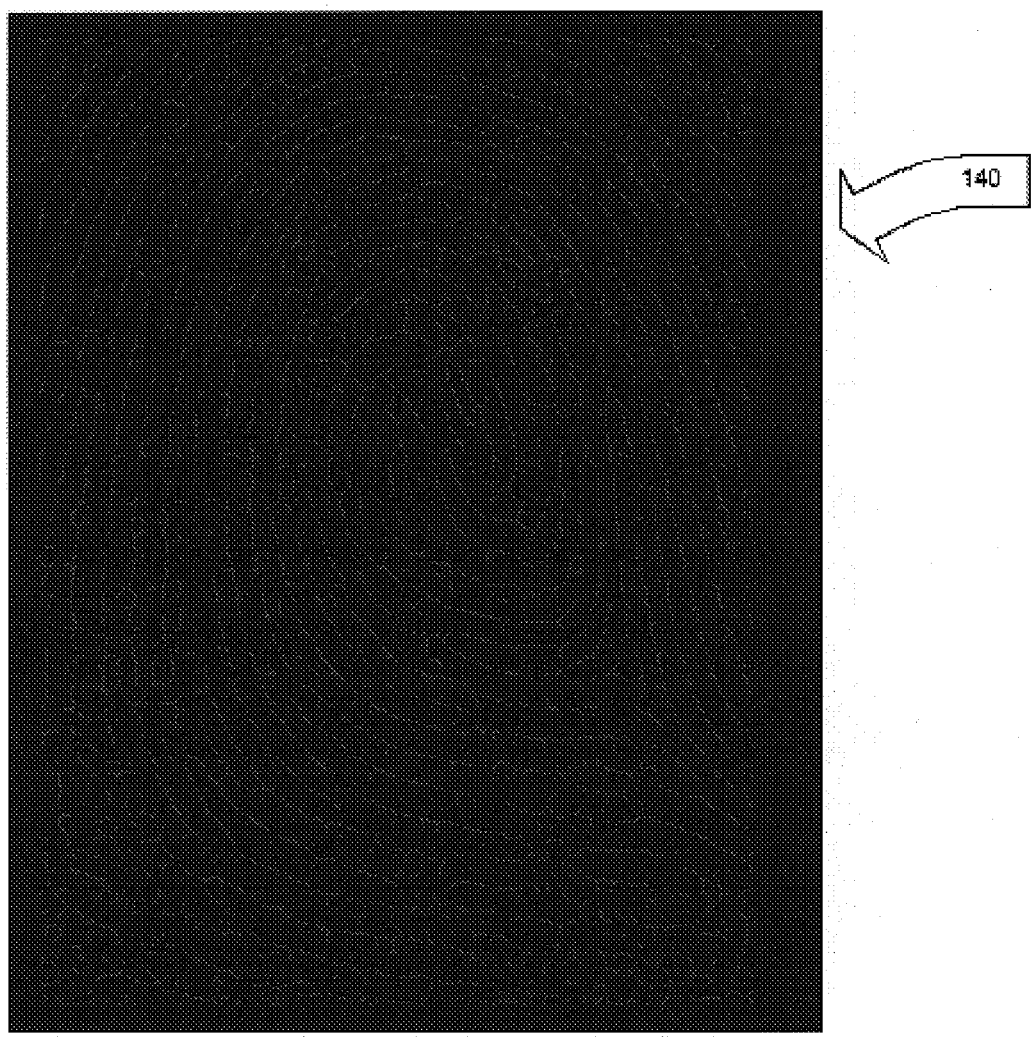
FIG. 31 is an illustration of a thinned monochrome image with raw wire-frame lines.

Image 134 in FIG. 28 is an illustration of a monochrome image after a first removal of pixels from image ridge lines. Image 136 in FIG. 29 is an illustration of a monochrome image with a comprehensive representation of pixel removal passes made during the thinning of the monochrome image to center image line pixels. Image 138 in FIG. 30 is an illustration of FIG. 29 further including an overlay of a thinned monochrome image having raw wire-frame lines. Finally, image 140 in FIG. 31 is an illustration of a thinned monochrome image with raw wire-frame lines.

The block 122 (FIG. 27) thinning process produces a thinned version of the monochrome image that includes wire-frame lines that may be, in some places, more than one pixel thick. In addition, the thinned image as a whole may contain pixels that do not belong to any line. Accordingly, as is indicated by block 124 in FIG. 27, another component of wire-frame generation 82 is the removal of excess pixels 124. In accordance with one embodiment, component 124 proceeds as follows: the thinned version of the monochrome image is scanned until a non-zero valued pixel is located. Then, the surrounding eight pixels are utilized to form an index into a table. The entry in the table contains flags that define the potential operations to be performed, namely:

1. Remove center pixel.
2. Remove center pixel and set a new pixel (M).
3. Set a new pixel (N).

Below are the indexes into the table:

| Equation 15 | | | |
|---|---|---|---|
| 5 | 6 | 7 | [where the index value is equal to the binary sum of pixel locations that are present and is represented as a hexadecimal value (i.e.; pixel location 4 if present = $2^{4th}$ which equals decimal value 16); and where Count equals the number of pixels present in a 3x3 array surrounding the center "P" pixel location.] |
| 4 | P | 0 | |
| 3 | 2 | 1 | |

| | | | | |
|---|---|---|---|---|
| index value 0x00: | Remove Point – Count = 0 | | | |
| index value 0x00: | | | | |
| index value 0x00: | R | R | R | R |
| index value 0x00: | | | | |
| index value 0x05: | Remove Point – Count = 2 | | | |
| index value 0x14: | * | * | | |
| index value 0x50: | R* | *R | *R | R* |
| index value 0x41: | | | * | * |
| index value 0x07: | Remove Point – Count = 3 | | | |
| index value 0x1C: | ** | ** | | |
| index value 0x70: | R* | *R | *R | R* |
| index value 0xC1: | | | ** | ** |
| index value 0x0D: | Remove Point – Count = 3 | | | |
| index value 0x34: | ** | * | | * |
| index value 0xD0: | R* | *R | *R | R* |
| index value 0x43: | | * | ** | * |
| index value 0x0E: | Remove Point – Count = 3 | | | |
| index value 0x38: | *** | * | | * |
| index value 0xE0: | R | *R | R | R* |
| index value 0x83: | | * | *** | * |
| index value 0x0F: | Remove Point – Count = 4 | | | |
| index value 0x3C: | *** | ** | | * |
| index value 0xF0: | R* | *R | *R | R* |
| index value 0xC3: | | * | *** | ** |
| index value 0x16: | Remove Point – Count = 3 | | | |
| index value 0x58: | ** | * | | * |
| index value 0x61: | *R | *R | R* | R* |
| index value 0x85: | | * | ** | * |
| index value 0x1E: | Remove Point – Count = 4 | | | |
| index value 0x78: | *** | * | | ** |
| index value 0xE1: | *R | *R | R* | R* |
| index value 0x87: | | ** | *** | * |
| index value 0x36: | Remove Point – Count = 4 | | | |
| index value 0xD8: | ** | * | * | ** |
| index value 0x63: | *R | *R | R* | R* |
| index value 0x8D: | * | ** | ** | * |
| index value 0x3D: | Remove Point – Count = 5 | | | |
| index value 0xF4: | ** | * | * | *** |
| index value 0xD3: | *R* | *R | *R* | R* |
| index value 0x4F: | * | *** | ** | * |
| index value 0x3E: | Remove Point – Count = 5 | | | |
| index value 0xF8: | *** | * | * | *** |
| index value 0xE3: | *R | *R | R* | R* |
| index value 0x8F: | * | ** | *** | * |
| index value 0x3F: | Remove Point – Count = 6 | | | |
| index value 0xFC: | *** | ** | * | *** |
| index value 0xF3: | *R* | *R | *R* | R* |
| index value 0xCF: | * | *** | *** | ** |
| index value 0xBF: | Remove Point – Count = 7 | | | |
| index value 0xFE: | *** | *** | * * | *** |
| index value 0xEB: | *R* | *R | *R* | R* |
| index value 0xEF: | * * | *** | *** | *** |
| **************************** | | | | |
| index value 0x0A: | Move Point – Count = 2 | | | |
| index value 0x28: | *M* | * | | * |
| index value 0xA0: | X | MX | X | XM |
| index value 0x82: | | * | *M* | * |
| **************************** | | | | |
| index value 0x29: | New Point – Count = 3 | | | |
| index value 0xA4: | * | * | * | *N* |
| index value 0x92: | NX* | X | *XN | X |
| index value 0x4A: | * | *N* | * | * |
| index value 0x2B: | New Point – Count = 4 | | | |
| index value 0xAC: | *N* | ** | * | * * |

-continued

| Equation 15 | | | | |
|---|---|---|---|---|
| index value 0xB2: | X* | NX | *X | XN |
| index value 0xCA: | * | * * | *N* | ** |
| index value 0x6A: | New Point – Count = 4 | | | |
| index value 0xA9: | *N* | * | ** | * * |
| index value 0xA6: | X | NX* | X | *XN |
| index value 0x9A: | ** | * * | *N* | * |
| index value 0xAB: | New Point – Count = 5 | | | |
| index value 0xAE: | * * | *** | * * | *N* |
| index value 0xBA: | NX* | X | *XN | X |
| index value 0xEA: | * * | *N* | * * | *** |

Figure 32:
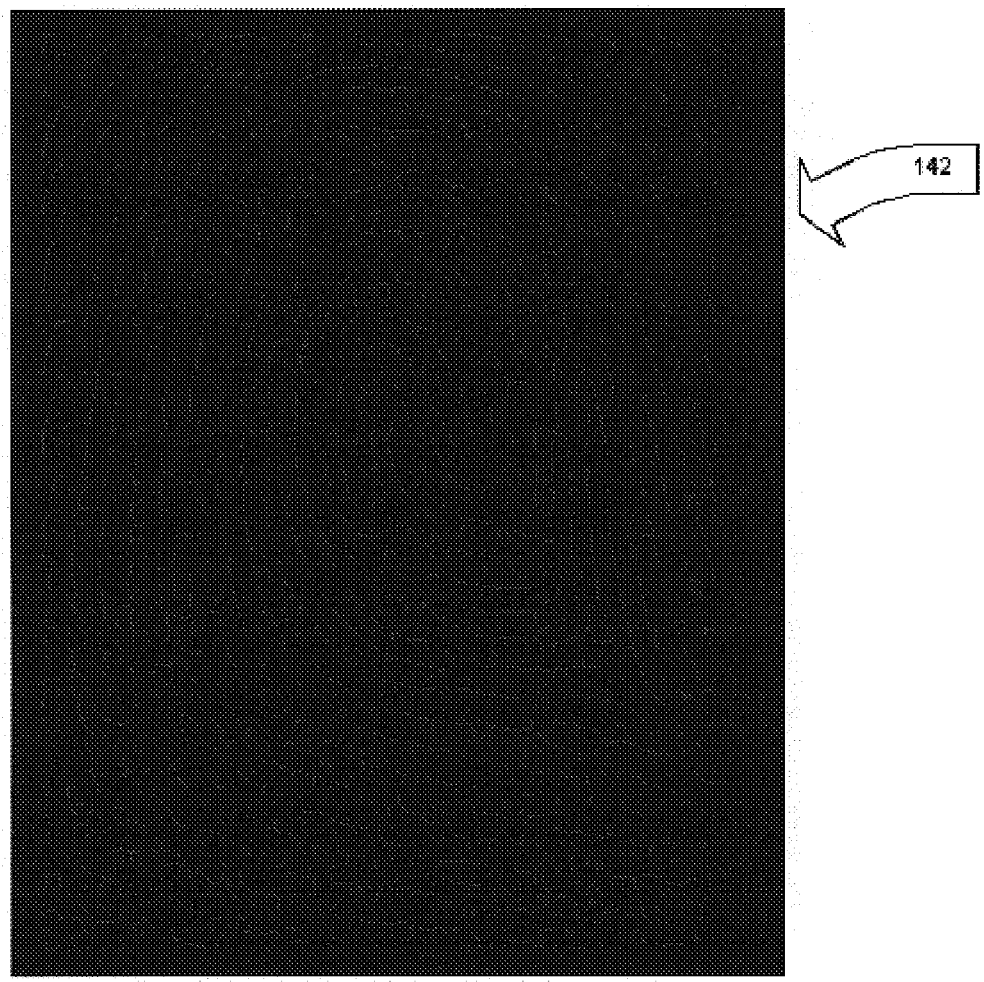
FIG. 32 is an illustration of a thinned monochrome image after excess pixels have been removed from the raw wire-frame lines.
Figure 33:
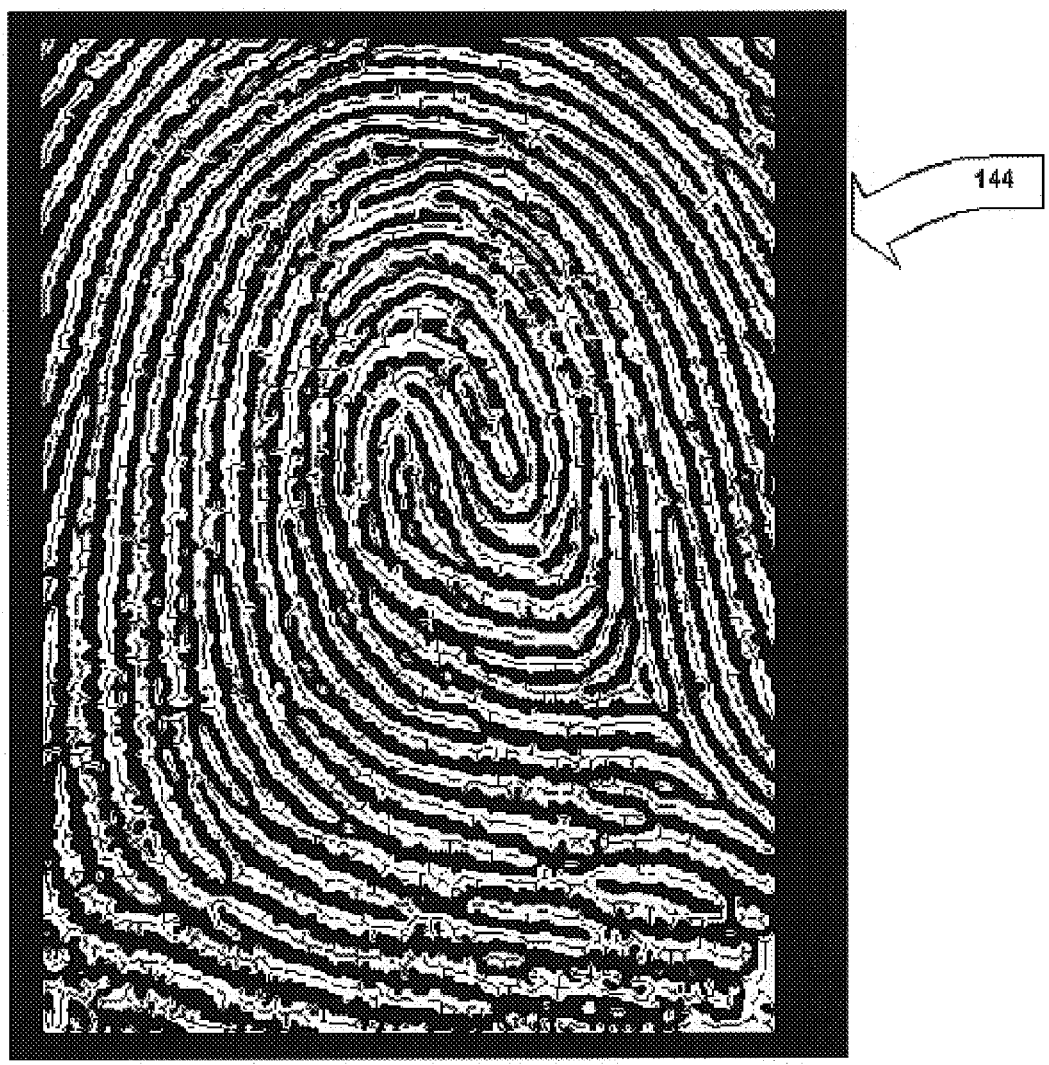
FIG. 33 is an illustration of the relationship between a thinned monochrome image, after excess pixels have been removed, and a corresponding monochrome image.

Image 142 in FIG. 32 is an illustration of a thinned version of a monochrome image after excess pixels have been removed. Image 144 in FIG. 33 is an illustration demonstrating the relationship between a thinned version of a monochrome without excess pixels and a corresponding monochrome image (monochrome image ridge lines in white).

Figure 34:
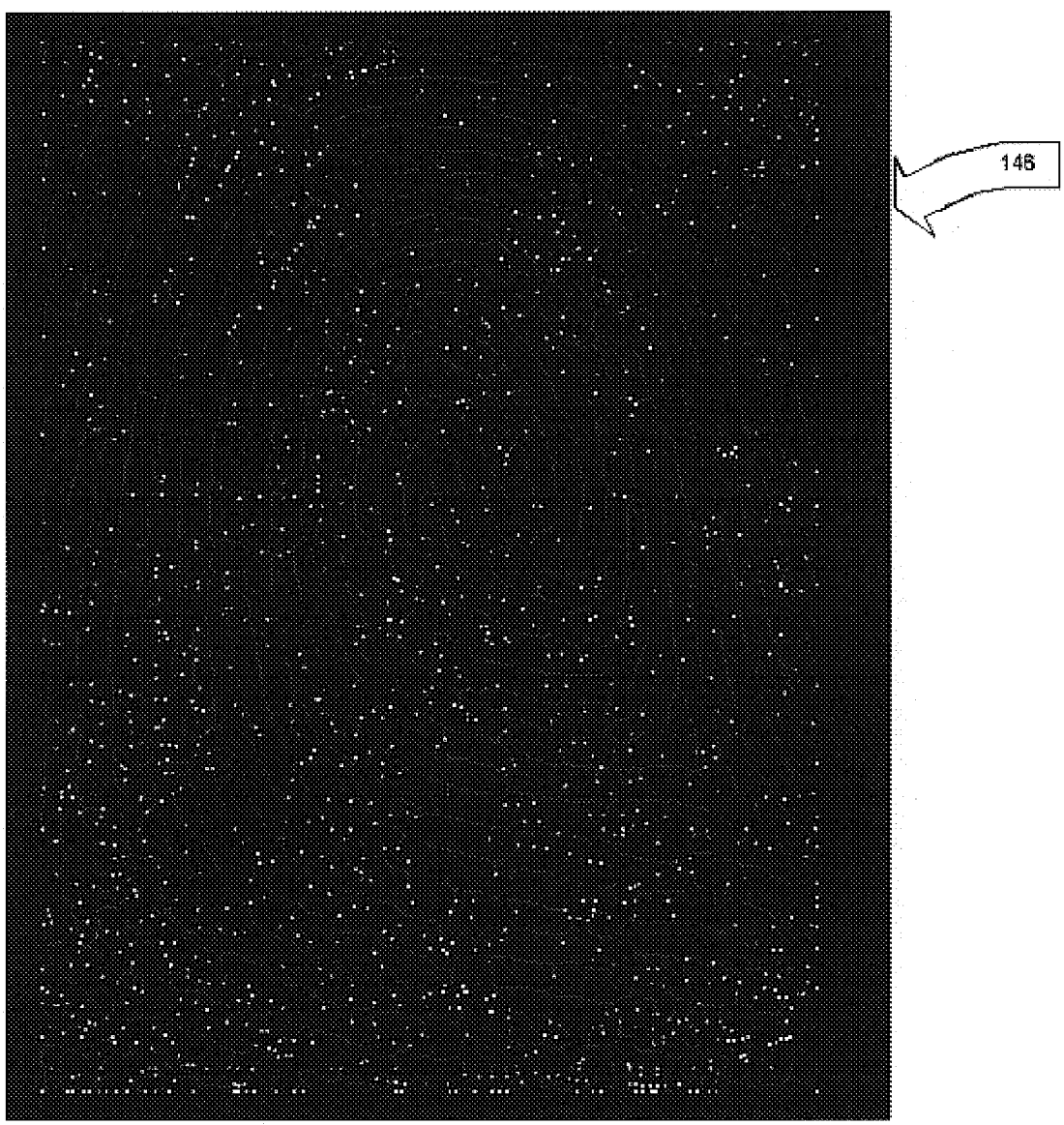
FIG. 34 is an illustration of a thinned monochrome image, with excess pixels removed, that includes a representation of data from an end-point table.
Figure 35:
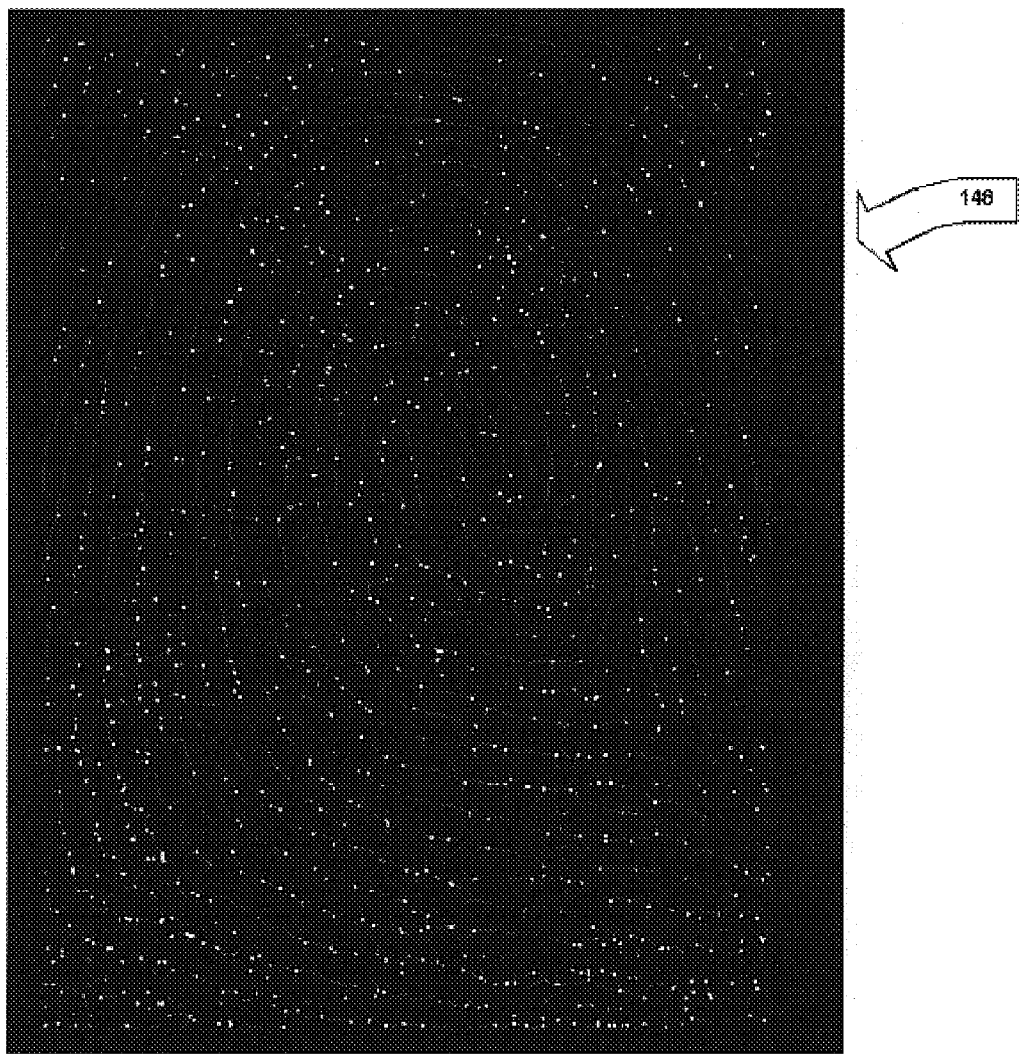
FIG. 35 is an illustration of a thinned monochrome image, with excess pixels removed, that includes a representation of data from a center-point table.

In accordance with an embodiment of the present invention, after the thinned version of the monochrome image has been created and excess pixels have been removed from the wire-frame lines, as is illustrated by block 126 in FIG. 27, end-point and center-point tables are constructed. To create these tables, the wire-frame lines are scanned and all end-points (those pixels on the wire-frame lines that touch only one other pixel) are catalogued in the end-point table. Image 146 in FIG. 34 is an illustration of a thinned monochrome image (with excess pixels removed) that includes a representation of data from an end-point table (white dots represent end-points). As the wire-frame lines are scanned, the center-points (those pixels that touch more than two other pixels) are catalogued in the center-point table. Image 148 in FIG. 35 is an illustration of a thinned monochrome image that includes a representation of data from a center-point table (white dots represent center-points).

The points within end-point and center-point tables are used in subsequent processing. In one embodiment, the points are utilized to identify unique data elements, such as spikes, mouse bites and anti-ridges. These data elements can be identified and catalogued through data describing the precise location of end-points or center-points, and slope values associated with lines attached to the points. The orientation of these data elements are unique to an individual system user and can be utilized to authenticate or match one set of image data to one or more other sets of image data.

After excess pixels have been removed from the wire-frame lines contained in the thinned monochrome image, the next step in wire-frame generation 82, in accordance with block 128 in FIG. 27, is to create a refined set of wire-frame lines by pruning excess branches. As can be seen in image 142 in FIG. 32, the wire-frame lines within the thinned monochrome image include many small branches protruding from the main lines. The removal of a selection of these branches leaves a refined set of wire-frame lines that are relatively smooth for subsequent minutiae and vector segment extraction.

Figure 36:
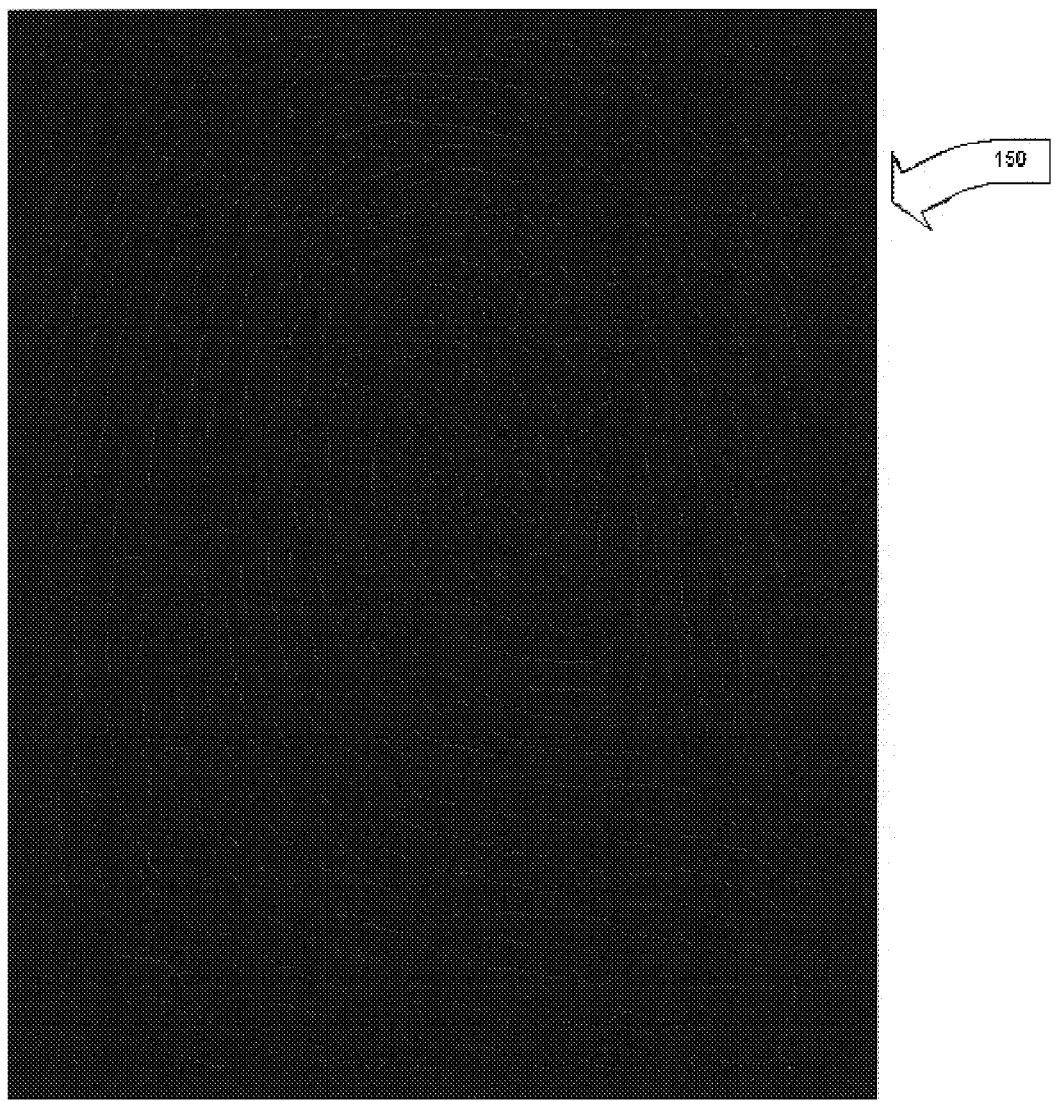
FIG. 36 is an illustration of a refined set of wire-frame lines.
Figure 37:
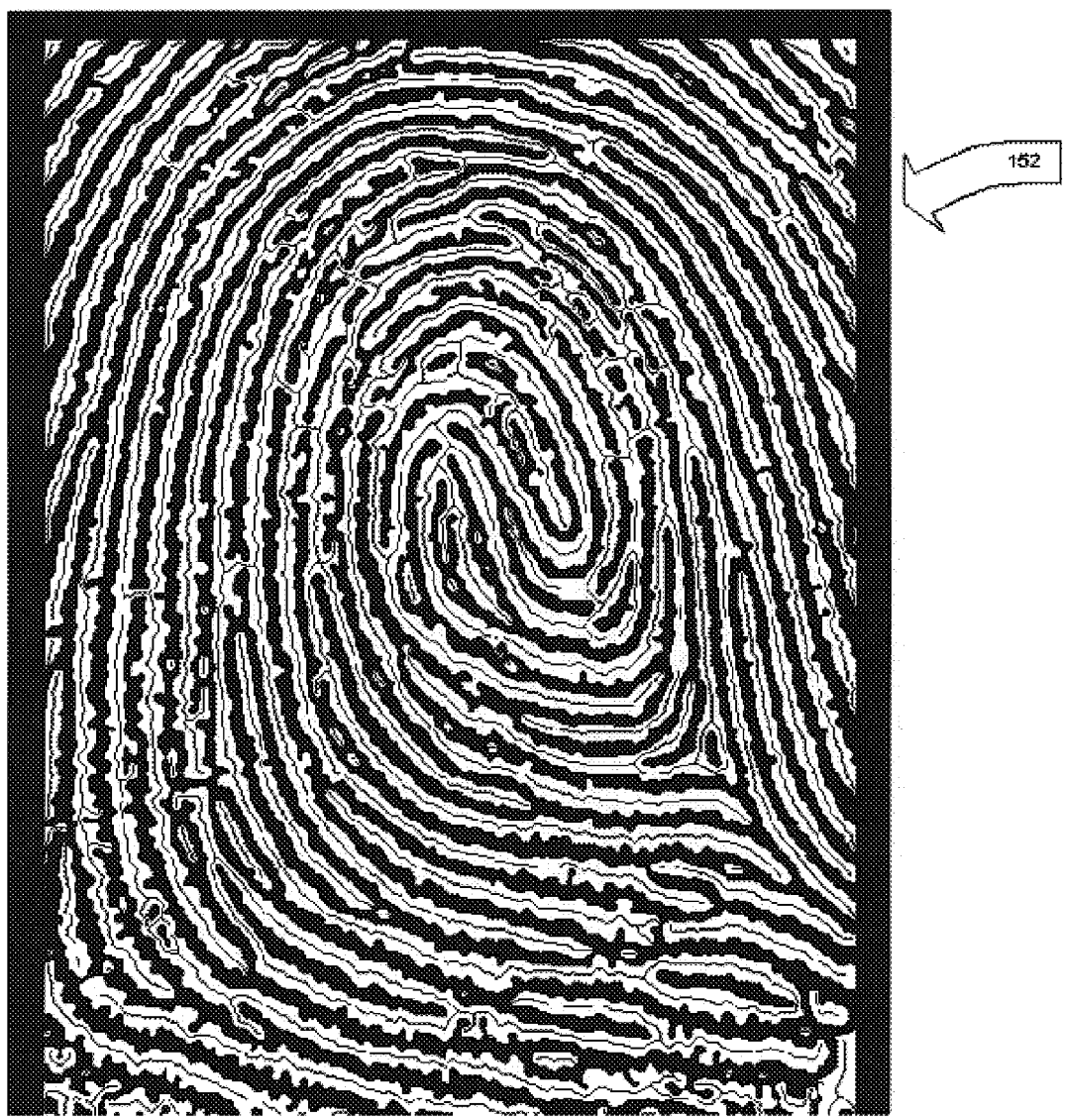
FIG. 37 is an illustration demonstrating the relationship between the refined set of wire-frame lines and a corresponding monochrome image.

In accordance with one embodiment, the block 128 branch removal process relies upon data taken from end-point and slope tables, both generated previously in the model creation 20 process. Each entry in the end-point table is used to locate a line segment that includes an end-point. The segment is traced back from the end-point along the corresponding line segment for seven pixels or until a center-point is located. If the segment length is less than five pixels, it is unconditionally removed (the pixels are cleared from the image). If the segment terminates on a center-point, the slope of the segment is compared to the slope of image elements in the same proximity. Slope data is derived from the slope table. If the difference between the two slopes is greater than 25 degrees, the segment is removed. Image 150 in FIG. 36 is an illustration of a refined set of wire-frame lines that result from the removal of excess wire-frame branches. Image 152 in FIG. 37 is an illustration demonstrating the relationship between the refined set of wire-frame lines and a corresponding monochrome image (image ridge lines are in white).

After the refined set of wire-frame lines have been created, in accordance with one embodiment, excess pixels are once again removed from the image. In one embodiment, excess pixels are located and removed in the same manner as described above in relation to Equation 15. In one embodiment, the end-point table and center-point table are recomputed either before, but illustratively after excess pixels have once again been removed.

As is demonstrated by block 130 in FIG. 27, another procedural component of wire-frame generation 82 is the fixing of end points. As can be seen in image 150 in FIG. 36, segments at the end of a line within the refined set of wire-frame lines may curl or may demonstrate a slope angle that is inconsistent with slope table entries in the same proximity.

Figure 38:
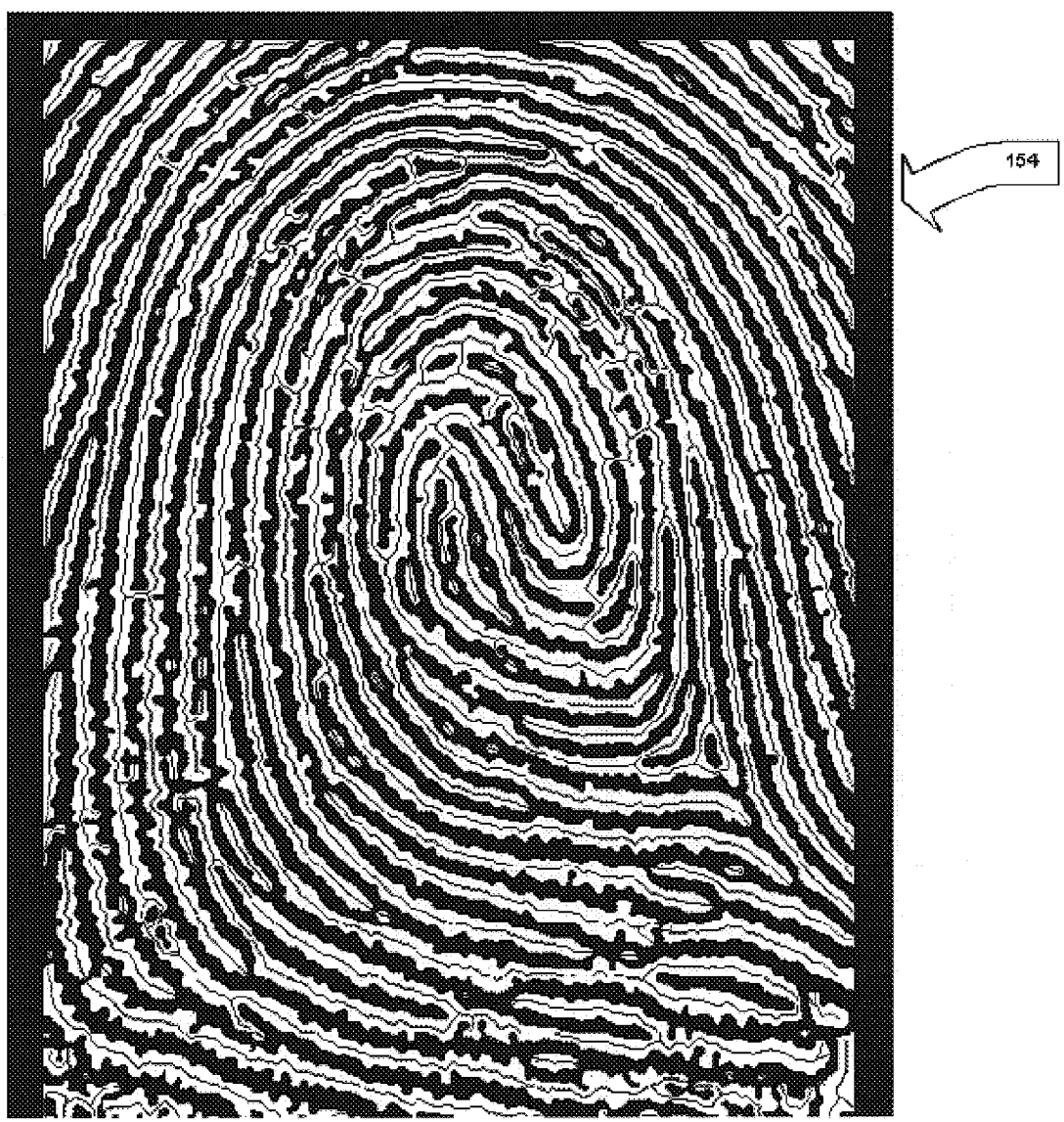
FIG. 38 is an illustration demonstrating the relationship between a further refined set of wire-frame lines, including fixed end-points, and a corresponding monochrome image.

In accordance with one embodiment and with block 130, in order to correct these deficiencies, each entry in the end-point table is utilized to assist in the creation of a further refined set of wire-frame lines. Accordingly, each entry in the end-point table is used to trace a corresponding line segment back seven pixels or until a center-point is encountered. If a center-point is encountered, the segment is restored. If no center-point is encountered, the line is removed from the wire-frame image. After the line is removed, the slope table entry for the line segment termination point is retrieved from the slope table. This slope value is utilized to create a new line segment, using a line draw algorithm, from the termination point to the end of the monochrome image. Image 154 in FIG. 38 is an illustration demonstrating the relationship between a further refined set of wire-frame lines, including fixed end points, and a corresponding monochrome image (image ridge lines are in white).

In accordance with one embodiment, the end-point and center-point tables are recomputed after end-points have been fixed in accordance with block 130 and the creation of a further refined set of wire-frame lines.

As is demonstrated by block 132 in FIG. 27, another procedural component of wire-frame generation 82 is the joining of end-points. Fingerprint ridge data elements may be broken due to paper cuts, blisters, burns, skin wrinkles or due to other image scanning problems, such as those caused by environmental influences in the image reader 12 environment. In accordance with end-point joining 132, an attempt is made to join end-points in a manner that bridges certain ridge gaps.

Figure 39:
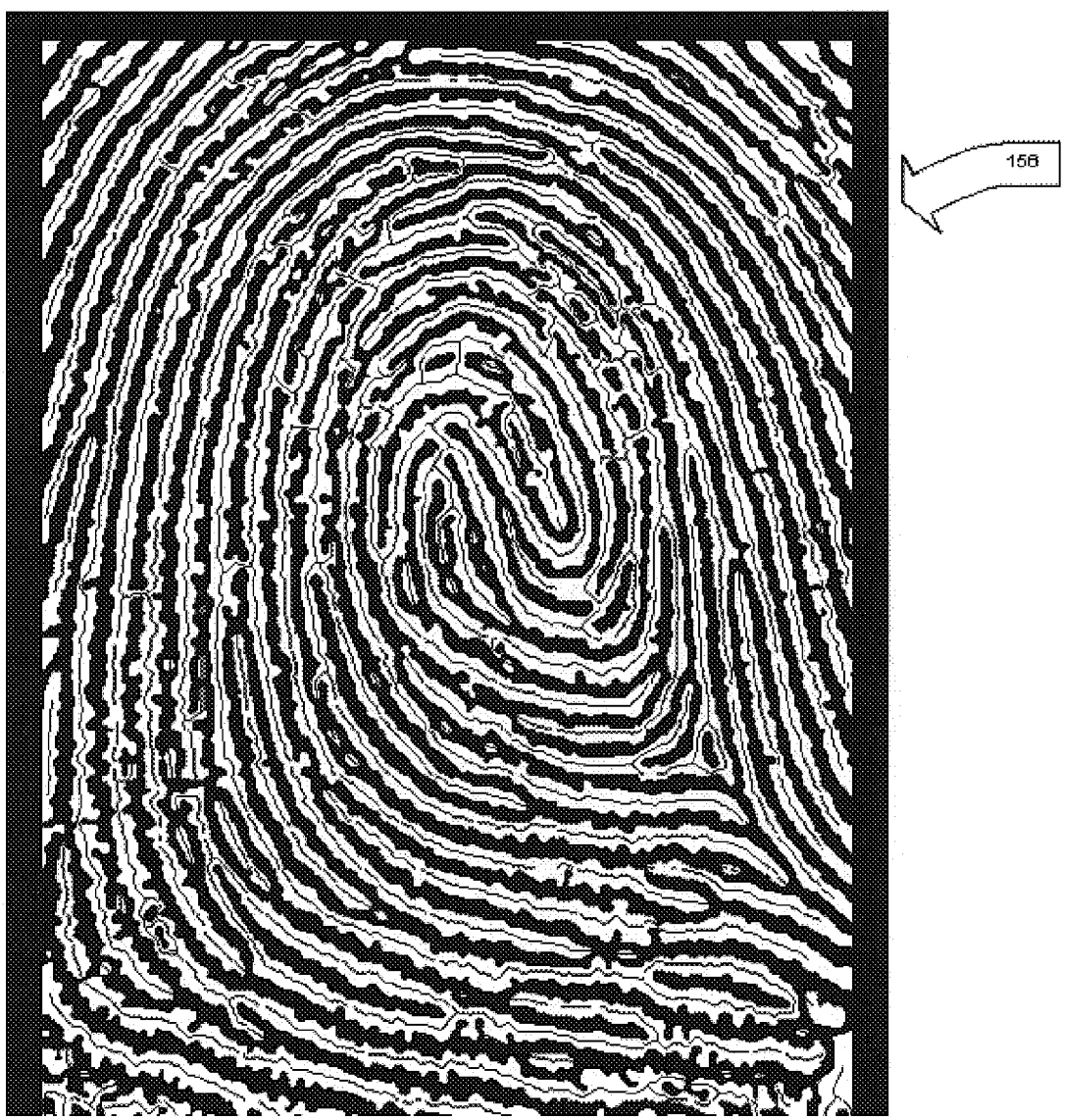
FIG. 39 is an illustration demonstrating the relationship between the further refined set of wire-frame lines, including fixed and joined end-points, and a corresponding monochrome image.

In accordance with one embodiment of end-point joining 132, each entry in the end-point table is compared to all other entries in the end-point table. If any two points are within six pixels of each other and the slope of the corresponding lines are within 25 degrees of each other, the segments are joined. Image 156 in FIG. 39 is an illustration demonstrating the relationship between a further refined set of wire-frame lines, including fixed and joined end-points, and a corresponding monochrome image (image ridge lines are in white). In accordance with one embodiment, the end-point and center-point tables are recomputed after end-points have been joined. After the end-points have been joined within the further refined set of wire-frame lines, a complete wire-frame image, based on a corresponding monochrome image, in accordance with wire-frame generation 82, will have been completed.

After a monochrome image has been transformed into a completed wire-frame image, in accordance with an embodiment of the present invention, the next component of model creation 20, in accordance with block 84 in FIG. 15, is to analyze the completed wire-frame image in order to locate fingerprint bifurcations and rods to be catalogued and included within an image model, along with other data elements. In accordance with one embodiment, relative to portion 12 image resolution and with reference to FIG. 40, general data elements related to a bifurcation are as follows:

Equation 16

Leg segments 162, 164 and 168. These segments are of equal length and each has at least one originating point at center-point 158. In accordance with one embodiment, each segment is set to 17 pixels.

The coordinates of center-point 158. This point is used to define a bifurcation. The upper left corner of the image is assumed to have coordinates of 0,0. Positive x coordinates are right and positive y coordinates are down.

First separation angle 160. This is the angle between leg segments 162 and 164, which is used to define a bifurcation. In accordance with one embodiment, first separation angle 160, by definition, cannot exceed 120 degrees.

Direction angle 166. This angle is the direction of a bifurcation and is used to define a bifurcation. In accordance with one embodiment, direction angle 166 can have values between 0 and 359.

It should be noted that the angle between leg segments 162 and 168 is the largest angle of all the angles between leg segments.

A count of the number of 20 pixel segments tracing from point 158 along the wire-frame line connected to leg segment 162 is used to define data points associated with a bifurcation. It is assumed that this is the first leg segment array.

A list (of length count) of the x and y coordinates of the 20 pixel segment end-points is constructed in order to catalogue data points within a first leg segment array. Leg segment array data points can also be called vector segment data points and, in accordance with one embodiment, and in accordance with the present invention, can be utilized to compare one image model to another. Bifurcations are used as one origin to catalogue vector segment data points.

A count of the number of 20 pixel segments tracing from point 158 along the wire-frame line connected to leg segment 164 is constructed in order to catalogue data points within a second leg segment array.

A list (of length count) of the x and y coordinates of the 20 pixel segment end-points is constructed in order to catalogue second leg segment array data points (vector segment data points).

A count of the number of 20 pixel segment end-points tracing from point 158 along a wire-frame line connected to leg segment 168 is used to define data points associated with a bifurcation. It is assumed that this is the third leg segment array.

A list (of length count) of the x and y coordinates of the 20 pixel segment end-points is constructed in order to catalogue third leg segment array data points (vector segment data points).

In accordance with one embodiment, the maximum number of leg segments with each array of data points is 20.

In accordance with one embodiment of the present invention, location of a possible bifurcation starts with the center-point table created during wire frame generation 82. Each entry in the center-point table is considered a potential bifurcation. Starting with a center-point entry in the center-point table, each segment extending therefrom is traced. When a length of 17 pixels is reached, the corresponding x and y coordinates are placed in a list and a leg segment count is incremented. Tracing, however, will terminate upon one of the following conditions:

1. A count of 20 leg segments is reached.
2. An end-point is detected (from EP table).
3. A center-point from center-point table is detected.

When the line tracing has been completed, three angles can be computed for potential bifurcations:

1. The angle between leg segments 162 and 164.
2. The angle between leg segments 164 and 168.
3. The angle between leg segments 162 and 168.

These angles are sorted in ascending order. The smallest angle, between segments 162 and 164, is saved as the separation angle. Next, angle 166 is computed using point 167 as coordinates 0,0. After leg segments have been identified and corresponding angles have been computed, a list of bifurcations will have been constructed. The bifurcations are illustratively defined through the center-point table.

Figure 40:
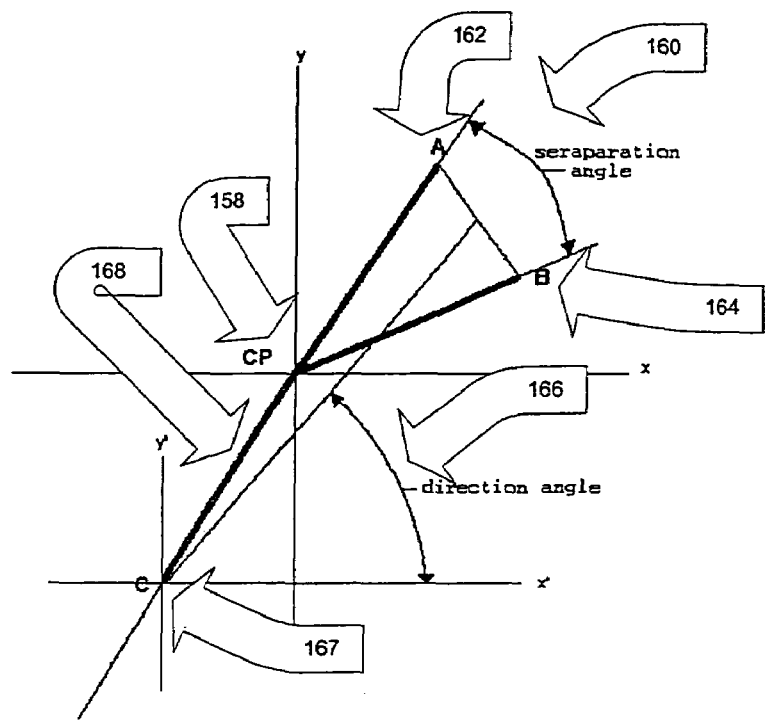
FIG. 40 is a graphical representation of a fingerprint bifurcation image element.
Figure 41:
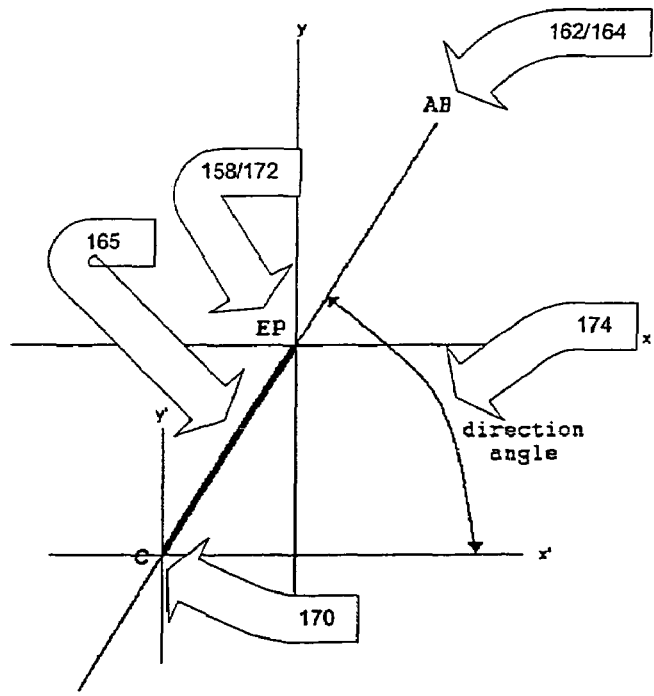
FIG. 41 is a graphical representation of a fingerprint rod image element.

A rod is considered a special case bifurcation. With reference to FIG. 41, wherein elements common to FIGS. 40 and 41 include identical labels, illustrative general data elements related to a rod, and assumptions based thereon, are as follows:

Equation 17

The end-point 172 of rod 165. This point is the center point 158 of the special case bifurcation.

The upper left corner of the image, again, is the coordinate 0,0. Positive values of x are to the right and positive values of y are down.

Using as the direction the direction of the rod 165 segment extending from point 170 to end-point 172, the rod end is extended to points 162 and 164.

Points 162 and 164 coincide.

Direction angle 174 is the direction of the rod. In accordance with one embodiment, it is assumed that the direction angle can have values between 0 and 359.

The angle between the segment extending between points 172 and 162, and the segment extending between point 172 and 164 (first separation angle 160) is set to zero.

The segment extending from end-point 172 to points 162/164 is the same length as the segment extending from point 170 to end-point 172. In accordance with one embodiment, it is assumed that each segment is set to 17 pixels.

A count of the number of 20 pixel segment end-points tracing from point 158 along rod 165 is used to define data points associated with a rod. It is assumed that this is the first leg segment array list.

A list (of length count) of the x and y coordinates of the 20 pixel segment end-points is constructed in order to catalogue the first leg segment array data points. These data points are vector segment data points and can be utilized to compare one image model to another.

The two remaining segment array lists contain only one point, 162/164. This point is computed by extending the segment associated with the first segment array list by 17 pixels.

The maximum number of 20 pixel segments in the first leg segment array is illustratively 20.

In accordance with one embodiment of the present invention, location of a possible rod starts with the end-point table created during wire frame generation 82. Each entry in the end-point table is considered a potential rod. Starting with an entry in the end-point table, the corresponding line segment is traced. When a length of 17 pixels is reached, the corresponding x and y coordinates are place in a list and a leg segment count is incremented. Tracing terminates upon one of the following conditions:

1. A count of 20 segments is reached.
2. An end-point is detected (from EP table).
3. A center-point from center-point table is detected.

In accordance with an embodiment of the present invention, for rods to be included within an image model, they must meet certain qualifying standards. Accordingly, after a vector segment has been traced, the segment extending from point 170 to end-point 172 is extended along the same angle to 162/164. If during extension, an image ridgeline is crossed, the corresponding rod is not saved and is not entered into an image model. In addition, a line perpendicular to the segment extending from end-point 172 to point 162/164 is extended in both direction for a distance of an illustrative 20 pixels. If neither of these 20 pixel lines intersect an image ridgeline, the rod is not saved. The distances during the perpendicular extension are then compared to see if end-point 172 is approximately the mid-point. If it is not, the rod is not saved. The output from this process is a list of qualified rods, which are defined through the end-point table. Direction angle 174 is used to assist in defining rods and is computed using point 170 as coordinates 0,0.

In addition to being located, in order to be included within an image model, rods and bifurcations must meet certain qualifications. As was previously mentioned, rods are qualified at the same time as they are located. Bifurcations, however, in accordance with block 86 in FIG. 15, in order to be included within an image model, must fulfill several qualifications in addition to those imposed during the bifurcation location process. With reference to FIG. 40, in accordance with one embodiment, the following is a list of filter rules used to further qualify bifurcations for entry into an image model:

Equation 18
As first separation angle 160 approaches 120 degrees, the risk of the separation angle being defined using the wrong legs increases. Accordingly, the first filter rule is that first separation angle 160 must be less than 115 degrees.
At least two of the bifurcation legs must have three or more 20 pixel segments.
The slope of leg segments 162, 164 and 168 must be within 30 degrees of the slope table for the same area.

Figure 42:
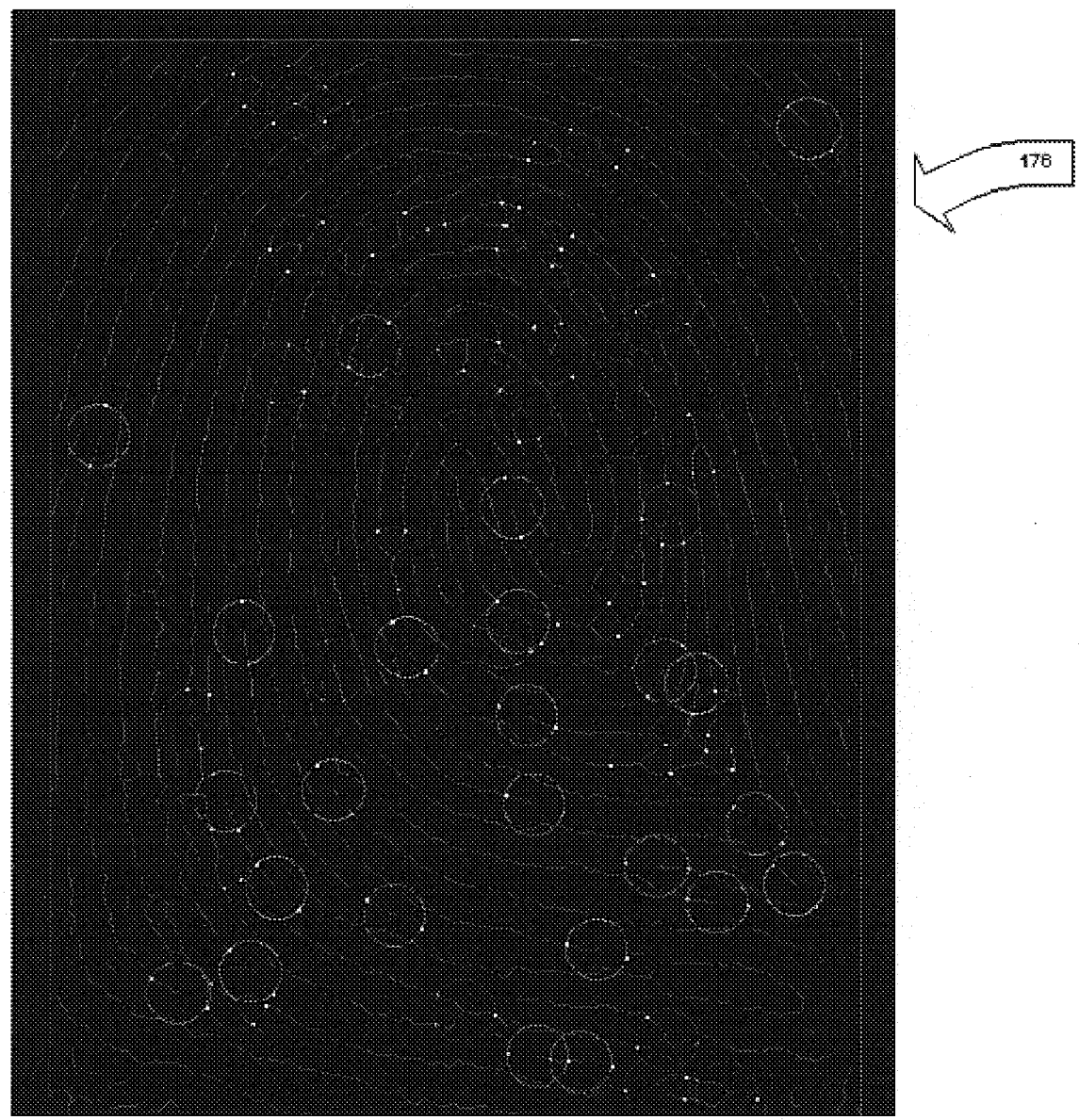
FIG. 42 is an illustration of a wire-frame fingerprint image within which qualified bifurcations and rods have been circled.
Figure 43:
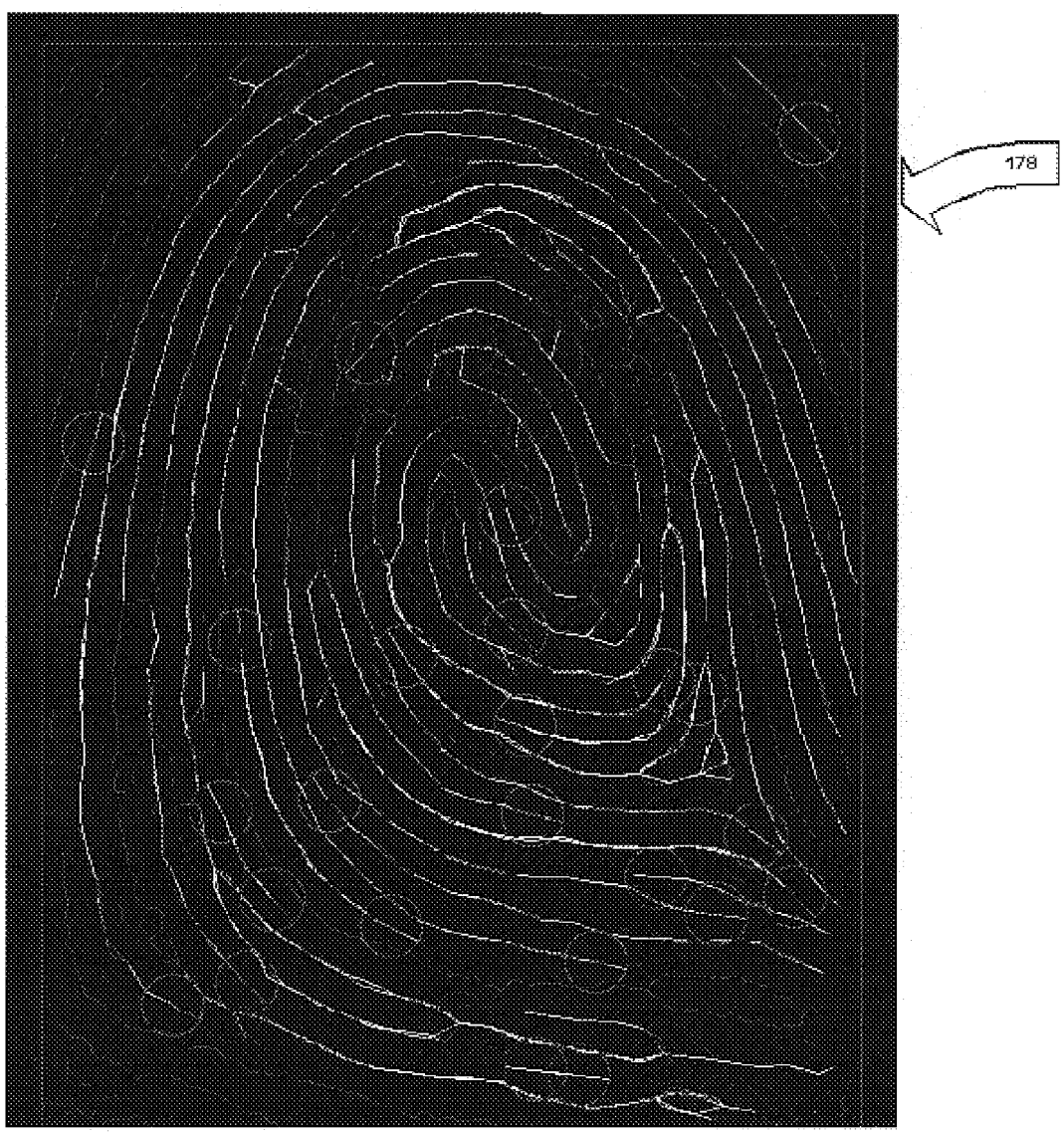
FIG. 43 is an illustration of the wire-frame fingerprint image within which qualified bifurcations and rods have been circled and vector segments have been traced.

Image 176 in FIG. 42 is an illustration of a wire-frame image within which qualified bifurcations and rods have been circled. End-points and center-points are identified with white dots. Image 178 in FIG. 43 is an illustration of a wire-frame image within which the same qualified bifurcations and rods have been circled. Within image 178, vector segment data points (the 20 pixel segments extending from a qualified rod or bifurcation) have been traced and are shown in white. Vector segment data points approximately track wire-frame lines that connect to a qualified bifurcation and rod and can be used to compare one image model to another.

In accordance with block 88 in FIG. 15, the final step in the model creation 20 process is the building of an image model based on a completed wire-frame image and image elements derived therefrom. A completed image model consists of the following elements:

Equation 19
A count of qualified bifurcations
A count of qualified rods
A bifurcation and rod list which consists of:
The center point (center-point 158 for bifurcations or end-point 172 for rods, see FIGS. 40 and 41) identified with x and y coordinates.
The direction angle (angle 166 for bifurcations or angle 174 for rods)
The separation angle (angle 160 for bifurcations or a zero value for rods)
Three leg segment arrays (vector segment arrays), which consist of:
a) Count of 20 pixel segments extending from a point within corresponding rod/bifurcation.
b) List of x coordinate end-points corresponding to 20 pixel segments.
c) List of y coordinate end-points corresponding to 20 pixel segments.
Data representations of line segments or vector segments not used by bifurcations or rods.

Bifurcations, within an image model, are defined by the intersection of ridge segments. Referring to FIG. 40, in accordance with one embodiment of the present invention, the information recorded in an image model for a bifurcation is as follows:

Equation 20
The x and y coordinates of center point 158.
First separation angle 160.
Direction angle 166.
A list of the x and y coordinates that trace the vector/leg segments emanating from the center point 158. These points are equal distance (illustratively 20 pixels) apart. Tracing and collection of 20 pixel vector/leg segments continues until:
The trace terminates at the center of a bifurcation.
The end of the segment is reached.
A maximum of forty 20 pixel segments are recorded.

Rods are defined by the ending of a ridge segment. The end-point must be approximately half way between two ridge segments and if extended for a particular amount of pixels, illustratively 10 or 20, must not touch another ridge segment. In accordance with one embodiment, with reference to FIG. 41, the information recorded in an image model for a rod is as follows:

Equation 21
The x and y coordinates of end-point 172.
First separation angle 160 (by definition, this value is zero).
Direction angle 174.
A list of the x and y coordinates that trace the vector/leg segments emanating from point 172. These points are equal distance (illustratively 20 pixels) apart. Tracing continues until:
Arrive at center of a bifurcation.
The end of the wire-frame segment is reached.
Maximum of forty 20 pixel segments are recorded.

In accordance with an embodiment of the present invention, ridge segments not used by bifurcations or rods are recorded in an image model as follows:

Equation 22
A list of x and y coordinates that trace the ridge segments emanating from end-points. These points are equal distance (illustratively 20 pixels) apart. Tracing continues until:
The trace terminates at the center of a bifurcation.
The end of the segment is reached.
A maximum of forty 20 pixel segments are recorded.

In accordance with one embodiment, information within an image model can be stored in accordance with the following data storage format:

Equation 23

```
typedef struct tag_LEG
    {
    int seperation_angle;        // angle to next leg
    int count;                   // number of entries
                                    in row and col
    int row[ 40 ];               // y coordinate list
    int col[ 40 ];               // x coordinate list
    } LEG, * LEG_PTR;
typedef struct tag_D_POINT       // bifurcation or
                                    rod information
    {
    int row;                     // bifurcation or
                                    rod center y
                                    coordinate
    int col;                     // bifurcation or
                                    rod center y
                                    coordinate
    int leg_orientation;         // orientation angle
    LEG leg[ 3 ];                // leg trace info
    } D_POINT, * D_POINT_PTR;
typedef  struct  tag_SEG         // for extra segment
                                    information
    {
    int count;                   // number of entries
                                    in row and col
    int row [ 40 ];              // y coordinate list
    int col [ 40 ];              // x coordinate list
    } SEG, * SEG_PTR;
typedef struct tag_PRINT         // model structure
    {
    int   min_point_center_col;
    int   min_point_center_row;
    int   no_of_extra_segs;      // entries in
                                    segment_list
    int   no_of_points;          // # of bifurcations
                                    in point_list
    int   no_of_islands;         // number of rods in
                                    point_list
    D_POINT point_list[ 100 ];   // bifurcations and
                                    rods list
    SEG segment_list[ 100 ];     // extra segment
                                    list
    } PRINT, * PRINT_PTR;
```

It should be noted that the precise values, in particular values corresponding to pixel counts and segments counts, could be modified without departing from the current invention. Different reader portion 12 (FIG. 1) technologies my require such modifications. The values provided are illustrative values.

As is indicated by block 24 in FIG. 2, and in accordance with an embodiment of the present invention, a completed image model can be utilized as the basis for a model comparison. Model comparison 24 is a process for comparing one image model to another.

Model comparison is accomplished by using a series of shift and rotate algorithms to adjust at least one image model and then counting the number of matching data elements. Data elements might include, but are not limited to bifurcations, rods, vector segments associated with bifurcations/rods, micro-minutia points and vector segments not incorporated into bifurcations or rods. When shifting and rotating causes the data element count to reach or approach a maximum value, the two models are at or approaching their maximum comparison point. Using the counts of the matching data elements at or near the maximum comparison point, a score, which represents the percentage of match, can be calculated.

The theory behind model comparison 24 is that as one model is rotated and shifted, the number of data element points that match will increase or decrease. If the number of points that match for each angle is plotted, a bell shaped curve will result. The high point for the curve will represent the point at which the two models best compare.

In accordance with one embodiment of model comparison 24, the process starts by loosely comparing each bifurcation and rod in a model (model A) to all bifurcations and rods in another model (model B). The loose comparison enables a non-matching pair to be discovered without a significant investment of processing time. A more detailed comparison could illustratively be substituted for the loose comparison. In one embodiment, requirements utilized during the loose comparison are defined as:

Equation 24
The center points must be within 90 pixels in the x direction.
The center points must be within 120 pixels in the y direction.
The difference between separation angles is within plus or minus 8 degrees.
The difference between direction angles is within plus or minus 40 degrees.

In accordance with one embodiment, a possible match table is generated based on the loose comparison. The possible match table is indexed by the bifurcation or rod index into model A. Each entry in the possible match table consists of:

Equation 25
A count of possible matches
A list of the bifurcation or rod indexes in model B. This list defines all those points in model B that loosely match to the point in model A.

The general comparison process is best described by a simple coding example. Specifically, in accordance with one embodiment, the coding is defined as follows:

Equation 26
Generate possible match table.
Set maximum match count to zero.
Set rotate angle to zero.
Clear master x and y shift counts.
TOP OF LOOP
If rotate angle is not zero
Rotate model B by rotate angle. This is a standard trig. function.
Shift process on model B (this is described below).
Count the bifurcations, rods and segments that match between model A and model B.
The center points (both x and y) must be within 10 pixels.
The leg segment points (both x and y) must be within 10 pixels.
The difference for separation angle is within plus or minus 6 degrees.
The difference for direction angle is within plus or minus 10 degrees.

If match count is less than maximum match count minus two
  Exit the loop.
If match count is greater than maximum match count
Set maximum match count to maximum count.
Save rotate angle.
Save x and y shift counts. This is an output of the above shift process.
Increment rotate angle by one.
If rotate angle is less than 30
Goto TOP OF LOOP
The above loop is repeated for angles between −1 and −30.
Copy working possible match table to possible match table. This will be used in the enrollment process.
Using the saved variables rotate angle and x and y shift counts, shift and rotate the entire model B.
Count the bifurcations, rods and segments that match between model A and model B.
  The center points (both x and y) must be within 10 pixels.
  The leg segment points (both x and y) must be within 10 pixels.
  The difference for separation angle is within plus or minus 6 degrees.
  The difference for direction angle is within plus or minus 10 degrees.

---

SHIFT PROCESS DESCRIPTION

Set max test x to 90 pixels.
Set max text y to 120 pixels.
Clear master x and y shift counts.
Make a working copy of the possible match table.
TOP OF LOOP 1
  Clear saved points count.
  Clear delta x and delta y count.
  Set model A index to zero.
  TOP OF LOOP 2
    Set possible index to zero.
    TOP OF LOOP 3
      Extract model B index from possible match table at model A index and possible index.
      Compute the distance between the bifurcation or rod in model A and model B.
      If the distance is less than max test x and max test y
        Increment saved points count.
        Add distance in x direction to delta x count.
        Add distance in y direction to delta y count.
      Else
        Remove this point from the working copy of the possible match table.
      Increment possible index by one.
      If possible index is less than count value in possible match tables at model A index.
        Goto TOP OF LOOP 3
    Increment model A index by one.
    If model A index is less than the bifurcation and rod count in model A
      Goto TOP OF LOOP 2
    If saved points count is zero
      Exit the routine and return a value of zero (no compare).
    Add delta x count divided by saved points count to master x count.
    Add delta y count divided by saved points count to master y count.
    Adjust all x and y coordinates in model B using master x and y counts.
    If max test x is greater than 20 pixels
      Multiply max test x by 0.75.
      Multiply max test y by 0.75.
      Goto TOP OF LOOP 1

---

SHIFT PROCESS DESCRIPTION

Exit the routine and return the value of saved points count.
// END CODE EXAMPLE

---

The result of the final shift and rotate process is several counts:

Equation 27
  The number of bifurcations that match.
  The number of rods that match.
  The number of segments that match.
  The number of segments that don't match.
For the discussion below, the following definitions are used:

Equation 28
  Total points: the sum of the number of bifurcations that match and the number of rods that match.
  Segments per leg: total segments matched divided by number of legs compared.
  Percent of points: total points (multiplied by 100) divided by the minimum of total bifurcations and rods in model A or model B.
  Raw percentage: the number of segments that match (multiplied by 100) divided by the sum of the segments that match and the segments that don't match.

Using the above counts, a percentage of match can be calculated.

Equation 29
  If the number of segments that match is zero, the percentage of match is zero.
  If segments per leg is less than four, the percentage of match is zero.
  If total points is less than three, the percentage of match is zero.
  If total points is three or four, the percentage of match is ¼ of the percent of points.
  If total points is five and segments per leg is greater than four, the percentage of match is raw percentage multiplied by percent of points divided by 800.
  If total points is six through ten and
    Segments per leg is four, the percentage of match is raw percentage multiplied by percent of points divided by 700.
    Segments per leg is five through seven, the percentage of match is raw percentage multiplied by percent of points divided by 500.
    Segments per leg is greater than eight, the percentage of match is raw percentage multiplied by percent of points divided by 300.
  If total points is greater than 10, the percentage of match is raw percentage multiplied by percent of points divided by 100.

In accordance with one embodiment of the present invention, the level of similarity required, within an image identification based security system, before two image models are declared matching is adjustable. Similarity levels can be tuned based on the nature of the environment being secured. A strictly tuned system would provide maximum security by requiring a high match percentage, but may be more prone to accidentally rejecting a matching pair of image models. Conversely, a loosely tuned system would require a lower match percentage and, accordingly, would provide a lower level of security. A loosely tuned system, however, would be more prone to mistaken match determinations and less prone to match rejections.

As is indicated by block 26 in FIG. 2, and in accordance with an illustrative embodiment of the present invention, database search 26 could be performed in place of or in combination with model comparison 24. Database search 26 involves a quick and efficient determination as to which, if any, of potentially thousands (or more, i.e., millions) of image models included within a database exhibit a desired level of similarity, as compared to a target image model.

In accordance with an embodiment of the present invention, in order to quickly identify a fingerprint from a database containing thousand of prints, a set of database keys is defined. Due to many factors (finger too dry, finger too wet, position of the finger when placed on the scanner, distortions due to pressure, etc.), keys are general (approximate), rather than specific in nature. In accordance with the embodiment, these general keys form the basic foundation for high-speed general indexing.

In accordance with one embodiment, a set of keys is generated using some of the characteristics associated with bifurcation and rod image model elements (defined above in relation to FIGS. 40 and 41). The information used in key generation for a bifurcation, with reference to FIG. 40, consists of the following characteristics:

Equation 30
The coordinates of center point 158. The upper left corner of the image is assumed to have coordinates of 0,0. Positive x coordinates are right and positive y coordinates are down.
A first separation angle between leg segments 162 and 164 (separation angle 160).
A second separation angle between segments 164 and 168.
The direction of the bifurcation (direction angle 166).

A rod is considered to be a special case of a bifurcation with the following assumptions made with reference to FIG. 41:

Equation 31
The end point of the rod (end-point 172) becomes the center point of the bifurcation (center-point 158).
Using as the direction the direction of the segment extending from point 170 to end-point 158/172, the rod end is extended to points 162/164.
Points 162 and 164 coincide.
The angle between the segments extending from point 158/172 to points 162 and 164 (first separation angle, previously referred to as separation angle 160) is zero.
The angle between the segments extending from point 158/172 to points 164 and 170 (second separation angle, previously referred to as direction angle 174) becomes the direction angle.

The information used in key generation for a rod is:

Equation 32
The coordinates of center-point/endpoint 158/172.
The first separation angle (separation angle 160) Using the above assumption, this angle is zero.
The second separation angle (direction angle 174).

As print models are stored in the database, two tables are updated. The first table, KEY__1, is a two dimensional array. The first index is the first separation angle the second index is the second separation angle. It should be noted that the first separation angle cannot exceed 120 degrees, and, in accordance with one embodiment, could be limited to 115 degrees. In addition, second separation angle cannot exceed 180 degrees. The direction angle can be any value between zero and 359. Therefore the array size of KEY__1 is 116 (0 to 115) by 180 (0 to 179). The second table, KEY__2, contains the key information. KEY__2 is a single dimension array that is open-ended.

Each entry in KEY__1 contains two elements, a count and an index into the KEY__2 table. The element count defines the number of bifurcations or rods that have identical separation and direction angles. The index element defines the starting point for the keys contained in table KEY__2. An entry in the KEY__2 table consist of the following elements:

Equation 33
The x coordinate (X_CENTER) of the bifurcation center or rod end-point. The upper left corner of the image is assumed to have coordinates of 0,0.
The y coordinate (Y_CENTER) of the bifurcation center or rod end-point. The upper left corner of the image is assumed to have coordinates of 0,0.
The index to the bifurcation or rod in the model.
The direction angle.
The model identification number. As model records are stored in the database, they are assigned unique numbers. These numbers start at a predetermined value, usually 10,000,000, and increment, by one, with each record added.
The finger identification number. Each finger is assigned a numerical value starting with zero. The left pinkie is assigned zero, the left ring assigned one, the last assigned, right pinkie, is nine.
Control flags. This element contains information about the finger model:
Is the record marked as deleted?

In accordance with an embodiment of the present invention, updating of the tables, KEY__1 and KEY__2, is best described by the following coding example:

---

Equation 34

```
Set model index to zero.         // loop through all
                                    bifurcations and
                                    rods in the model
TOP OF LOOP 1
    Extract the direction angle (DA) from the model.
    Extract the first separation angle (SA1) from
    the model.
    Extract the second separation angle(SA2) from
    the model.
    Build the new entry for the KEY__2 table.
        The x coordinate. Extracted from the model
        entry.
        The y coordinate. Extracted from the model
        entry.
        The direction angle.
        The index. Set to model index.
        The model identification number. Passed
        into this routine.
        The finger identification number. Passed
        into this routine.
        Control flags. Set to zero.
    Increment the count field in table KEY__1[ SA1][
    SA2 ] by one.
//  Increment all remaining key 2 index fields in
    the KEY__1 table.
//  At this point the table KEY__1 can be though of
    as a single dimension array with 41,760 (116
    times 360) entries.
    Set update index to the product of SA1 times
    SA2.
TOP OF LOOP 2
    Increment update index by one.
    If update index is less than 41,760
```

Equation 34

```
                Increment KEY_1[update
            index].key_2_start_index.
                Increment update index.
                Go to TOP OF LOOP 2
//      make room in the KEY_2 table by sliding all
entries, starting at
//      KEY_1[ SA1 ][ SA2 ] ].key_2_start_index, up one.
                Set update index to the number of entries
                contained in the KEY_2 table minus one.
                Set stop index to the value stored in KEY_1[ SA1
            ] [ SA2 ].key_2_start_index.
TOP OF LOOP 3
                If update index is greater than or equal to stop
            index
                    Copy the entry at update index to update
                    index plus one.
                    Decrement update index by one.
                    Go to TOP OF LOOP 3
                Store the new key, generated above, in the KEY_2
                table at stop index.
                Increment the number of entries contained in the
                KEY_2 table by one.
//              END CODE EXAMPLE
```

Tables KEY_1 and KEY_2 provide a means of locating all bifurcations and rods that have identical angle characteristics. Table KEY_1 provides a count and a starting index. Table KEY_2 provides the key data. Also, it should be noted that the data stored in table KEY_2 is grouped such that all bifurcations and rods that have identical angle characteristics are contiguous.

After the tables have been constructed, the next step is to identify matching model images. Those prints that have a large number of bifurcations and rods that loosely match to an entry in the database are most likely to compare with a high score. Using the above tables and some filter rules, a possible match table is created. Each entry in the possible match table contains the following information:

Equation 35
  A count of the number of bifurcations and rods that loosely match.
  The distance, in both the x and y, between the two center points (stored as an ordered pair).
  Where loosely matched is defined to be:
  The center points must be within 90 pixels in the x direction.
  The center points must be within 120 pixels in the y direction.
  The angle difference for first separation angle is within plus or minus 8 degrees.
  The angle difference for second separation angle is within plus or minus 8 degrees.
  The direction angle is within plus or minus 20 degrees.

This table is indexed using the model identification number and finger identification number. In accordance with one embodiment, the table is created as follows:

Equation 36

```
    Clear the possible match table.
    Set model index to zero.
TOP OF LOOP 1
    Extract a model element.
//          PROCESSING FOR BIFURCATIONS
    If the element is a bifurcation
        Extract first separation angle from model.
```

Equation 36 (continued)

```
        Extract second separation angle from model.
        Extract direction angle from model.
        Extract center point coordinate from model.
        Set start index 1 to first separation angle
minus the deviation (8 degrees).
        If start index 1 is less than one
            Set start index 1 to 1.
        Set stop index 1 to first separation angle
plus the deviation (8 degrees).
        If stop index 1 is greater than 116
            Set stop index 1 to 116.
        Set start index 2 to second separation
angle minus the deviation (8 degrees).
        If start index 2 is less than one
            Set start index 2 to 1.
        Set stop index 2 to second separation angle
plus the deviation (8 degrees).
        Set index 1 to start index 1.
TOP OF LOOP 2
        Set index 2 to start index 2.
TOP OF LOOP 3
        Set loop count to the value of the count
        element in table KEY1[ index 1 ][ index 2 ]
        If loop count is not zero
            Set key 2 index to index value in
table KEY1[ index 1 ][ index 2 ]
TOP OF LOOP 4
            If the "loosely matched rules",
defined above, are met
                Use model identification and
                finger model numbers to form an index
                into the possible match table.
                Increment the match count and store
                the distance difference.
            Increment key 2 index by one.
            Decrement loop count
            If loop count is greater than zero
                Goto TOP OF LOOP 4
        Increment index 2
        If index 2 is greater than stop index 2
            Goto TOP OF LOOP 3
        Increment index 1
        If index 1 is greater than stop index 1
            Goto TOP OF LOOP 2
//          PROCESSING FOR RODS
    If the element is a rod
        Extract direction angle from model.
        Extract center point coordinate from model.
        Set start index 1 to direction minus the
deviation (20 degrees).
        If start index 1 is less than zero
            Set start index 1 to zero.
        Set stop index 1 to direction plus the
deviation (20 degrees).
        If stop index 1 is greater than 359
            Set stop index 1 to 359.
        Set index 1 to start index 1.
TOP OF LOOP 5
        Set loop count to the value of the count
        element in table KEY1[ 0 ][ index 2 ]
        If loop count is not zero
            Set key 2 index to index value in
table KEY1[ 0 ][ index 2 ]
TOP OF LOOP 6
            If the "loosely matched rules",
defined above, are met
                Use model identification and
                finger model numbers to form an index
                into the possible match table.
                Increment the match count and store
                the distance difference.
            Increment key 2 index by one.
            Decrement loop count
            If loop count is greater than zero
                Goto TOP OF LOOP 6
```

-continued

Equation 36

```
         Increment index 1
         If index 1 is greater than stop index 1
             Goto TOP OF LOOP 5
         Increment model index by 1.
         If model index is less than total model elements
             Goto TOP OF LOOP 1
//           END OF CODE EXAMPLE
```

At this point, the possible match table contains a list of all models in the database that are candidates for comparison. The count field contains a count of the bifurcations and rods that loosely match. The distance list contains an ordered list, count value entries, of the distances from the center point of model to those of entries in the database. Some of these entries are invalid. The filter rule below attempts to remove some invalid values. To remove invalid entries the distance list is first sorted, using the x distance, in ascending order (see example below). This list is then scanned looking for the longest sequence of numbers whose distance is less than 40. The start and end index of this list is then used to sort the y component of the ordered pairs. The list is then scanned looking for the longest sequence of numbers whose distance is less than 40. The start and end index of this list provides a new count to replace the old count.

Equation 37

| x | −61 | −34 | −32 | −23 | −12 | −11 | −7 | −3 | −2 | 5 | 11 | 14 | 14 | 19 | 24 | 26 | 28 |
|---|---|---|---|---|---|---|---|---|---|---|---|---|---|---|---|---|---|
| y | 86 | 69 | −99 | 31 | 6* | −59* | −119* | 116* | 114* | −125* | 7* | −16* | 32* | −12 | −76 | 125 | −87 |
| y | 86 | 69 | −99 | 31 | −125 | −119 | −59 | −16 | 6* | 7* | 32* | 114 | 116 | −12 | −76 | 125 | −87 |

In the above example, the original count is 17. Following the first sort and index location, the start index is 4 and the end index is 12 (represented by asterisk). The second sort and index location yields a count of 3.

When all match counts have been adjusted, the table is sorted, in descending order, by count. Those entries at the top of the list (the highest count values) represent those models (from the database) that should be compared to the live scan.

Qualification parameters can be adjusted at several levels to accommodate the reader 12 characteristics and overall security level as it relates to false matches versus false rejections. As an example, the match table distance parameter could be expanded to consider entries whose distance is greater than 60 versus 40, which would have the net effect of lowering the security level thereby reducing false rejections at the expense of increasing false accepts.

Although the present invention has been described with reference to illustrative embodiments, workers skilled in the art will recognize that changes may be made in form and detail without departing from the spirit and scope of the invention.

What is claimed is:

1. A computer-implemented method for determining whether to interrupt processing of an image, comprising:
   obtaining a raw scan image;
   utilizing a computer processor that is a functional component of the computer to generate a collection of slope-oriented information based on at least one portion of the raw scan image, wherein generating the collection of slope-oriented information comprises creating a raw collection of slope-oriented information using data from a monochrome image that corresponds to the raw scan image and generating a processed collection of slope-oriented information using data from the raw collection of slope-oriented information, wherein creating the raw collection of slope-oriented information comprises generating an entry corresponding to at least one pixel grid comprised in the monochrome image, the entry comprising a count of the changes in the x coordinate in the pixel grid, and a count of the changes in the y coordinate in the pixel grid; and
   utilizing the collection of slope-oriented information as a basis for determining an image quality characteristic of said at least one portion of the raw scan image.

2. The method of claim 1, wherein the entry corresponding to the at least one pixel grid further comprises a count of the pixels tested in the at least one pixel grid.

3. The method of claim 2, wherein utilizing the collection of slope-oriented information to determine an image quality characteristic of at least one portion of the raw scan image comprises comparing the count of the pixels tested in the at least one pixel grid to a threshold pixel count.

4. The method of claim 3, wherein the threshold pixel count can be tuned.

5. The method of claim 3, wherein utilizing the collection of slope-oriented information to determine an image quality characteristic of at least one portion of the raw scan image comprises determining a ratio of pixel grids of the monochrome image wherein the count of the pixels is at least equal to the threshold pixel count.

6. The method of claim 5, wherein determining whether to interrupt processing of an image comprises interrupting when the ratio of pixel grids wherein the count of the pixels is at least equal to the threshold pixel count, is below a threshold ratio.

7. The method of claim 1, wherein generating the processed collection of slope-oriented information using data from the raw collection of slope-oriented information comprises:
   calculating a hypotenuse of the at least one pixel grid as the square root of the sum of the square of the count of the changes in the y coordinate in the pixel grid and the square of the count of the changes in the x coordinate in the pixel grid; and
   calculating a slope of the at least one pixel grid as the arcsine of the quotient of the count of the changes in the y coordinate in the pixel grid divided by the hypotenuse of the pixel grid.

8. The method of claim 7, further comprising normalizing the slope of the pixel grid to a value between zero and 180 degrees.

9. The method of claim 7, wherein utilizing the collection of slope-oriented information to determine an image quality characteristic of at least a portion of the raw scan image comprises comparing the slopes of a plurality of pixel grids of the monochrome image to reference slopes of corresponding pixel grids of a reference image model.

10. The method of claim 9, wherein utilizing the collection of slope-oriented information to determine an image quality characteristic of at least a portion of the raw scan image further comprises generating a quantified level of similarity of the slopes of the plurality of pixel grids of the monochrome image to the reference slopes of the corresponding pixel grids of the reference image model.

11. The method of claim 10, wherein determining whether to interrupt comprises interrupting when the quantified level of similarity is below a threshold level of similarity.

12. The method of claim 11, wherein the threshold level of similarity can be tuned.

* * * * *